(12) United States Patent
Kodama et al.

(10) Patent No.: US 8,212,999 B2
(45) Date of Patent: Jul. 3, 2012

(54) LIQUID DROPLET MEASUREMENT APPARATUS AND LIQUID DROPLET MEASUREMENT METHOD

(75) Inventors: Kenichi Kodama, Kanagawa-ken (JP); Kanji Nagashima, Kanagawa-ken (JP); Tadashi Kyoso, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 815 days.

(21) Appl. No.: 12/238,206

(22) Filed: Sep. 25, 2008

(65) Prior Publication Data

US 2009/0086190 A1 Apr. 2, 2009

(30) Foreign Application Priority Data

Sep. 27, 2007 (JP) ................................. 2007-252441
Mar. 31, 2008 (JP) ................................. 2008-092074

(51) Int. Cl.
*G01P 3/36* (2006.01)

(52) U.S. Cl. ... 356/28; 356/28.5; 73/204.11; 73/204.12; 73/202.5

(58) Field of Classification Search ........ 356/3.01–28.5; 73/202.5, 204.11–204.14
See application file for complete search history.

(56) References Cited

U.S. PATENT DOCUMENTS

| | | | |
|---|---|---|---|
| 3,809,480 A * | 5/1974 | Somerville et al. | 356/338 |
| 5,229,849 A * | 7/1993 | Pleass et al. | 348/79 |
| 2003/0071984 A1 * | 4/2003 | Teramae et al. | 356/28 |

FOREIGN PATENT DOCUMENTS

| | | |
|---|---|---|
| JP | 2003-288839 A | 10/2003 |
| JP | 2005-69900 A | 3/2005 |
| JP | 2005-83769 A | 3/2005 |
| JP | 2005-172613 A | 6/2005 |
| JP | 2006-66933 A | 3/2006 |
| JP | 2006-175775 A | 7/2006 |
| JP | 2006-184161 A | 7/2006 |
| JP | 2006-281714 A | 10/2006 |
| JP | 2007-121027 A | 5/2007 |

OTHER PUBLICATIONS

Japanese Office Action issued on Jan. 31, 2012 in related Japanese patent application No. 2008-092074 (English translation is attached).

* cited by examiner

*Primary Examiner* — Thomas Tarcza
*Assistant Examiner* — Luke Ratcliffe
(74) *Attorney, Agent, or Firm* — Birch, Stewart, Kolasch & Birch, LLP

(57) ABSTRACT

A liquid droplet measurement apparatus has: a first laser light source emitting a laser light; a first optical device which makes, in terms of a beam cross-section of the laser light, a beam width in a direction perpendicular to a direction of ejection of a liquid droplet, greater than a beam width in the direction of ejection of the liquid droplet, and makes light intensity of the laser light fall within a prescribed range within a range where variation in a position of the liquid droplet occurs in the direction perpendicular to the direction of ejection of the liquid droplet, at a position where the laser light from the first laser light source is irradiated onto the liquid droplet ejected; a first light receiving device which receives the laser light that has been irradiated onto the liquid droplet by the first optical device and generates a determination signal; and a first liquid droplet characteristics calculation device which calculates at least one of a volume of the liquid droplet and a velocity of the liquid droplet, from the determination signal generated by the first light receiving device.

21 Claims, 30 Drawing Sheets

— STANDARD VELOCITY ±0%
---- STANDARD VELOCITY −4%
—·—·— THRESHOLD LEVEL

FIG.13A

| COLOR OF LIQUID DROPLET | COLOR OF LASER LIGHT |
|---|---|
| CYAN | RED |
| MAGENTA | GREEN |
| YELLOW | BLUE |

FIG.13B

| COLOR OF LIQUID DROPLET | COLOR OF LASER LIGHT (LD1) | COLOR OF LASER LIGHT (LD2) |
|---|---|---|
| CYAN | RED | GREEN OR BLUE |
| MAGENTA | GREEN | RED OR BLUE |
| YELLOW | BLUE | RED OR GREEN |

LIQUID DROPLET MEASUREMENT APPARATUS AND LIQUID DROPLET MEASUREMENT METHOD

BACKGROUND OF THE INVENTION

1. Field of the Invention

The present invention relates to a liquid droplet measurement apparatus and a liquid droplet measurement method, and more particularly to a liquid droplet measurement apparatus and a liquid droplet measurement method of measuring the volume, velocity and position of a liquid droplet ejected from a print head of a recording apparatus such as an inkjet printer.

2. Description of the Related Art

In the related art, the following inventions have been disclosed as methods and apparatuses for measuring the volume, velocity or position of liquid droplets ejected from a print head.

Japanese Patent Application Publication No. 2006-281714 discloses a method and an apparatus whereby laser light is irradiated onto liquid droplets, the laser light which has passed through the liquid droplets is input to a determination device via a slit, and the volume, velocity or position of the liquid droplets is measured on the basis of the change in the output signal from the determination device.

Japanese Patent Application Publication No. 2005-83769 discloses a method and an apparatus for measuring the volume, velocity or position of liquid droplets by irradiating a plurality of laser light beams in a direction perpendicular to the direction of ejection of the liquid droplets, ejecting liquid droplets between these plurality of laser light beams, and ejecting liquid droplets so as to traverse the plurality of laser light beams.

More specifically, liquid droplets are ejected between a pair of laser light beams, and if a liquid droplet is determined by either of the beams, then it is judged that the liquid droplet has been ejected on a deviated path. Japanese Patent Application Publication No. 2005-83769 also discloses that the amount of deviation and the volume (outer shape) of the liquid droplet are determined by gradually altering the interval between the laser light beams, a small amount at a time. Furthermore, Japanese Patent Application Publication No. 2005-83769 also discloses that a method of judging whether or not there is a large amount of deviation on the basis of whether or not there is a large change in the amount of laser light received, in an example where the interval between the laser light beams is fixed.

However, the intensity of light is not uniform throughout the cross-section of a laser light beam, and there is a light intensity distribution in which the light intensity declines from the central portion of the cross-section toward the outer sides.

Therefore, in Japanese Patent Application Publication No. 2006-281714 and Japanese Patent Application Publication No. 2005-83769, if there is a marked light intensity distribution of this kind, then variation occurs in the measurement results produced by the determination device and it is not possible to measure the characteristics, such as the volume, velocity or position of the liquid droplets, accurately. Furthermore, in Japanese Patent Application Publication No. 2005-83769, it is necessary to adjust the position of the light beam finely in order to measure the volume, and this requires time and labor.

Japanese Patent Application Publication No. 2005-83769 discloses judging that there is a large amount of deviation when there is a large change in the amount of laser light in a case where the interval between the laser light beams is fixed, but it does not give a detailed description of the judgment method used.

Furthermore, in Japanese Patent Application Publication No. 2006-281714, a composition is adopted in which a signal which has passed through a liquid droplet is obtained by placing a slit in the light path, and therefore it is necessary to ensure that the intensity distribution of the light entering into the slit is uniform. If there is an intensity distribution, then this produces error in the determination of the transit timing of the droplet passing the slit. Furthermore, in an inkjet head, in order to measure liquid droplets (and in particular, in order to measure the transit position of the liquid droplet), it is necessary to perform the measurement at the distance where the paper is actually to be positioned, and in general this is 0.5 to 2 mm. However, Japanese Patent Application Publication No. 2006-281714 does not disclose a method of achieving a uniform light intensity distribution at a close position of this kind. Moreover, since the shielding of the light by the slit causes a reduction in the amount (intensity) of light incident on the sensor and thus causes the sensor output to fall, then it is difficult to improve the S/N ratio of the signal. On the other hand, if the width of the slit is enlarged, then the amount of incident light increases and the S/N ratio improves, but in the method described in Japanese Patent Application Publication No. 2006-281714, there is a fall in the accuracy of determining the transit of the liquid droplet.

SUMMARY OF THE INVENTION

The present invention has been contrived in view of these circumstances, an object thereof being to provide a liquid droplet measurement apparatus and a liquid droplet measurement method whereby the light intensity distribution in the cross-section of a laser light beam is adjusted and the laser light beam is radiated onto a liquid droplet to measure a characteristic of the liquid droplet accurately.

In order to attain an object described above, one aspect of the present invention is directed to a liquid droplet measurement apparatus, comprising: a first laser light source emitting a laser light; a first optical device which makes, in terms of a beam cross-section of the laser light, a beam width in a direction perpendicular to a direction of ejection of a liquid droplet, greater than a beam width in the direction of ejection of the liquid droplet, and makes light intensity of the laser light fall within a prescribed range within a range where variation in a position of the liquid droplet occurs in the direction perpendicular to the direction of ejection of the liquid droplet, at a position where the laser light from the first laser light source is irradiated onto the liquid droplet ejected; a first light receiving device which receives the laser light that has been irradiated onto the liquid droplet by the first optical device and generates a determination signal; and a first liquid droplet characteristics calculation device which calculates at least one of a volume of the liquid droplet and a velocity of the liquid droplet, from the determination signal generated by the first light receiving device.

According to this aspect of the invention, since the intensity of the laser light is made to fall within a prescribed range by the first optical device, within a range where variation in the position of the liquid droplet occurs in the direction perpendicular to the direction of ejection of the liquid droplet, then it is possible to eliminate the effects of variation in the position of the liquid droplet caused by deviation in the flight of the liquid droplet, and hence the volume and velocity of the liquid droplet can be measured accurately.

Desirably, the first optical device comprises a cylindrical lens.

According to this aspect of the invention, since the intensity of the laser light is made to fall within a prescribed range by means of a cylindrical lens, within a range where variation in the position of the liquid droplet occurs in the direction perpendicular to the direction of ejection of the liquid droplet, then it is possible to eliminate the effects of variation in the position of the liquid droplet caused by deviation in the flight of the liquid droplet, and hence the volume and velocity of the liquid droplet can be measured accurately.

Desirably, the first optical device comprises a diffusion plate which diffuses the laser light.

According to this aspect of the invention, it is possible to made the intensity of the light uniform in the cross-section of the laser light beam irradiated onto the liquid droplet, by means of a diffusion plate, and therefore the effects of the variation in the position of the liquid droplet caused by deviation in the flight of the liquid droplet are eliminated and the volume and velocity of the liquid droplet can be measured accurately.

Desirably, the first optical device comprises a fly-eye lens which diffuses the laser light.

According to this aspect of the invention, it is possible to made the intensity of the light uniform in the cross-section of the laser light beam irradiated onto the liquid droplet, by means of a fly-eye lens, and therefore the effects of the variation in the position of the liquid droplet caused by deviation in the flight of the liquid droplet are eliminated and the volume and velocity of the liquid droplet can be measured accurately.

Desirably, the liquid droplet measurement apparatus further comprises a second laser light source emitting a laser light; a second optical device which makes light intensity of the laser light in terms of a beam cross-section of the laser light, non-uniform within a range where variation in the position of the liquid droplet occurs in the direction perpendicular to the direction of ejection of the liquid droplet, at a position where the laser light from the second laser light source is irradiated onto the liquid droplet ejected; a second light receiving device which receives the laser light that has been irradiated onto the liquid droplet by the second optical device and generates a determination signal; and a second liquid droplet characteristics calculation device which calculates a position of the liquid droplet from the determination signal generated by the second light receiving device.

According to this aspect of the invention, since the intensity of the laser light is made non-uniform by the second optical device, within a range where variation in the position of the liquid droplet occurs in the direction perpendicular to the direction of ejection of the liquid droplet of the liquid droplet, then it is possible to measure the position of the liquid droplet accurately. It is also possible to measure the volume, velocity and position of the liquid droplet simultaneously.

Desirably, the liquid droplet measurement apparatus, further comprises a light restricting device which restricts the laser light received by the first light receiving device or the second light receiving device.

According to this aspect of the invention, it is possible to measure the volume, velocity and position of the liquid droplet, with a high degree of accuracy.

Desirably, a color of the laser light emitted from the first laser light source or a color of the laser light emitted from the second laser light source is a complementary color with respect to a color of the liquid droplet.

According to this aspect of the invention, it is possible to measure the volume and velocity of the liquid droplet, with a high degree of accuracy.

Desirably, the laser light emitted from the first laser light source and the laser light emitted from the second laser light source have different wavelengths.

According to this aspect of the invention, it is also possible to measure the volume, velocity and position of the liquid droplet simultaneously, in a more reliable fashion.

Desirably, the laser light emitted from the first laser light source and the laser light emitted from the second laser light source have different planes of polarization.

According to this aspect of the invention, it is also possible to measure the volume, velocity and position of the liquid droplet simultaneously, in a more reliable fashion.

In order to attain an object described above, another aspect of the present invention is directed to a liquid droplet measurement method, comprising the steps of: emitting a laser light from a first laser light source onto a liquid droplet in a state where light intensity of the laser light in terms of a beam cross-section of the laser light is made to fall within a prescribed range, within a range where variation in a position of the liquid droplet occurs in a direction perpendicular to a direction of ejection of the liquid droplet, at a position where the laser light is irradiated onto the liquid droplet ejected; receiving the laser light that has been irradiated onto the liquid droplet; and calculating at least one of a volume of the liquid droplet and a velocity of the liquid droplet.

According to this aspect of the invention, since the intensity of the laser light is made to fall within a prescribed range, within a range where variation in the position of the liquid droplet occurs in the direction perpendicular to the direction of ejection of the liquid droplet, then it is possible to eliminate the effects of variation in the position of the liquid droplet caused by deviation in the flight of the liquid droplet, and hence the volume and velocity of the liquid droplet can be measured accurately.

Desirably, the liquid droplet measurement method comprises: the time interval measurement step of measuring a temporal change in a value of a determination signal generated by receiving the laser light that has been irradiated onto the liquid droplet, and measuring a time interval from a time at which ejection of the liquid droplet is driven until a time at which the value of the determination signal changes by a prescribed amount; and the velocity calculation step of calculating the velocity of the liquid droplet from a correlation between the time interval and the velocity of the liquid droplet.

Desirably, the liquid droplet measurement method comprises: the maximum change measurement step of measuring a temporal change in a value of a determination signal generated by receiving the laser light that has been irradiated onto the liquid droplet, and measuring a maximum amount of change in the value of the determination signal; and the volume calculation step of calculating a volume of the liquid droplet from a correlation between the maximum amount of change and the volume of the liquid droplet.

In order to attain an object described above, another aspect of the present invention is directed to a liquid droplet measurement apparatus, comprising: a laser light source emitting a laser light; an optical device which makes light intensity of the laser light in terms of a beam cross-section of the laser light, non-uniform within a range where variation in a position of a liquid droplet occurs in a direction perpendicular to a direction of ejection of the liquid droplet, at a position where the laser light from the laser light source is irradiated onto the liquid droplet ejected; a light receiving device which receives the laser light that has been irradiated onto the liquid droplet by the optical device and generates a determination signal; a liquid droplet ejection position changing device which changes a relative position of the light receiving device with respect to the liquid droplet; and a liquid droplet position calculation device which calculates a position of the liquid droplet from the plurality of determination signals generated respectively at the relative positions of the light receiving device with respect to the liquid droplet changed by the liquid droplet ejection position changing device.

According to this aspect of the invention, it is possible to calculate the position of the liquid droplet with a high degree of accuracy, from a plurality of determination signals.

Desirably, the liquid droplet position calculation device uses an interpolation function to calculate the position of the liquid droplet, the interpolation function having coefficients obtained by a least square method from coordinate values of the plurality of determination signals, in a coordinate system which indicates a relationship between coordinate values of the relative positions and the coordinate values of the plurality of determination signals.

According to this aspect of the invention, it is possible to shorten the measurement time of the position of the liquid droplet.

Desirably, the liquid droplet position calculation device selects one of a quadratic function and a cubic function as the interpolation function, in accordance with the coordinate values of the plurality of determination signals.

According to this aspect of the invention, it is possible to raise the measurement accuracy of the position of the liquid droplet.

Desirably, taking the coordinate values of the plurality of determination signals to be IS1, IS2, and IS3, in order from the highest absolute value, and taking the coordinate values of the relative positions when the coordinate values IS1, IS2, and IS3 of the plurality of determination signals are determined, to be XS1, XS2, and XS3, the liquid droplet position calculation device selects the cubic function as the interpolation function when relationship of $\{(IS1-IS2)/|XS1-XS2|>(IS2-IS3)/|XS2-XS3|\}$ is established, and selects the quadratic function as the interpolation function when relationship of $\{(IS1-IS2)/|XS1-XS2|\leq(IS2-IS3)/|XS2-XS3|\}$ is established.

According to this aspect of the invention, it is possible to raise the measurement accuracy of the position of the liquid droplet, in a more reliable fashion.

Desirably, when the relationship $\{(IS1-IS2)/|XS1-XS2|\leq(IS2-IS3)/|XS2-XS3|\}$ is established and the quadratic function is selected as the interpolation function, the liquid droplet position calculation device determines the coefficients of the interpolation function by a least square method, from the four highest coordinate values which have high absolute values, of the coordinate values of the plurality of determination signals.

According to this aspect of the invention, it is possible to raise the measurement accuracy of the position of the liquid droplet, in a more reliable fashion.

In order to attain an object described above, another aspect of the present invention is directed to a liquid droplet measurement method, comprising the steps of: emitting a laser light from a laser light source onto a liquid droplet in a state where light intensity of the laser light in terms of a beam cross-section of the laser light is made to be non-uniform within a range where variation in a position of the liquid droplet occurs in a direction perpendicular to a direction of ejection of the liquid droplet, at a position where the laser light is irradiated onto the liquid droplet ejected; changing a relative position of a light receiving device which receives the laser light that has been irradiated onto the liquid droplet, with respect to the liquid droplet; and calculating a position of the liquid droplet from a plurality of determination signals generated by the light receiving device.

In order to attain an object described above, another aspect of the present invention is directed to a liquid droplet measurement apparatus, comprising: a determination device which determines a liquid droplet ejected and generates a plurality of determination signals; a liquid droplet ejection position changing device which changes a relative position of the determination device with respect to the liquid droplet; and a liquid droplet position calculation device which calculates a position of the liquid droplet from the plurality of determination signals generated by the determination device respectively at the plurality of relative positions of the determination device with respect to the liquid droplet changed by the liquid droplet ejection position changing device.

According to this aspect of the invention, it is possible to calculate the position of the liquid droplet with a high degree of accuracy, from a plurality of determination signals.

Desirably, the liquid droplet position calculation device uses an interpolation function to calculate the position of the liquid droplet, the interpolation function having coefficients obtained by a least square method from coordinate values of the plurality of determination signals, in a coordinate system which indicates a relationship between coordinate values of the plurality of relative positions and the coordinate values of the plurality of determination signals.

According to this aspect of the invention, it is possible to shorten the measurement time of the position of the liquid droplet.

Desirably, the liquid droplet position calculation device selects one of a quadratic function and a cubic function as the interpolation function, in accordance with the values of the plurality of determination signals.

According to this aspect of the invention, it is possible to raise the measurement accuracy of the position of the liquid droplet.

Desirably, taking the coordinate values of the plurality of determination signals to be IS1, IS2, and IS3, in order from the highest absolute value, and taking the coordinate values of the relative positions when the coordinate values IS1, IS2, and IS3 of the plurality of determination signals are determined, to be XS1, XS2, and XS3, the liquid droplet position calculation device selects the cubic function as the interpolation function when the relationship $\{(IS1-IS2)/|XS1-XS2|>(IS2-IS3)/|XS2-XS3|\}$ is established, and selects the quadratic function as the interpolation function when the relationship $\{(IS1-IS2)/|XS1-XS2|\leq(IS2-IS3)/|XS2-XS3|\}$ is established.

According to this aspect of the invention, it is possible to raise the measurement accuracy of the position of the liquid droplet, in a more reliable fashion.

Desirably, when there are the five coordinate values of the plurality of determination signals, the relationship $\{(IS1-IS2)/|XS1-XS2|\leq(IS2-IS3)/|XS2-XS3|\}$ is establish and the quadratic function is selected as the interpolation function, then the liquid droplet position calculation device determines the coefficients of the interpolation function by a least square method, from the four highest coordinate values which have high absolute values.

According to this aspect of the invention, it is possible to raise the measurement accuracy of the position of the liquid droplet, in a more reliable fashion.

In order to attain an object described above, another aspect of the present invention is directed to a liquid droplet measurement method, comprising the steps of: changing a relative position of a determination device which determines a liquid droplet ejected, with respect to the liquid droplet; and calculating a position of the liquid droplet from a plurality of determination signals generated by the determination device.

According to the present invention, it is possible to measure the volume, velocity and position of a liquid droplet accurately, by adjusting the intensity distribution of light in terms of the cross-section of a laser light beam and irradiating same onto a liquid droplet.

BRIEF DESCRIPTION OF THE DRAWINGS

The nature of this invention, as well as other objects and benefits thereof, will be explained in the following with reference to the accompanying drawings, in which like reference characters designate the same or similar parts throughout the figures and wherein:

FIG. 1A is a front view and FIG. 1B is a lower side view;

FIGS. 13A and 13B are diagrams showing the relationship between the color of the liquid droplet and the color of the laser light;

FIG. 14A is a front view and FIG. 14B is a lower side view;

FIG. 18A is a front view and FIG. 18B is a lower side view;

DETAILED DESCRIPTION OF THE PREFERRED EMBODIMENTS

Description of Liquid Droplet Measurement Apparatus
First Embodiment

Figure 1A:
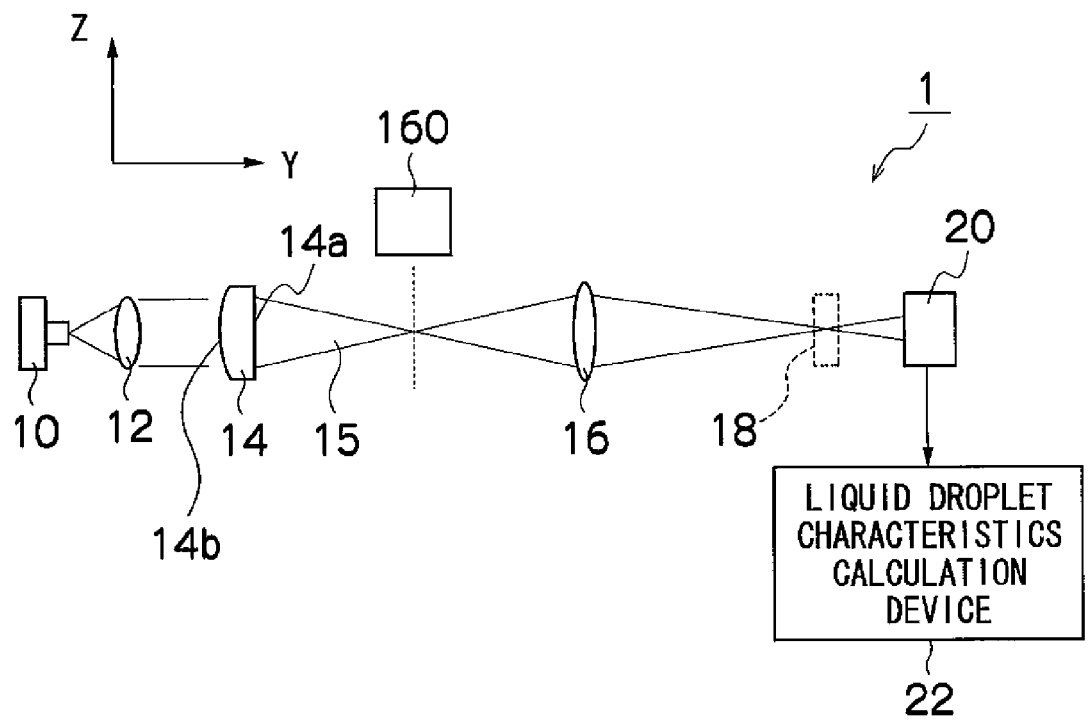
FIGS. 1A and 1B are schematic drawings showing the general composition of a liquid droplet measurement apparatus 1 according to a first embodiment.
Figure 1B:
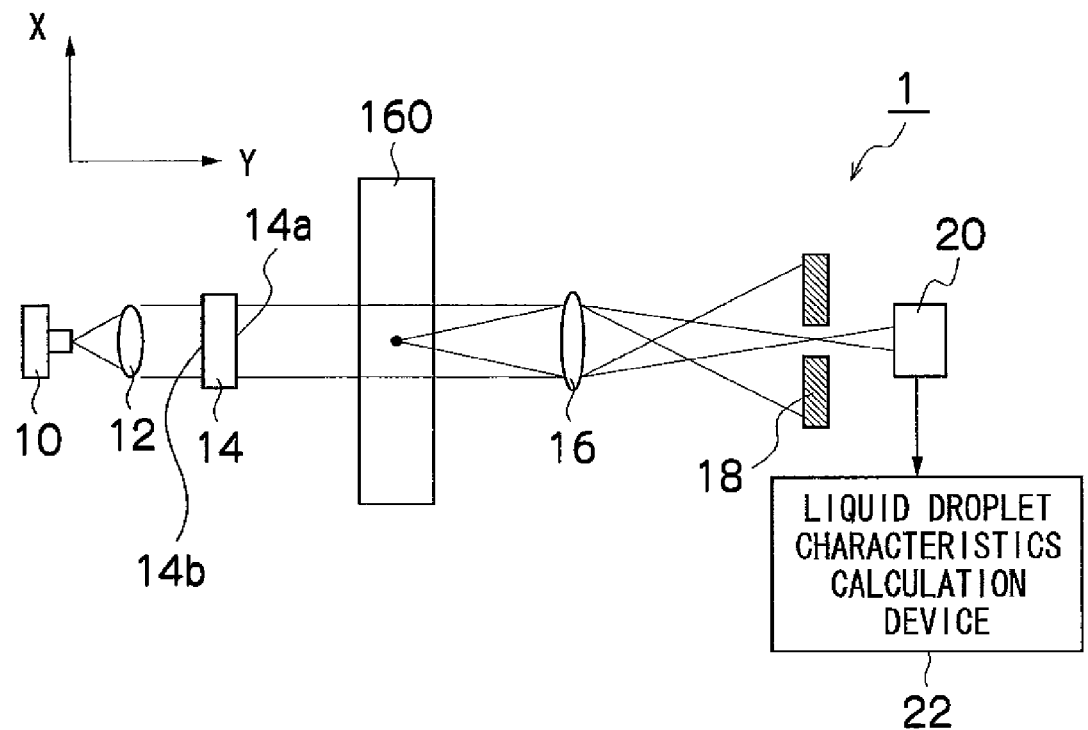

FIGS. 1A and 1B are schematic drawings of a liquid droplet measurement apparatus 1 according to a first embodiment; FIG. 1A is a front view and FIG. 1B is a lower side view. As illustrated in FIGS. 1A and 1B, the liquid droplet measurement apparatus 1 according to an embodiment of the present invention comprises a laser light source 10 (first laser light source), a first optical device, a first photoreceptor device and a liquid droplet characteristics calculation device 22, and the like.

The laser light source 10 may use, apart from the semiconductor laser light source (LD light source), a solid laser light source, a liquid laser light source, a gas laser light source, or the like, but in the present embodiment, a semiconductor laser light source (LD light source) is used. The reason for this is that it allows the apparatus to be made smaller in size, as well as reducing the related costs.

The laser light source 10 is disposed in such a manner that the direction horizontal to the bonding surface thereof coincides with the direction of ejection of the liquid droplets illustrated in FIG. 1A (the Z axis direction). By this means, it is possible to achieve a small broadening angle of the laser light in the direction of ejection of the liquid droplets (the Z axis direction), and hence a Gaussian beam which is free of any shielded regions can be obtained.

On the other hand, in the direction which is perpendicular to the direction of ejection of the liquid droplets illustrated in FIG. 1B, namely in the X axis direction), the broadening angle of the laser light is larger and side lobes occur due to the shielding effect. However, in the measurement of the volume, velocity or position of liquid droplets according to the present embodiment, the portions of the cross-section of the laser light beam where side lobes occur are not used, and therefore no problems arise in this respect. Therefore, it is possible to measure the volume, velocity and position of the liquid droplets accurately, without being affected by side lobes.

The first optical device comprises a collimating lens 12, a cylindrical lens 14, and a spherical lens 16, provided in this order from the laser light source 10 side. The first photoreceptor device is constituted by a photodiode 20. In FIGS. 1A and 1B, a slit 18 (light restricting device) is provided between the first optical device and the first photoreceptor device, but a configuration in which a slit 18 is not provided can also be conceived.

In the planar view illustrated in FIG. 1A, the side face 14a of the cylindrical lens 14 when observed in plan view faces toward the ejection position of the liquid droplet, and the curved side face 14b faces toward the laser light source 10, while the generatrix is situated perpendicularly to the plane of the drawing. The cylindrical lens 14 is disposed in such a manner that laser light which is incident thereon from the laser light source 10 and via the collimating lens 12 is condensed and irradiated onto the position where liquid droplets are ejected.

The spherical lens 16 in the plane illustrated in FIG. 1A is disposed in such a manner that the beam 15 of laser light which has passed through the position where the liquid droplet is ejected is condensed at the position of the slit 18 and forms an image of the liquid droplet.

On the other hand, in the plane illustrated in FIG. 1B, the generatrix of the cylindrical lens 14 is parallel to the plane of the drawing, and the refractive power of the cylindrical lens 14 is zero in the plane illustrated in FIG. 1B. Consequently, in the plane illustrated in FIG. 1B, after the laser light incident from the laser light source 10 via the collimating lens 12 exits from the cylindrical lens 14, it proceeds while maintaining the width at the time of exiting from the collimating lens 12.

The liquid droplet characteristics calculation device 22 is a device which is capable of calculating the volume, velocity and position of liquid droplets on the basis of the output signals (determination signals) that the photodiode 20 generates based on receiving of the laser light.

Furthermore, FIGS. 1A and 1B show a state where a liquid droplet is ejected from the print head 160 between the cylindrical lens 14 and the spherical lens 16. Here, this print head 160 may be mounted in an image forming apparatus, such as an inkjet printer. In this case, the liquid droplet measurement apparatus 1 may be disposed in a section of a print head unit 160 of the image forming apparatus (a print head unit 150 described below). Furthermore, the liquid droplet measurement apparatus I may be one constituent apparatus of an image forming system, as an example of a separate apparatus from the image forming apparatus. In FIG. 1B, liquid droplets are ejected toward near side of the plane of the drawing, in a direction perpendicular to the plane of the drawing, from nozzles of the print head 160.

The liquid droplet measurement apparatus 1 composed as described above has the following actions. The laser light emitted from the laser light source 10 enters the cylindrical lens 14 via the collimating lens 12. The cylindrical lens 14 has characteristics whereby it has a curvature in the direction of ejection of the liquid droplets which are ejected from the print head 160 (Z axis direction), but does not have a curvature in the direction perpendicular to the direction of ejection of the liquid droplets (X axis direction).

The laser light incident into the cylindrical lens 14 is condensed in terms of the direction of ejection of the liquid droplets (Z axis direction), where the lens has a curvature. By adjusting the curvature of the cylindrical lens 14, and/or the distance between the cylindrical lens 14 and the print head 160, and the like, the condensed laser light is irradiated onto liquid droplets ejected from the print head 160, as illustrated in FIG. 1A.

The laser light which has been irradiated onto a liquid droplet is condensed by the spherical lens 16 so as to form an image of the liquid droplet at the position of the slit 18. After being condensed, the light is received by the photodiode 20.

The photodiode 20 which has received light supplies an output signal to the liquid droplet characteristics calculation device 22. In the liquid droplet characteristics calculation device 22, the volume and velocity of the liquid droplet is calculated on the basis of this output signal.

Here, the method of calculating the volume and velocity of the liquid droplet employed in the liquid droplet characteristics calculation device 22 will be described. Here, FIG. 2A shows an output voltage waveform from the photodiode 20 which indicates the temporal change in the value of the output voltage (determination signal) generated by the reception of laser light in a case where a single liquid droplet is ejected and the laser light is irradiated onto this liquid droplet and FIG. 2B shows a drive waveform for ejecting a liquid 1s droplet in the print head 160.

Figure 2A:
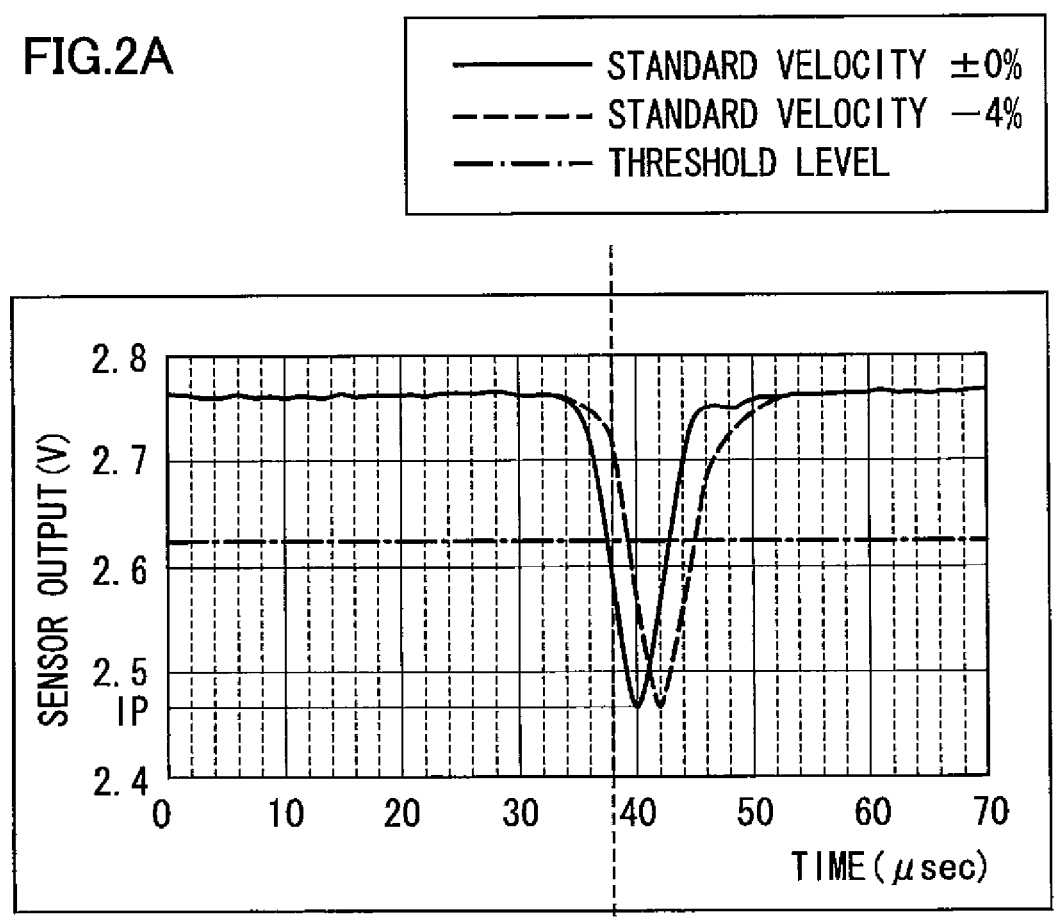
FIG. 2A is an output voltage waveform diagram of a photodiode.
Figure 2B:
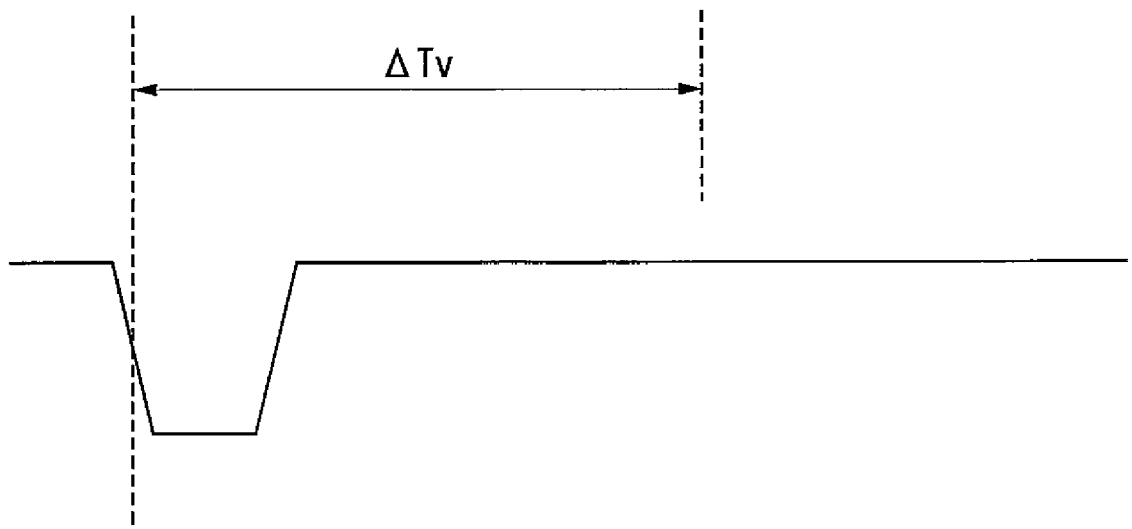
FIG. 2B is a diagram of a liquid droplet ejection drive waveform in a print head.

In calculating the velocity of a liquid droplet, firstly, as illustrated in FIGS. 2A and 2B, the time interval $\Delta Tv$ between the drive portion of the drive waveform for ejecting a liquid droplet (the time where liquid droplet ejection driving is performed) and the dip portion of the output voltage waveform of the photodiode 20 (the time where the value of the output voltage changes by a prescribed amount), is measured. In FIGS. 2A and 2B, the threshold level is set to the output voltage value when it becomes 50% of the amount of dip, and the time interval $\Delta Tv$ until the output voltage value becomes 50% of the amount of dip is measured. Thereupon, the velocity V of the liquid droplet is determined from the measured time interval $\Delta Tv$, on the basis of a previously created look-up table or correctional formula which indicates the correlation between the time interval $\Delta Tv$ and the velocity V of a liquid droplet.

Figure 3A:
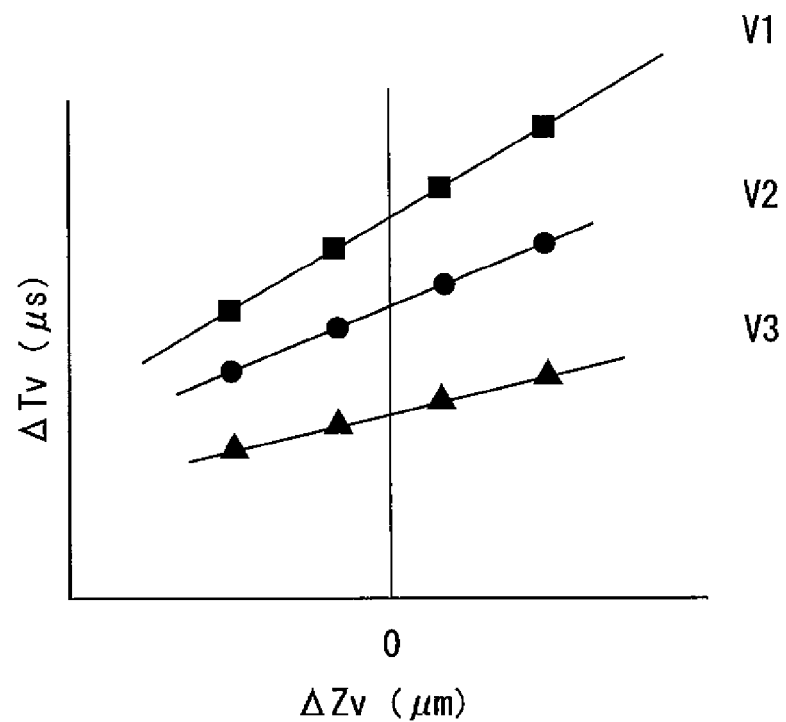
FIG. 3A is a graph of the relationship between the amount of movement of laser light ΔZv and the time interval ΔTv.
Figure 3B:
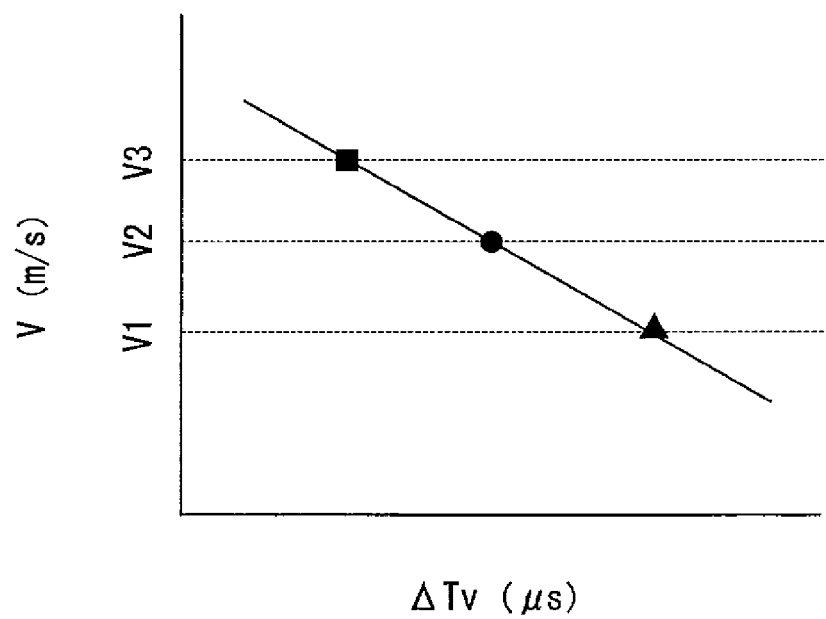
FIG. 3B is a graph of the relationship between the time interval ΔTv and the velocity V of the liquid droplet.

The relationship between the time interval $\Delta Tv$ and the velocity V of the liquid droplet can be determined in the following manner. Firstly, liquid droplets are ejected continuously from one nozzle, and the time interval $\Delta Tv$ is measured at a position where the laser light is moved in the direction of ejection of the liquid droplet (Z axis direction) from a reference position used for the measurement of the velocity of the liquid droplet. Here, this amount of movement of the laser light, $\Delta Zv$, can be determined on the basis of the feed amount of a high-precision stage on which the laser light source is mounted, or by measurement using a laser displacement meter. The velocity V of the liquid droplet is calculated by the least square method, or the like, from the relationship between the amount $\Delta Zv$ of movement of the laser light and the time interval $\Delta Tv$ (FIG. 3A). Thereupon, the relationship between the time interval $\Delta Tv$ and the velocity V of the liquid droplet (FIG. 3B) is determined by calculating the velocity V of the liquid droplet while changing the time interval $\Delta Tv$.

Thereupon, in calculating the volume of the liquid droplet, firstly, as illustrated in FIGS. 2A and 2B, the maximum amount of dip Ip of the output voltage waveform (maximum amount of change in the value of the output voltage) in the photodiode 20 is measured. Next, the volume Vol of the liquid droplet is determined from the maximum amount of dip Ip in the measured output voltage waveform, on the basis of the previously created look-up table or correctional formula which indicates the correlation between the maximum amount of dip Ip in the output voltage waveform and the volume Vol of the liquid droplet.

The relationship between the maximum amount of dip Ip of the output voltage is waveform and the volume Vol of the liquid droplet can be determined as described below. Firstly, the ejection volume of the liquid droplet when using a non-volatile ink is measured by ejecting the ejection volume of a large number of liquid droplets, for example, approximately 106 droplets, and measuring the mass of the liquid droplet reservoir. Apart from measuring the mass of the liquid droplet reservoir directly, it is also possible to evaluate the mass from the amount of reduction of the ink in the ink tank for supply to the head which ejects liquid droplets. Furthermore, the average value of the maximum amount of dip Ip of the output voltage waveform for each liquid droplet is measured when this plurality of liquid droplets are ejected. Thereupon, by measuring the average value of the maximum amount of dip Ip while changing the ejection volume of the liquid droplets, the relationship between the maximum amount of dip Ip of the output voltage waveform and the volume Vol of the liquid droplet is determined.

Figure 4A:
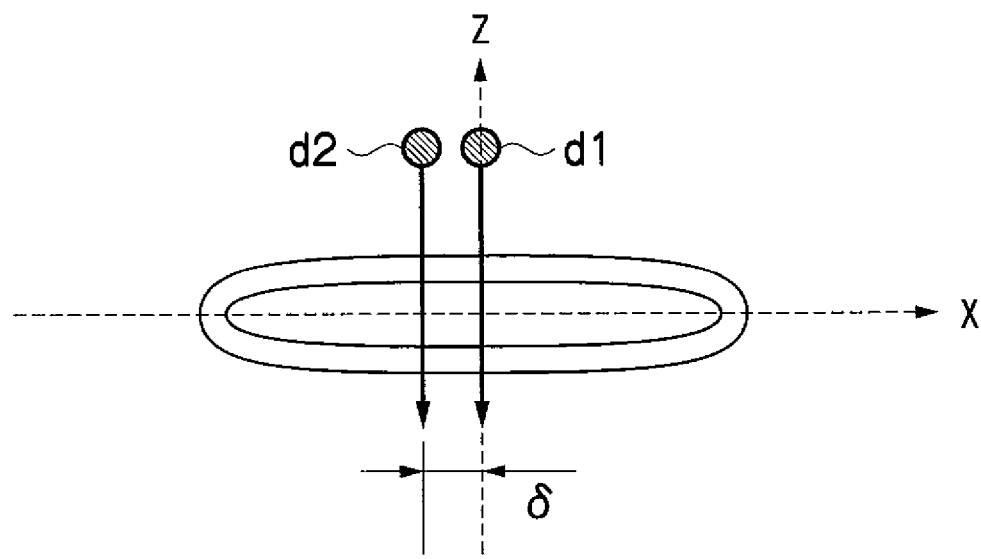
FIGS. 4A and 4B show the intensity distribution of a laser light received by a photoreceptor device.
Figure 4B:
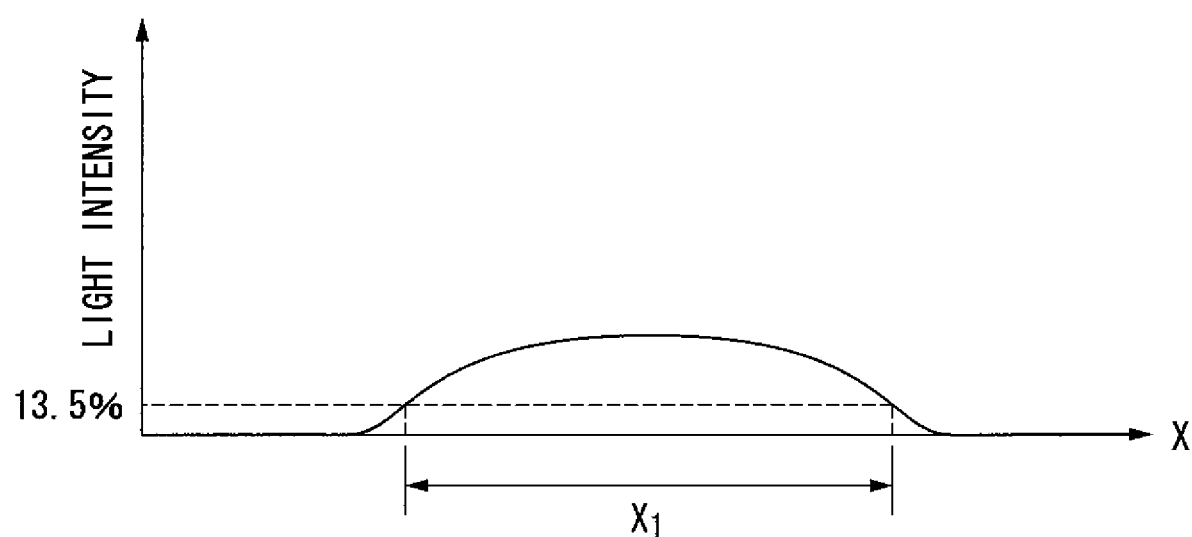

Here, FIGS. 4A and 4B show the light intensity distribution in the cross-section of the laser light beam which has been condensed for irradiation onto the liquid droplet, at the position where it is irradiated onto the liquid droplet. As illustrated in FIG. 4A, due to the action of the cylindrical lens 14, in the cross-section of the beam of laser light, the beam width in the direction perpendicular to the direction of ejection of the liquid droplet (X axis direction) becomes greater than the beam width in the direction of ejection of the liquid droplet (Z axis direction), and the light intensity distribution in the direction of ejection of the liquid droplet (Z axis direction) is narrowed with respect to that in the direction perpendicular to the direction of ejection of the liquid droplet (X axis direction). FIG. 4B shows a graph depicting the light intensity in respect of the direction perpendicular to the direction of ejection of the liquid droplet (X axis direction). As illustrated in FIG. 4B, in the beam width range X1 in the X axis direction, the amount of change in the light intensity with respect to the change in the position in the X axis direction is extremely small due to the action of the cylindrical lens 14. Therefore, the value of the light intensity falls within a small range within the beam width range of X1 in the direction of the X axis.

Therefore, a case is described where, as illustrated in FIG. 4A, a first liquid droplet d1 and a second liquid droplet d2 are ejected at respectively staggered ejection timings. The first liquid droplet d1 and the second liquid droplet d2 both have the same volume and the same velocity. The first liquid droplet d1 is ejected at an ideal ejection position and the second liquid droplet d2 is ejected as a position separated by a distance of δ from the ejection position of the first liquid droplet d1, in the direction perpendicular to the direction of ejection of the liquid droplet (X axis direction). Here, it is supposed that the second liquid droplet d2 is ejected in a state where there is deviation in flight due to a reason such as soiling of the nozzle section of the print head 160, for example.

Figure 5A:
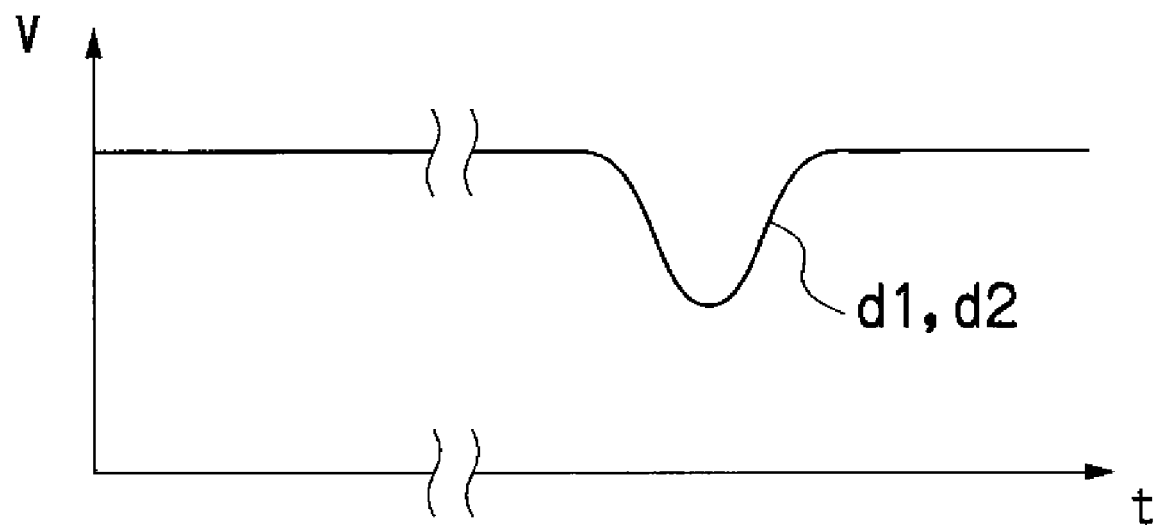
FIGS. 5A and 5B show the waveform of the output signal of a photosensor, and the ejection drive waveform, when a first liquid droplet and a second liquid droplet are ejected.
Figure 5B:
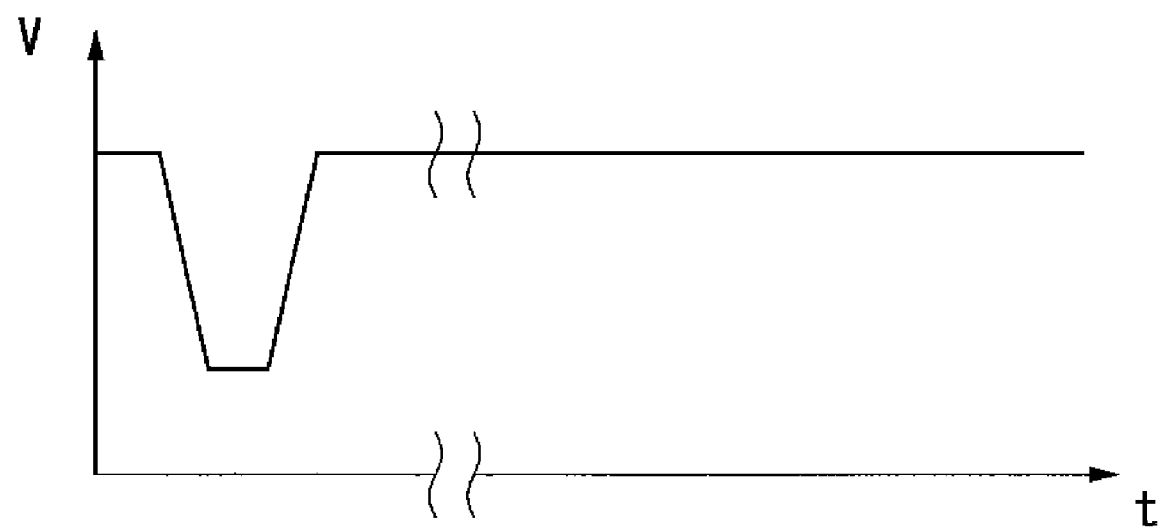

FIG. 5A shows a joint depiction of the respective time axes of the time axis waveforms of the voltage value of an output signal from the photodiode 20 when the first liquid droplet d1 is ejected and when the second liquid droplet d2 is ejected, in which the time axes of the respective the waveforms are joined. FIG. 5B shows the ejection drive waveform of a liquid droplet from the print head 160, when the first liquid droplet d1 is ejected and when the second liquid droplet d2 is ejected.

As illustrated in FIG. 5A, when the first liquid droplet d1 is ejected and when the second liquid droplet d2 is ejected, the amount of dip in the output voltage waveform in the photodiode 20 is substantially the same, and the timing of the dip in the output voltage waveform is also substantially the same. This means that, even if liquid droplets having the same volume and the same velocity are ejected toward positions which are separated by a distance of δ, the volume and velocity can still be measured accurately, irrespective of the variation in the ejection position.

The reason why the volume and velocity can be measured accurately in this way irrespective of the variation in the ejection position are as described below. As illustrated in FIG. 4A, in the liquid droplet measurement apparatus 1 according to the present embodiment, due to the action of the cylindrical lens 14, the light intensity distribution in the cross-section of the laser light beam which is irradiated onto the liquid droplet is narrowed in the direction of ejection of the liquid droplet (Z axis direction). Consequently, at the ejection position of the first liquid droplet d1 in terms of the direction perpendicular to the direction of ejection of the liquid droplet (X axis direction) and the ejection position of the second liquid droplet d2 which has suffered deviation of flight, the intensity of the laser light falls within a prescribed range which does not affect the measurement of the volume and the velocity of the liquid droplet.

By making the intensity of the laser light fall within a prescribed range which does not affect the measurement of the volume and velocity of the liquid droplet, within a range where variation in the ejection positions of the liquid droplets occurs due to deviation of flight in the direction perpendicular to the direction of ejection of the liquid droplet (X axis direction), then it is possible to measure the volume and velocity of the liquid droplet accurately, even if deviation in the flight of the liquid droplet occurs.

Here, when making the intensity of the laser light fall within a prescribed range, a desirable range for the prescribed range is one where measurement of the liquid droplet volume is possible in units of 1% of the ideal volume, and measurement of the liquid droplet velocity is possible in units of 1%. The ideal volume of the liquid droplet is a volume of 0.5 pl to 15 pl at a diameter of 10 μm to 30 μm.

Here, the specific conditions for enabling measurement in units of 1% of the ideal volume of the liquid droplet will be considered. For this purpose, the applicants carried out examinations by simulation using the following method.

Figure 6A:
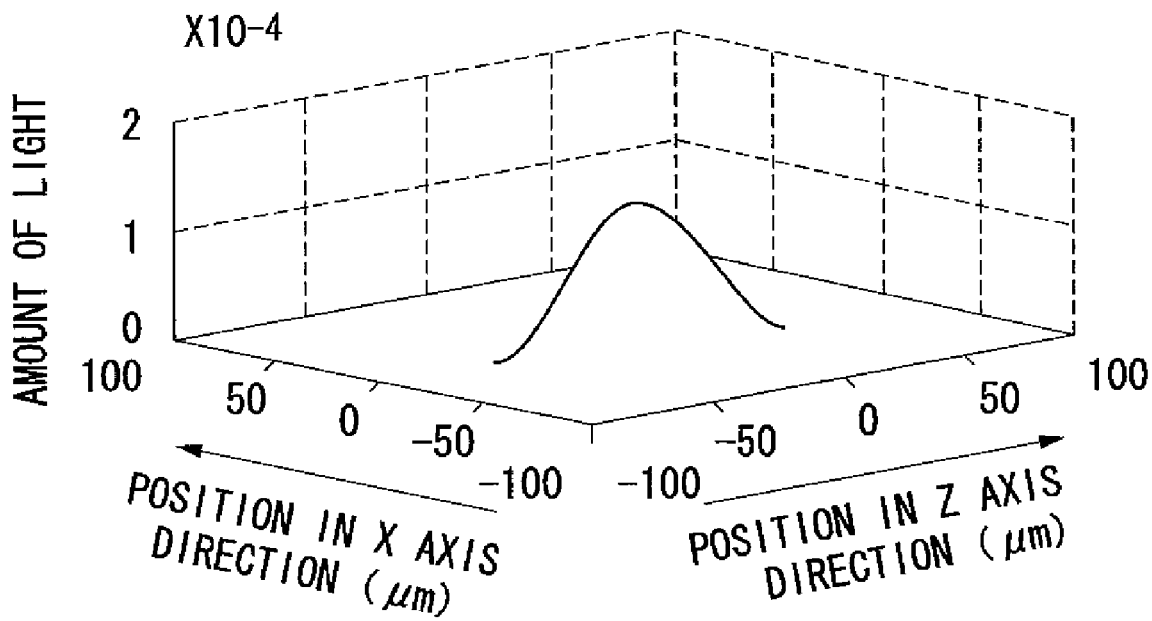
FIGS. 6A and 6B show the Gaussian beam profile (the light distribution of the Gaussian beam) used in simulation.
Figure 6B:
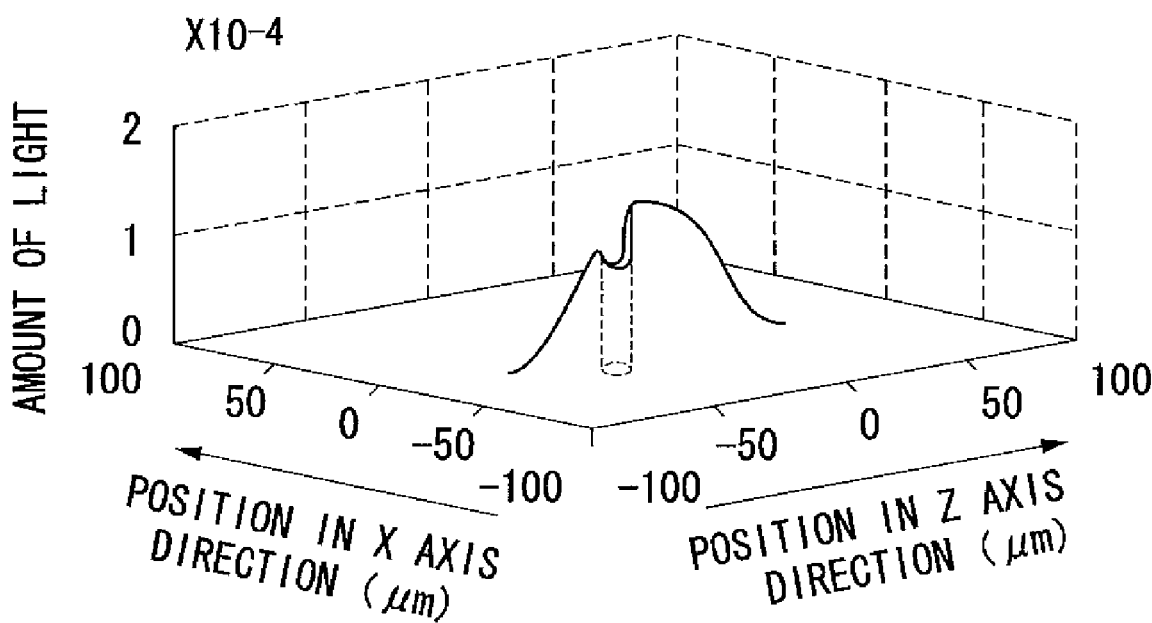

FIGS. 6A and 6B show the Gaussian beam profile (the light distribution of the Gaussian beam) used in the simulation. FIG. 6A shows a state where the Gaussian beam is not shielded by a liquid droplet, and FIG. 6B shows a state where the Gaussian beam is shielded by a 2 pl liquid droplet. FIGS. 6A and 6B show examples of a case where the beam width of the Gaussian beam is 100 μm in the X axis direction and 40 μm in the Z axis direction.

Figure 7:
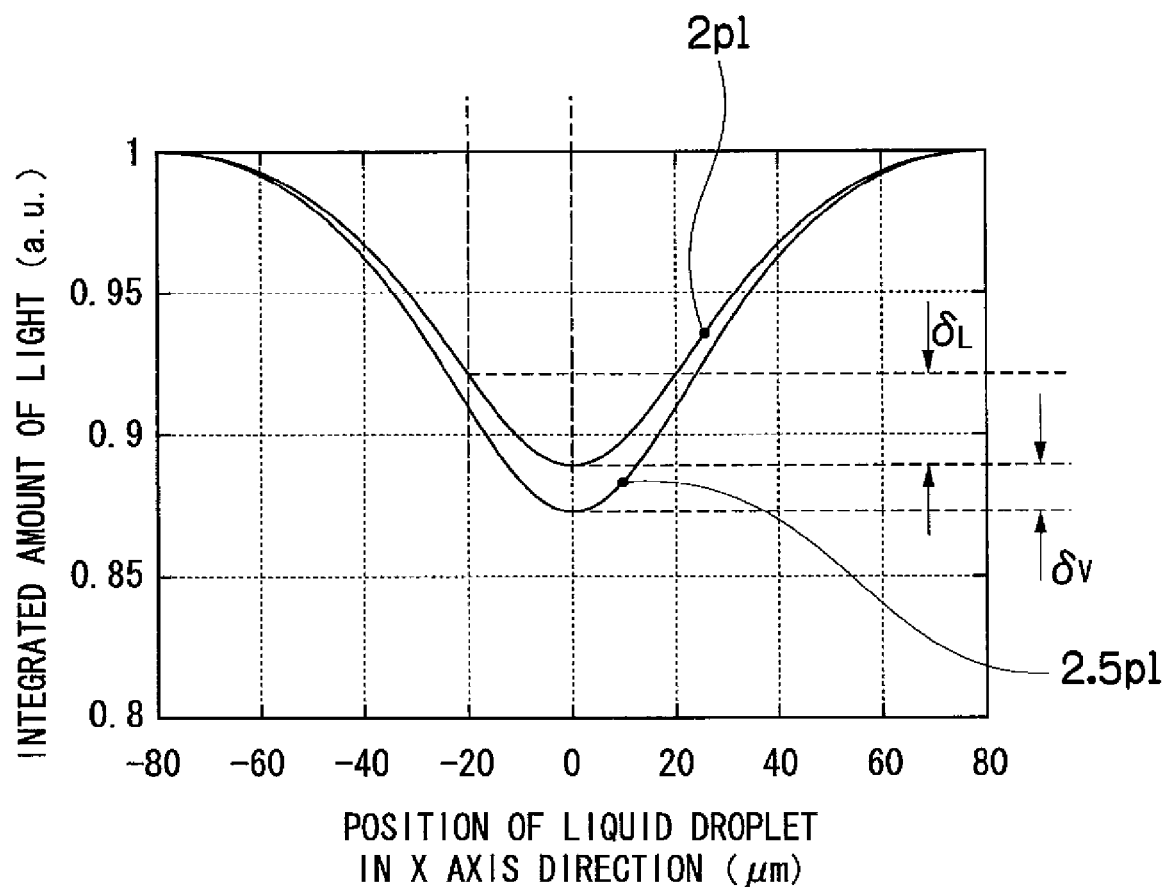
FIG. 7 shows the simulation results for the amount of light against the liquid droplet position in the X axis direction.

FIG. 7 shows the results of simulation using the Gaussian profile illustrated in FIGS. 6A and 6B obtained by plotting the ejection position (μm) of the liquid droplet in the X axis direction against the horizontal axis and plotting the integrated amount of light (quantity of light; luminous energy) (a.u.) derived by integrating the amount of light in the light intensity distribution against the vertical axis. FIG. 7 shows one example of the simulation results for two liquid droplet volumes, namely, liquid droplet volumes of 2 pl and 2.5 pl. In this case, in FIG. 7, the difference in the amount of light when the variation in the X axis direction of the ejection position of the liquid droplet having a volume of 2 pl is 20 µm (namely, the difference in the amount of light obtained by comparing the liquid droplet ejection positions of 0 µm and −20 µm in X axis) is expressed as δL, and the difference in the amount of light due to variation in the volume of the droplet (the two different liquid droplet volumes) is expressed as δV.

FIG. 8 to FIG. 11 show the results of the simulation described above for different variations of the liquid droplet volume and the ejection position of the liquid droplet, by plotting the beam width (µm) in the X axis direction against the horizontal axis and plotting the difference in the amount of light (%) against the vertical axis. FIG. 8 to FIG. 11 show results where the reference values of the liquid droplet volumes for achieving the respective ideal liquid droplet volumes are taken to be 20 pl and 2 pl, and where the variations in the liquid droplet volume are taken to be ±1% and ±2% with respect to the ideal liquid droplet volume. For example, when a high-quality inkjet printer is considered, the variation in the volume of the liquid droplet must be equal to or less than 1% of the ideal volume. For this reason, the variation in the volume of the liquid droplet was set to ±1% and ±2% with respect to the ideal volume of the liquid droplet, as a condition of the examination.

Furthermore, at the same time, FIG. 8 to FIG. 11 also show the results in cases where the ejection positions of the liquid droplets are staggered respectively by 20 µm and 30 µm with respect to the ideal ejection position of the liquid droplet which forms the reference position. For example, considering an inkjet printer operating at 600 dpi or 1200 dpi, in general, it is a required characteristic of the print head that the variation in the ejection position due to deviation of flight must be equal to or less than 20 µm. Therefore, it was set as a condition of the examination that the variation in the ejection position of the liquid droplet was to be 20 µm and 30 µm with respect to the ideal ejection position.

Figure 8:
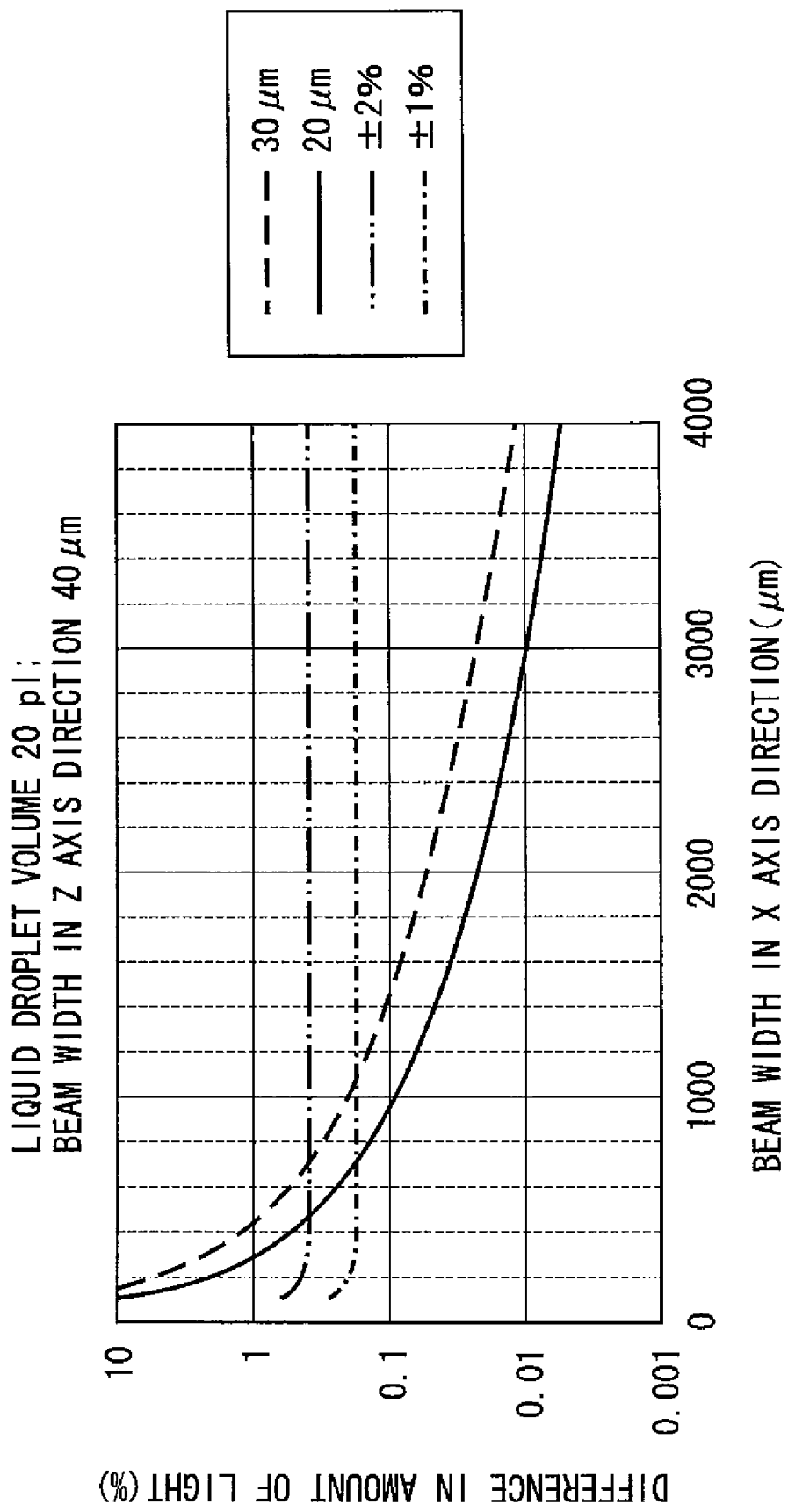
FIG. 8 is a diagram showing the results of corroboration by simulation when the beam width (diameter) in the Z axis direction is 40 μm and the liquid droplet volume is 20 pl.
Figure 9:
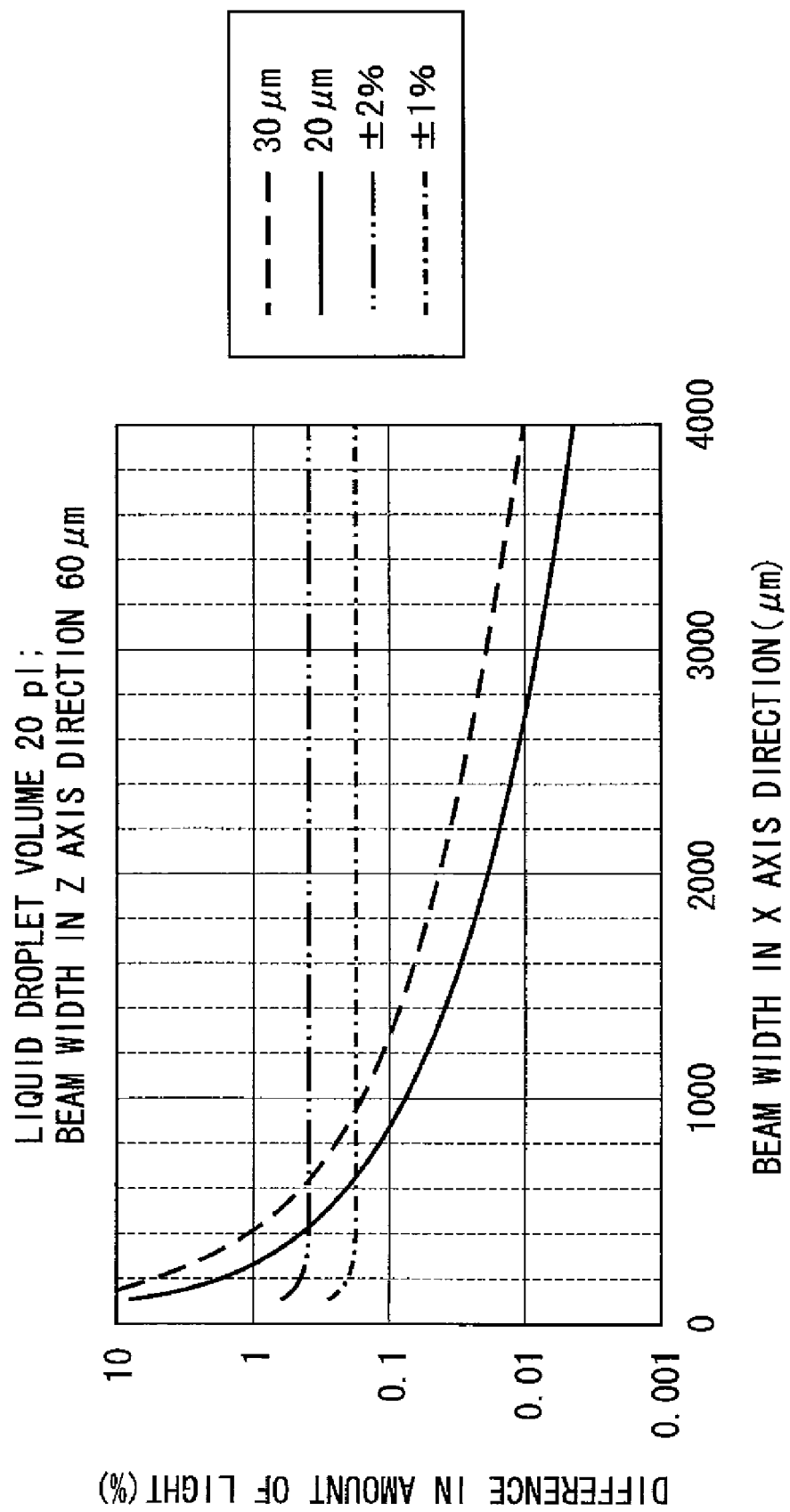
FIG. 9 is a diagram showing the results of corroboration by simulation when the beam width in the Z axis direction is 60 μm and the liquid droplet volume is 20 pl.
Figure 10:
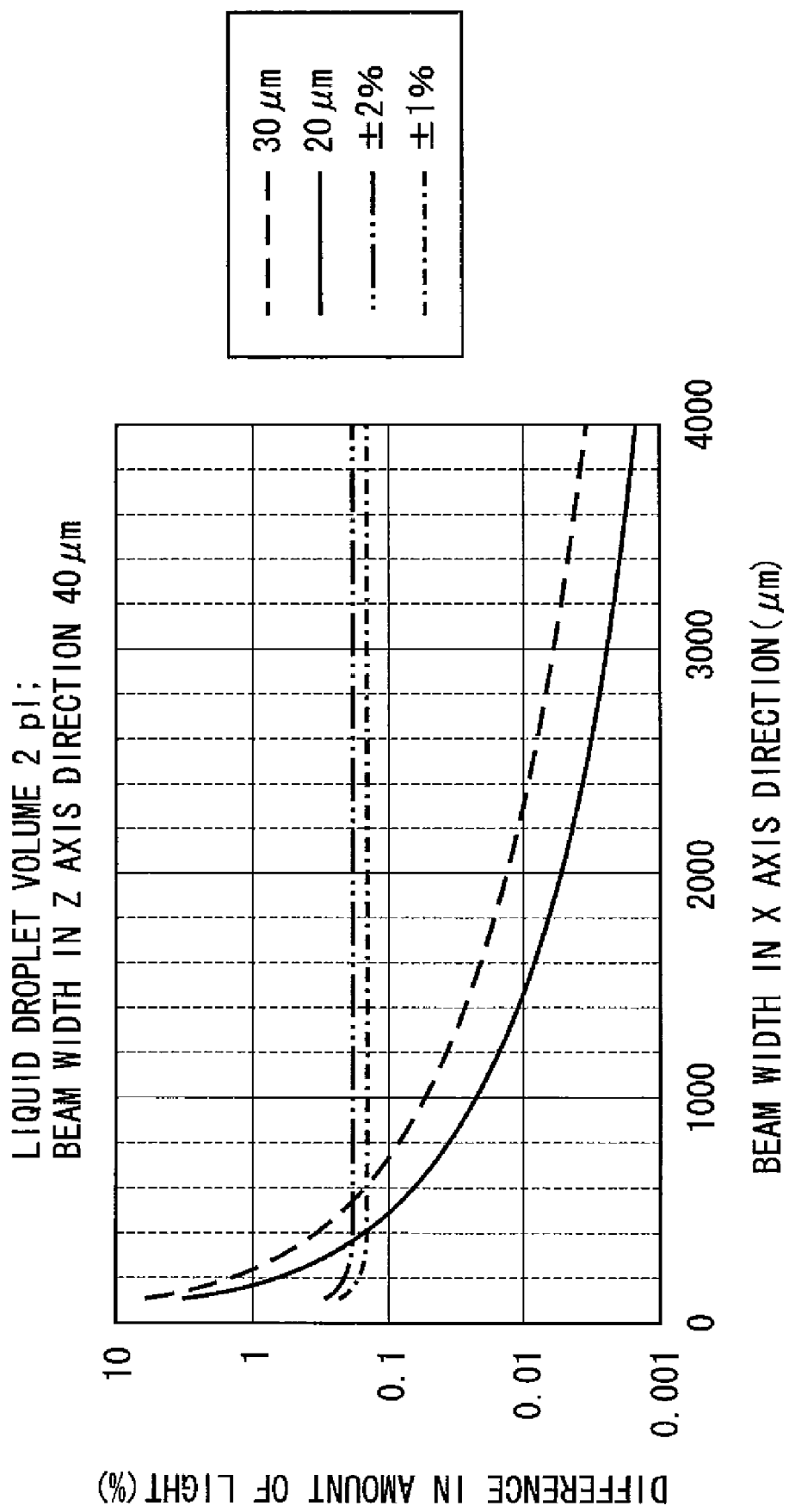
FIG. 10 is a diagram showing the results of corroboration by simulation when the beam width in the Z axis direction is 40 μm and the liquid droplet volume is 2 pl.
Figure 11:
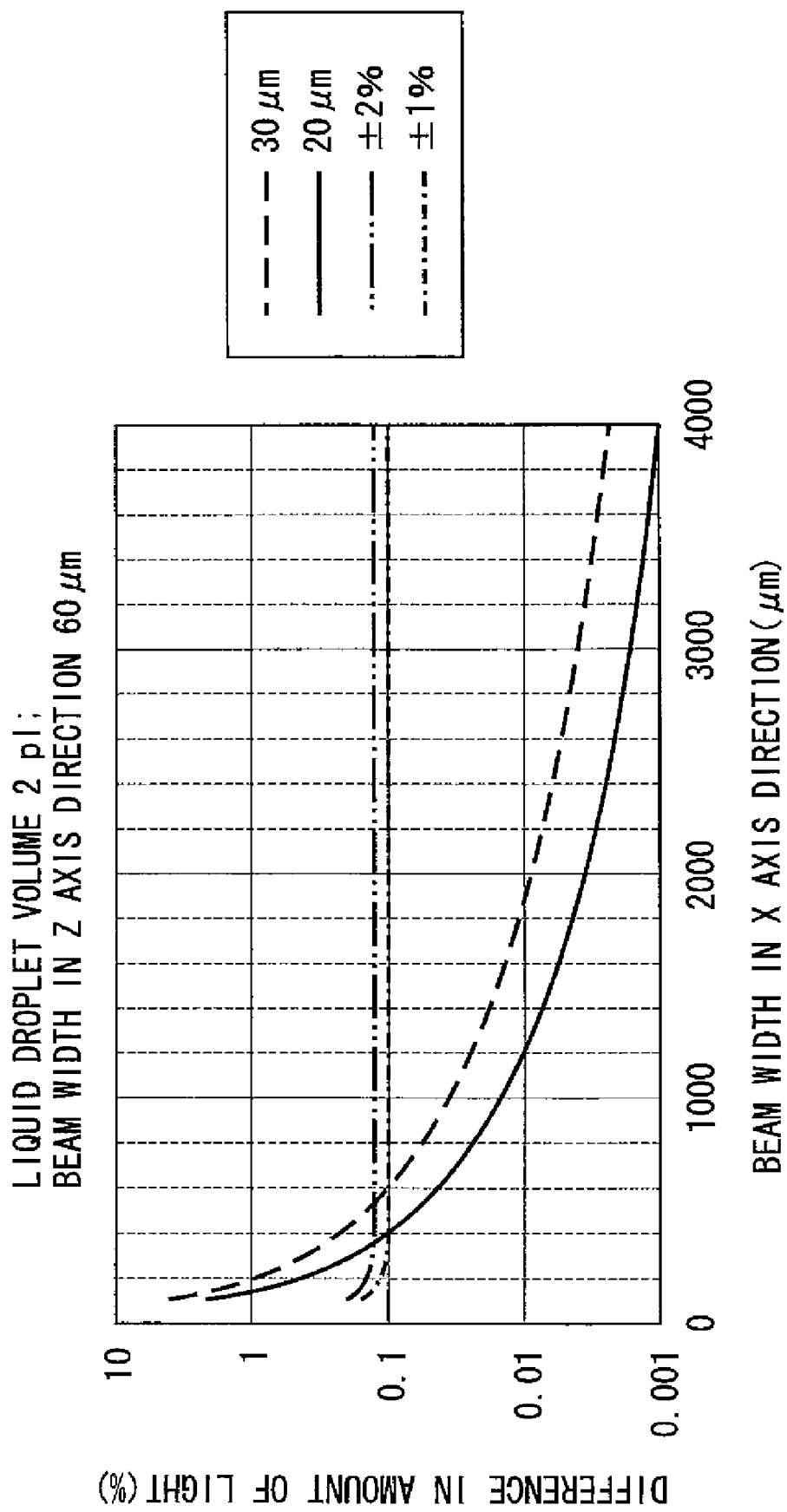
FIG. 11 is a diagram showing the results of corroboration by simulation when the beam width in the Z axis direction is 60 μm and the liquid droplet volume is 2 pl.

FIG. 8 and FIG. 10 show the results where the beam width in the Z axis direction was 40 µm, and FIG. 9 and FIG. 11 show the results where the beam width in the Z axis direction was 60 µm.

In FIG. 8 and FIG. 9, if the beam width in the X axis direction is 1000 µm, then the difference in the amount of light in the case of a ±1% variation in the liquid droplet volume and the difference in the amount of light in the case of a 30 µm variation in the ejection position of the liquid droplet are substantially the same. When the beam width in the X axis direction is equal to or less than 1000 µm, then the difference in the amount of light in the case of a 30 µm variation in the ejection position of the liquid droplet is greater than the difference in the amount of light in the case of a ±1% variation in the liquid droplet volume.

Therefore, when the beam width in the X axis direction is equal to or less than 1000 µm, if the variation in the ejection position of the liquid droplet is 30 µm, then no difference occurs in the amount of light even if there is a ±1% variation in the liquid droplet volume, and therefore the variation in the volume of the liquid droplet cannot be measured.

Consequently, if the beam width in the X axis direction is equal to or less than 1000 µm, then it is not possible to measure the variation in the volume of the liquid droplet from the difference in the amount of light, due to the effects of the variation in the ejection position of the liquid droplet, and hence there are cases where the volume of the liquid droplet cannot be measured accurately.

Similarly, in FIG. 10 and FIG. 11, if the beam width in the X axis direction is equal to or less than 600 µm, then it is not possible to measure the variation in the volume of the liquid droplet from the difference in the amount of light, due to the effects of the variation in the ejection position of the liquid droplet, and hence there are cases where it is not possible to measure the volume of the liquid droplet accurately.

In this way, as illustrated in FIG. 8 to FIG. 11, it can be seen that when the beam width in the Z axis direction is 40 µm or 60 µm, then if the beam width in the X axis direction is equal to or less than 1000 µm when the liquid droplet volume is 20 pl, or if the beam width in the X axis direction is equal to or less than 600 µm when the liquid droplet volume is 2 pl, then the difference in the amount of light caused by a variation (of 30 µm) in the ejection position of the liquid droplet is greater than the difference in the amount of light caused by a variation of (±1%) in the volume of the liquid droplet.

Therefore, in order to make the difference in the amount of light caused by variation (of 30 µm) in the ejection position of the liquid droplet smaller than the difference in the amount of light caused by variation (of ±1%) in the volume of the liquid droplet when the beam width in the Z axis direction is 40 µm or 60 µm, the beam width in the X axis direction must be equal to or greater than 1000 µm when the liquid droplet volume is 20 pl, and the beam width in the X axis direction must be equal to or greater than 600 µm when the liquid droplet volume is 2 pl.

Here, in order to measure the volume of the liquid droplet accurately by eliminating the effects caused by variation in the ejection position of the liquid droplet, desirably, the difference in the amount of light caused by variation in the ejection position of the liquid droplet is a small value of 10% or less of the difference in the amount of light caused by variation in the volume of the liquid droplet. In order to achieve this, from FIG. 8 to FIG. 11, it can be seen that the beam width in the X axis direction should desirably be equal to or greater than 2000 µm.

From the results of the simulation described above, in making the light intensity distribution of the laser light in the direction perpendicular to the direction of ejection of the liquid droplet (the X axis direction) fall within a prescribed range in order to measure accurately the volume of a liquid droplet regardless of the variation in the ejection position of the liquid droplet caused by deviation of flight, a desirable range for the prescribed range is a range where the difference in the amount of light caused by variation in the ejection position of the liquid droplet is equal to or less than 10% of the difference in the amount of light caused by variation in the volume of the liquid droplet. Therefore, it can be seen that as one condition for achieving this range, it is desirable that the beam width in the X axis direction should be equal to or greater than 2000 µm. Desirably, the beam width in the Z axis direction is 30 µm to 100 µm.

Figure 12:
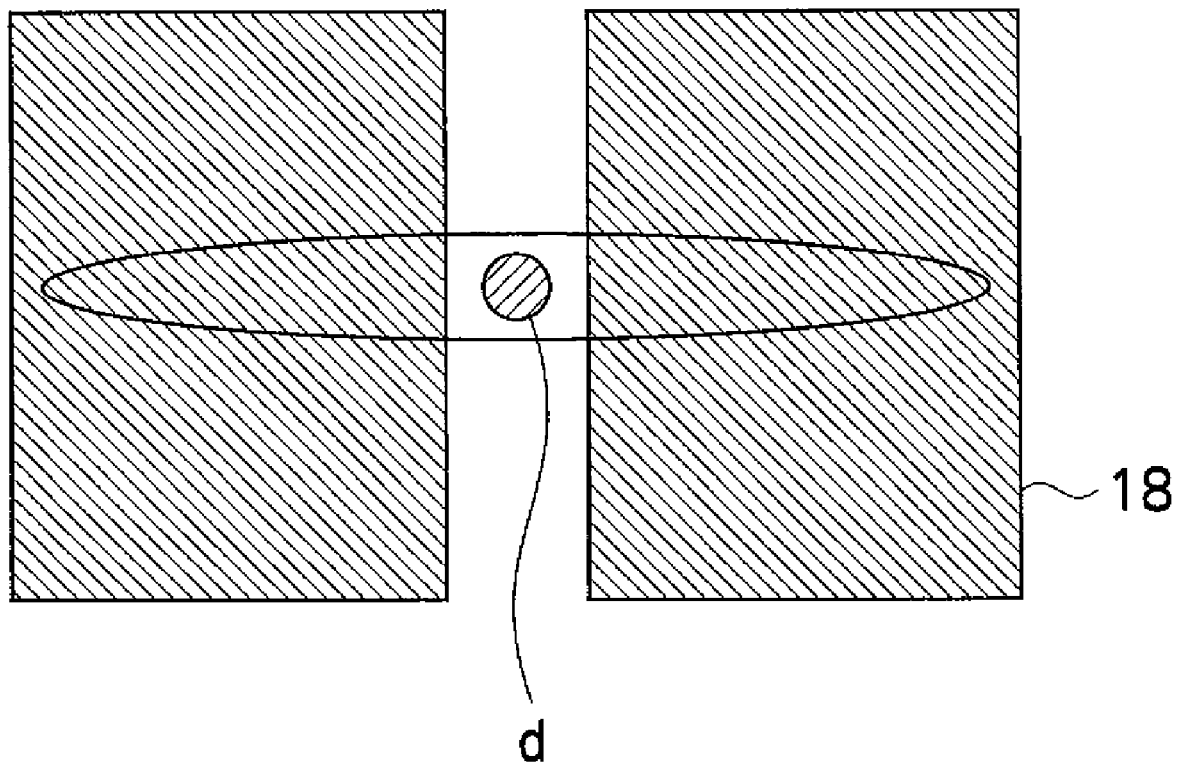
FIG. 12 is a diagram showing a slit.

FIG. 12 is a diagram showing a slit 18. While the laser light incident on the photodiode 20 is restricted by providing a slit 18 between the spherical lens 16 and the photodiode 20, an image of a liquid droplet d is formed by the spherical lens 16 in the region demarcated by the slit 18. Adopting this composition enhances the difference in the intensity of the received light (extinction ratio) in the photodiode 20, between a case where an image of the liquid droplet d is formed and a case where said image is not formed, and therefore makes it possible to measure the volume and velocity of the liquid droplet d with a high degree of accuracy. If a slit 18 is not provided in the liquid droplet measurement apparatus 1, then an image of the liquid droplet d is formed on a portion of the light receiving surface of the photodiode 20 by the spherical lens 16.

Furthermore, since the laser light from the laser light source 10 is a complementary color with respect to the color of the liquid droplet under measurement, then it is possible to reflect or absorb the laser light irradiated onto the liquid droplet and the volume and velocity of the liquid droplet can be measured to a high degree of accuracy. FIGS. 13A and 13B show the complementary color relationships between the laser light and the liquid droplets.

Second Embodiment

Figure 14A:
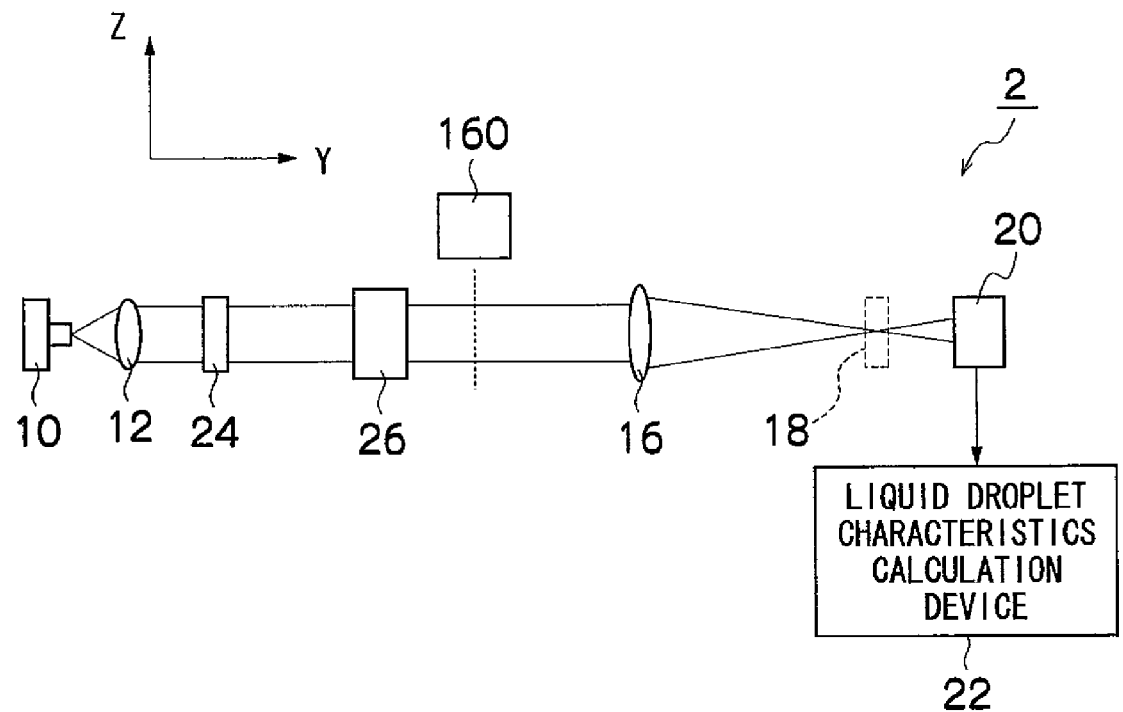
FIGS. 14A and 14B are schematic drawings showing the general composition of a liquid droplet measurement apparatus according to a second embodiment.
Figure 14B:
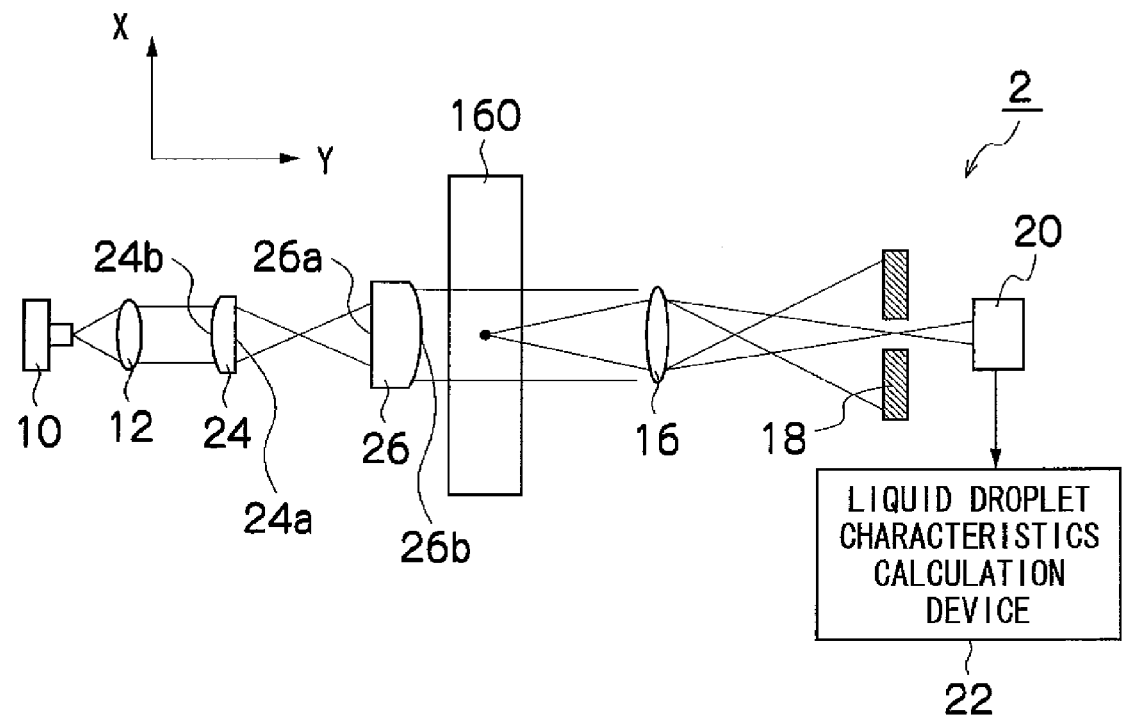

Furthermore, a liquid droplet measurement apparatus 2 such as that illustrated in FIGS. 14A and 14B can also be conceived. In the liquid droplet measurement apparatus 2 according to the second embodiment, the first optical device comprises a collimating lens 12, a cylindrical lens 24, a cylindrical lens 26 and a spherical lens 16 provided in this order from the laser light source 10.

In the plane illustrated in FIG. 14A, the generatrix of the cylindrical lens (24, 26) is parallel to the plane of the drawing, and the refractive power of the cylindrical lens (24, 26) is zero. Consequently, in the plane illustrated in FIG. 14A, after the laser light incident from the laser light source 10 via the collimating lens 12 has exited from the cylindrical lens (24, 26), it proceeds while maintaining the width at the time of exiting from the collimating lens 12.

On the other hand, in the planar view illustrated in FIG. 14B, the flat side face 24a of the cylindrical lens 24 faces toward the laser light source 10, and the curved side face 24b faces toward the cylindrical lens 26, while the generatrix is situated perpendicularly to the plane of the drawing. The cylindrical lens 24 is disposed in such a manner that laser light which is incident thereon from the laser light source 10 and via the collimating lens 12 is condensed between the cylindrical lens 24 and the cylindrical lens 26.

Furthermore, in the planar view illustrated in FIG. 14B, the flat side face 26a of the cylindrical lens 26 faces toward the ejection position of the liquid droplets, and the curved side face 26b faces toward the cylindrical lens 24, while the generatrix is situated perpendicularly to the plane of the drawing. The laser light which has been provisionally condensed by the cylindrical lens 24 and which has spread again is incident at the flat side face 26a of the cylindrical lens 26, and exits from the curved side face 26b of the cylindrical lens 26.

The cylindrical lens 26 has a greater radius of curvature than the cylindrical lens 24. Therefore, as illustrated in FIG. 14B, the laser light which exits from the cylindrical lens 26 spreads broadly in the direction perpendicular to the direction of ejection of the liquid droplet (X axis direction).

The remainder of the composition is common to that of the liquid droplet measurement apparatus 1 according to the first embodiment.

The liquid droplet measurement apparatus 2 composed as described above has the following action. The laser light emitted from the laser light source 10 is irradiated onto the cylindrical lens 24 via the collimating lens 12. In this case, the cylindrical lens 24 has characteristics whereby it has a curvature in the direction perpendicular to the direction of ejection of the liquid droplets which are ejected from the print head 160 (X axis direction), but does not have a curvature in the direction of ejection of the liquid droplets (Z axis direction).

The laser light incident on the cylindrical lens 24 is provisionally condensed in the direction perpendicular to the direction of ejection of the liquid droplets (X axis direction), where the lens has a curvature.

This provisionally condensed laser light then broadens again and is incident at the cylindrical lens 26. In this case, the cylindrical lens 26 has characteristics whereby it has a curvature in the direction perpendicular to the direction of ejection of the liquid droplets which are ejected from the print head 160 (X axis direction), but does not have a curvature in the direction of ejection of the liquid droplets (Z axis direction). Therefore, the laser light which exits from the cylindrical lens 26 has a broad width in the direction perpendicular to the direction of ejection of the liquid droplet (X axis direction) and proceeds while maintaining this width, being irradiated in this state onto the liquid droplet ejected from the print head 160.

The laser light irradiated onto a liquid droplet is condensed by the spherical lens 16 so as to form an image of the liquid droplet at the position of the slit 18. After being condensed, the light is received by the photodiode 20.

The photodiode 20 which has received light supplies an output signal to the liquid droplet characteristics calculation device 22. In the liquid droplet characteristics calculation device 22, the volume and velocity of the liquid droplet are calculated on the basis of this output signal.

In the liquid droplet measurement apparatus 2 according to the second embodiment described above as illustrated in FIG. 4A, due to the action of the cylindrical lenses (24, 26), the light intensity distribution is formed more narrowly in the direction of ejection of the liquid droplet (Z axis direction) with respect to the direction perpendicular to the direction of ejection of the liquid droplet (X axis direction).

Therefore, by making the intensity of the laser light fall within a prescribed range which does not affect the measurement of the volume and velocity of the liquid droplet, within a range where variation in the ejection position of the liquid droplet occurs due to deviation of flight in the direction perpendicular to the direction of ejection of the liquid droplet (X axis direction), then it is possible to measure the volume and velocity accurately, even if deviation in flight occurs.

Furthermore, the beneficial effects of the slit 18 and the beneficial effects of setting the laser light from the laser light source 10 to a wavelength which has a complementary color of the liquid droplet under measurement are similar to those of the liquid droplet measurement apparatus 1 according to the first embodiment.

Third Embodiment

Figure 15:
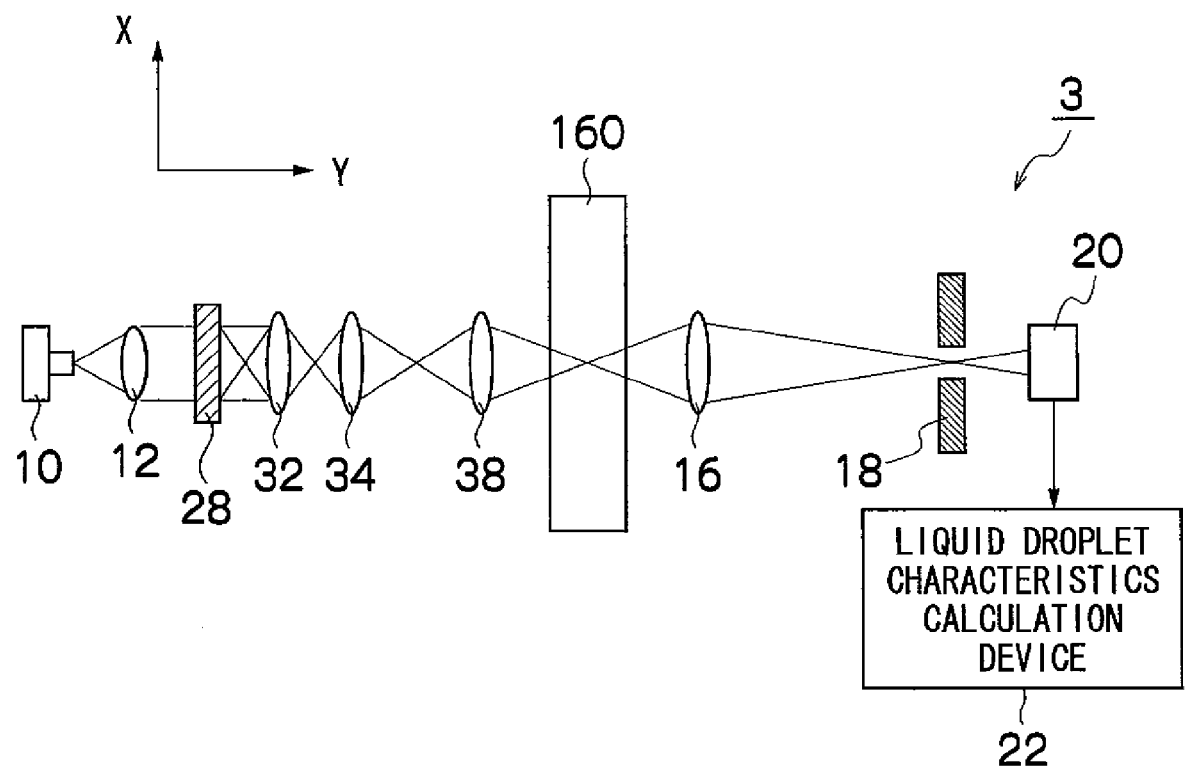
FIG. 15 is a schematic drawing showing the general composition of a liquid droplet measurement apparatus according to a third embodiment.

Furthermore, the liquid droplet measurement apparatus 3 illustrated in FIG. 15 can also be conceived. In the liquid droplet measurement apparatus 3 according to the third embodiment, the optical device comprises a collimating lens 12, a diffusion plate 28, a spherical lens 32, a spherical lens 34, a spherical lens 38, and a spherical lens 16, provided in this order from the laser light source 10.

By disposing the spherical lens 32 and the spherical lens 34 between the diffusion plate 28 and the ejection path of the liquid droplet in this way, the spherical lens 32 and the liquid droplet, and the diffusion plate 28 and the spherical lens 34, are respectively positioned in optically conjugated relationships.

The diffusion plate 28 diff-uses the laser light only in the direction perpendicular to the direction of ejection of the liquid droplet (X axis direction) and therefore the laser light is not diffused in the direction of ejection of the liquid droplet (Z axis direction) and a Gaussian beam is obtained, while at the same time a portion of uniform light intensity can be formed in the direction perpendicular to the direction of ejection of the liquid droplet (X axis direction). The diffusion plate 28 may also have characteristics whereby it diffuses the laser light not only in the direction perpendicular to the direction of ejection of the liquid droplet (X axis direction), but also in the direction of ejection of the liquid droplet itself (Z axis direction).

The remainder of the composition is common to that of the liquid droplet measurement apparatus 1 according to the first embodiment.

The liquid droplet measurement apparatus 3 composed as described above has the following action. The laser light emitted from the laser light source 10 is incident on the diffusion plate 28 via the collimating lens 12. The laser light incident on the diffusion plate 28 is diffused. In this case, as described above, the diffusion plate 28 diffuses the laser light only in the direction perpendicular to the direction of ejection of the liquid droplet (X axis direction) and therefore the laser light is not diffused in the direction of ejection of the liquid droplet (Z axis direction) and a Gaussian beam is obtained, while at the same time a portion of uniform light intensity can be formed in the direction perpendicular to the direction of ejection of the liquid droplet (X axis direction).

The diffused laser light is condensed both in the direction of ejection of the liquid droplet (Z axis direction) and the direction perpendicular to the direction of ejection of the liquid droplet (X axis direction) by passing via the spherical lens 32, the spherical lens 34 and the spherical lens 38, and the condensed light is then irradiated onto a liquid droplet ejected from the print head 160.

The laser light irradiated onto the liquid droplet is condensed by the spherical lens 16 so as to form an image of the liquid droplet at the position of the slit 18. After being condensed, the light is received by the photodiode 20.

The photodiode 20 which has received light supplies an output signal to the liquid droplet characteristics calculation device 22. In the liquid droplet characteristics calculation device 22, the volume and velocity of the liquid droplet are calculated on the basis of this output signal.

According to the liquid droplet measurement apparatus 3 of the third embodiment which is described above, as illustrated in FIG. 16A, the intensity distribution of the laser light when irradiated onto the liquid droplet is substantially uniform in the direction perpendicular to the direction of ejection of the liquid droplet (X axis direction), due to the action of the diffusion plate 28. FIG. 16B shows a graph of the light intensity in the direction perpendicular to the direction of ejection of the liquid droplet (X axis direction), and FIG. 16C shows a graph of the light intensity in the direction of ejection of the liquid droplet (Z axis direction).

Consequently, by setting the intensity distribution of the laser light to a substantially uniform distribution in the direction perpendicular to the direction of ejection of the liquid droplet (X axis direction), within a range where there is variation in the ejection position of the liquid droplet due to flight deviation, then it is possible to measure the volume or velocity of the liquid droplet accurately even if there is flight deviation.

Furthermore, the beneficial effects of the slit 18 and the beneficial effects of setting the laser light from the laser light source 10 to a wavelength which is a complementary color of the liquid droplet under measurement, are similar to those of the liquid droplet measurement apparatus 1 according to the first embodiment.

Fourth Embodiment

Figure 17A:
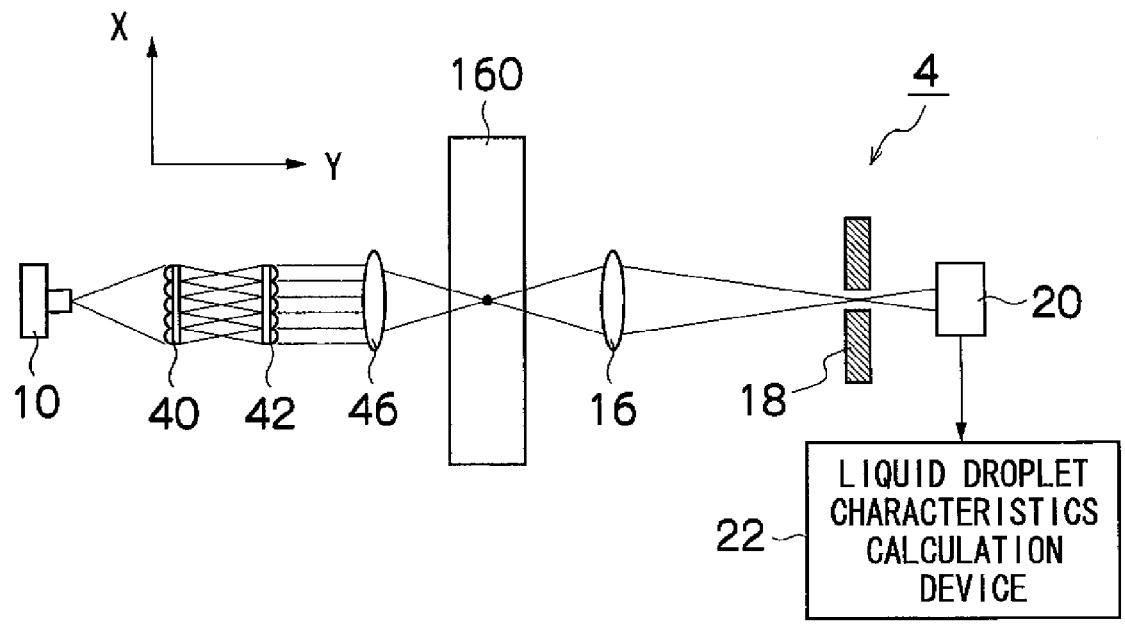
FIG. 17A is a schematic drawing showing the general composition of a liquid droplet measurement apparatus according to a fourth embodiment.
Figure 17B:
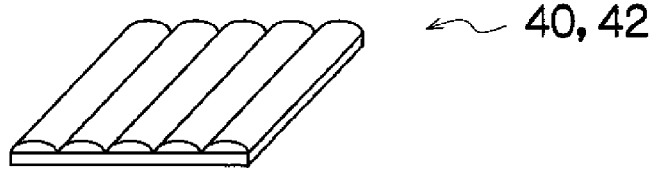
FIGS. 17B and 17C are external views of a fly-eye lens.
Figure 17C:
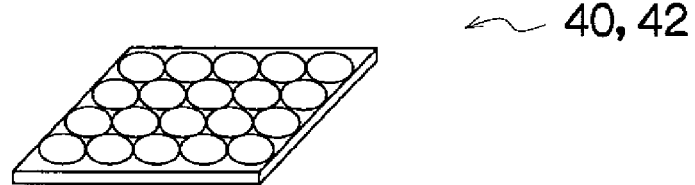

Furthermore, the liquid droplet measurement apparatus 4 illustrated in FIGS. 17A to 17C can also be conceived. In the liquid droplet measurement apparatus 4 according to the fourth embodiment, the optical device comprises a fly-eye lens 40, a fly-eye lens 42, a spherical lens 46 and a spherical lens 16, provided in this order from the laser light source 10 as illustrated in FIG. 17A.

By disposing the fly-eye lens 40 and the fly-eye lens 42 between the laser light source 10 and the spherical lens 46 in this way, the laser light source 10 and the fly-eye lens 42, and the fly-eye lens 40 and the object point of the spherical lens 46, respectively assume an optically conjugated relationship.

The fly-eye lenses (40, 42) used only have curvature in one direction, as illustrated in FIG. 17B, namely, they have a curvature only in the direction perpendicular to the direction of ejection of the liquid droplet (X axis direction), and therefore the laser light is not diffused in the direction of ejection of the liquid droplet (Z axis direction) and a Gaussian beam is obtained, while at the same time a portion of uniform light intensity can be formed in the direction perpendicular to the direction of ejection of the liquid droplet (X axis direction). The fly-eye lenses (40, 42) used have curvature in both directions, as illustrated in FIG. 17C, and they may also have a curvature in the direction of ejection of the liquid droplet (Z axis direction) as well as the direction perpendicular to the direction of ejection of the liquid droplet (X axis direction).

The remainder of the composition is common to that of the liquid droplet measurement apparatus 1 according to the first embodiment.

The liquid droplet measurement apparatus 4 composed as described above has the following action. The laser light emitted from the laser light source 10 is irradiated onto the fly-eye lenses (40, 42). The laser light incident on the fly-eye lenses (40, 42) is diffused by the lenses. In this case, as described above, the fly-eye lenses (40, 42) diffuses the laser light only in the direction perpendicular to the direction of ejection of the liquid droplet (X axis direction) and therefore the laser light is not diffused in the direction of ejection of the liquid droplet (Z axis direction) and a Gaussian beam is obtained, while at the same time a portion of uniform light intensity can be formed in the direction perpendicular to the direction of ejection of the liquid droplet (X axis direction).

The diffused laser light is condensed both in the direction of ejection of the liquid droplet (Z axis direction) and the direction perpendicular to the direction of ejection of the liquid droplet (X axis direction) by the spherical lens 46, and the condensed light is then irradiated onto a liquid droplet ejected from the print head 160.

The laser light irradiated onto a liquid droplet is condensed by the spherical lens 16 so as to form an image of the liquid droplet at the position of the slit 18. After being condensed, the light is received by the photodiode 20.

The photodiode 20 which has received light supplies an output signal to the liquid droplet characteristics calculation device 22. In the liquid droplet characteristics calculation device 22, the volume and velocity of the liquid droplet are calculated on the basis of this output signal.

Figure 16A:
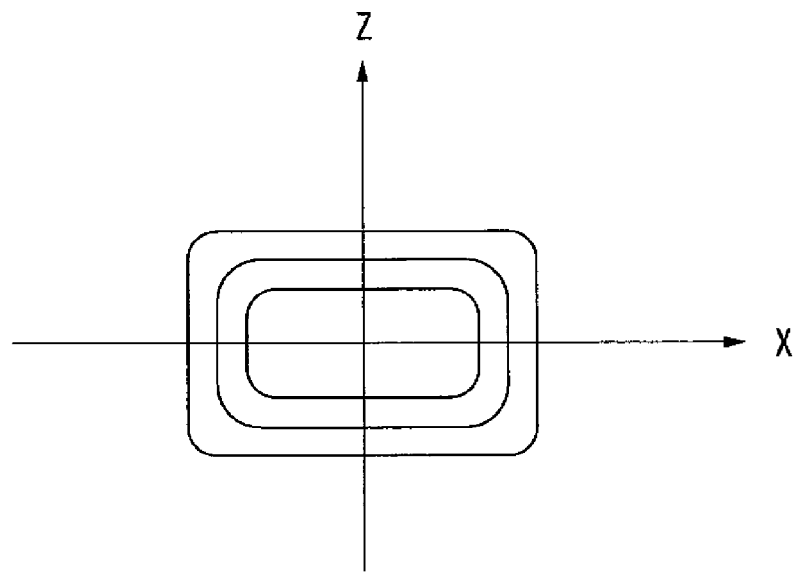
FIGS. 16A to 16C show the intensity distribution of a laser light received by a photoreceptor device.
Figure 16B:
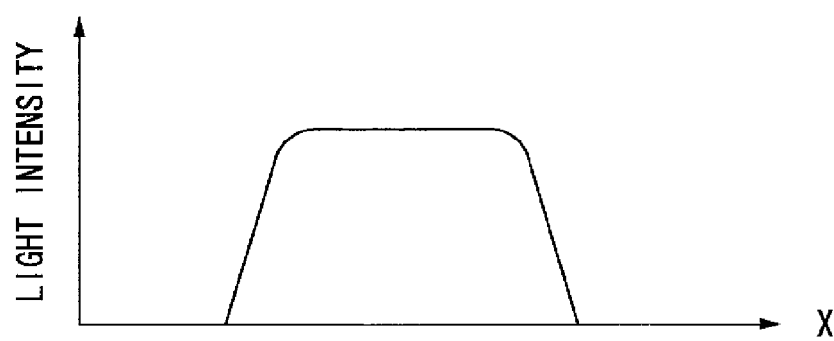
Figure 16C:
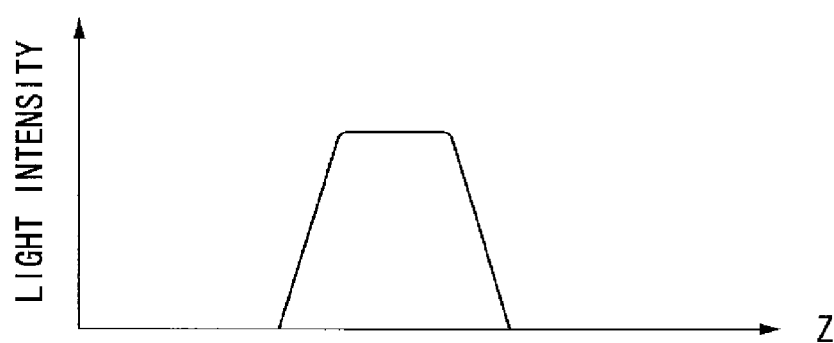

According to the liquid droplet measurement apparatus 4 of the fourth embodiment which is described above, similarly to the liquid droplet measurement apparatus 3 of the third embodiment, the intensity distribution of the laser light when irradiated onto the liquid droplet is substantially uniform in the direction perpendicular to the direction of ejection of the liquid droplet (X axis direction), due to the action of the fly-eye lenses (40, 42), as illustrated in FIG. 16A. FIG. 16B shows a graph of the light intensity in the direction perpendicular to the direction of ejection of the liquid droplet (X axis direction), and FIG. 16C shows a graph of the light intensity in the direction of ejection of the liquid droplet (Z axis direction).

Consequently, by setting the intensity distribution of the laser light to a substantially uniform distribution in the direction perpendicular to the direction of ejection of the liquid droplet (X axis direction), within a range where there is variation in the ejection position of the liquid droplet due to flight deviation, then it is possible to measure the volume or velocity of the liquid droplet accurately even if there is flight deviation.

Furthermore, the beneficial effects of the slit 18 and the beneficial effects of setting the laser light from the laser light source 10 to a wavelength which is a complementary color of the liquid droplet under measurement are similar to those of the liquid droplet measurement apparatus 1 according to the first embodiment.

Fifth Embodiment

Figure 18A:
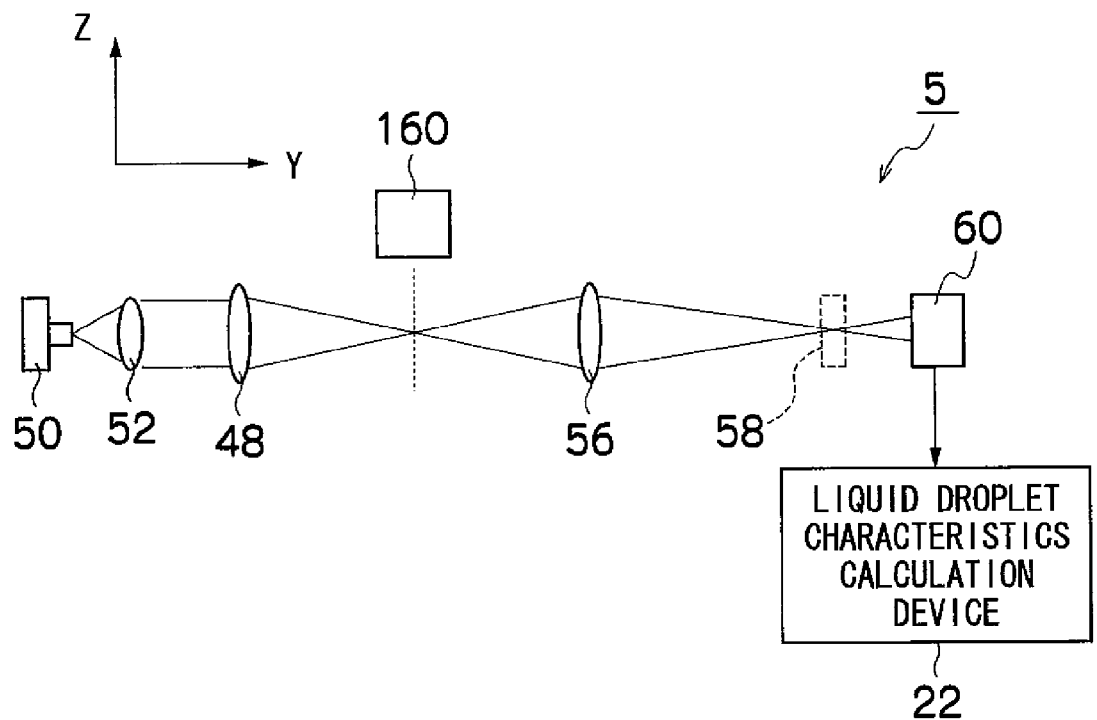
FIGS. 18A and 18B are schematic drawings showing the general composition of a liquid droplet measurement apparatus according to a fifth embodiment.
Figure 18B:
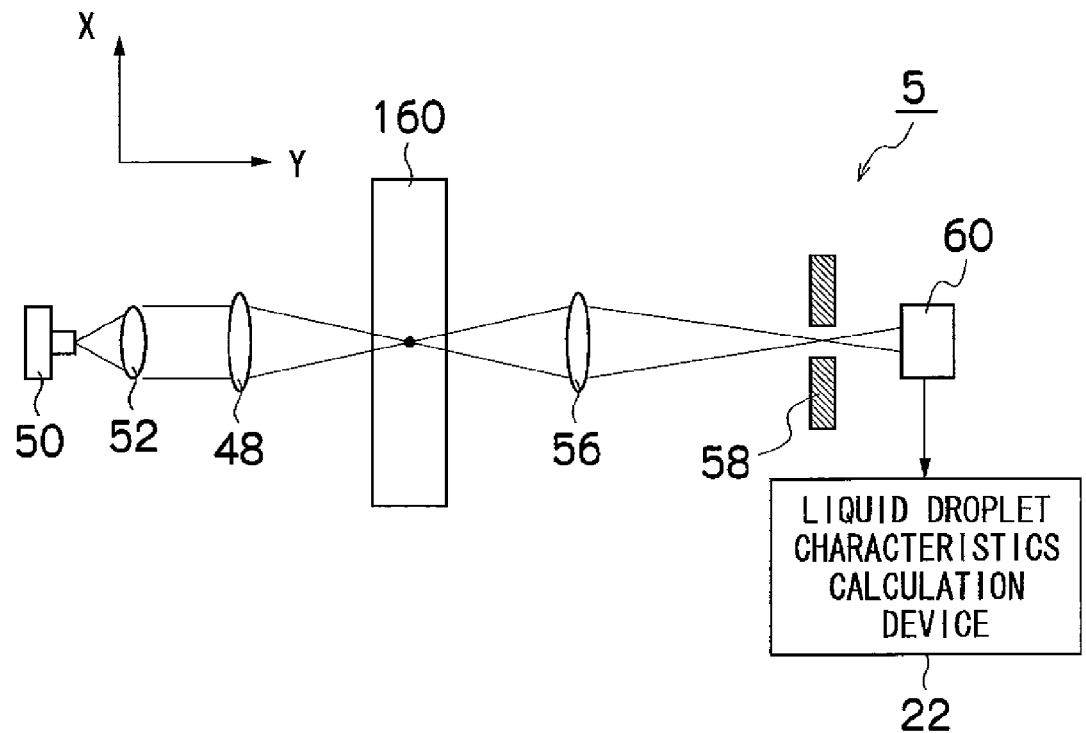

Furthermore, the liquid droplet measurement apparatus 5 illustrated in FIGS. 18A and 18B can also be conceived. In the liquid droplet measurement apparatus 5 according to the fifth embodiment, the optical device comprises a collimating lens 52, a spherical lens 48 and a spherical lens 56, provided in this order from the laser light source 50. The photoreceptor device is constituted by a photodiode 60. In FIGS. 18A and 18B, a slit 58 is provided between the optical device and the photoreceptor device, but a mode which does not comprise a slit 58 is also possible.

The laser light source 50, collimating lens 52, spherical lens 56, slit 58 and photodiode 60 have a similar composition and action to the laser light source 10, collimating lens 12, spherical lens 16, slit 18 and photodiode 20 of the liquid droplet measurement apparatus 1 according to the first embodiment.

The remainder of the composition is common to that of the liquid droplet measurement apparatus 1 according to the first embodiment.

The liquid droplet measurement apparatus 5 composed as described above has the following action. The laser light emitted from the laser light source 10 is irradiated onto the spherical lens 48 via the collimating lens 52.

The laser light incident on the spherical lens 48 is condensed in the direction of ejection of the liquid droplet (Z axis direction) and the direction perpendicular to the direction of ejection of the liquid droplet (X axis direction). By adjusting the curvature of the spherical lens 48, the distance between the spherical lens 48 and the print head 160, and the like, then as illustrated in FIGS. 18A and 18B, the condensed laser light is irradiated onto a liquid droplet ejected from the print head 160.

The laser light irradiated onto a liquid droplet is condensed by the spherical lens 56 so as to form an image of the liquid droplet at the position of the slit 18. After being condensed, the light is received by the photodiode 20.

The photodiode 20 which has received light supplies an output signal to the liquid droplet characteristics calculation device 22. In the liquid droplet characteristics calculation device 22, the volume and velocity of the liquid droplet is calculated on the basis of this output signal.

According to the liquid droplet measurement apparatus 5 of the fifth embodiment which is described above, the intensity of the laser light irradiated onto the liquid droplet is set to a Gaussian beam distribution by the spherical lens 48. Therefore, as illustrated in FIGS. 19A to 19D, the intensity of the laser light becomes non-uniform in the direction of ejection of the liquid droplet (Z axis direction) and the direction perpendicular to the direction of ejection of the liquid droplet (X axis direction), within a range where deviation occurs in the flight of the liquid droplet. FIGS. 19B and 19C respectively show graphs of the light intensity in the direction perpendicular to the direction of ejection of the liquid droplet (X axis direction) and the direction of ejection of the liquid droplet (Z axis direction).

Figure 19A:
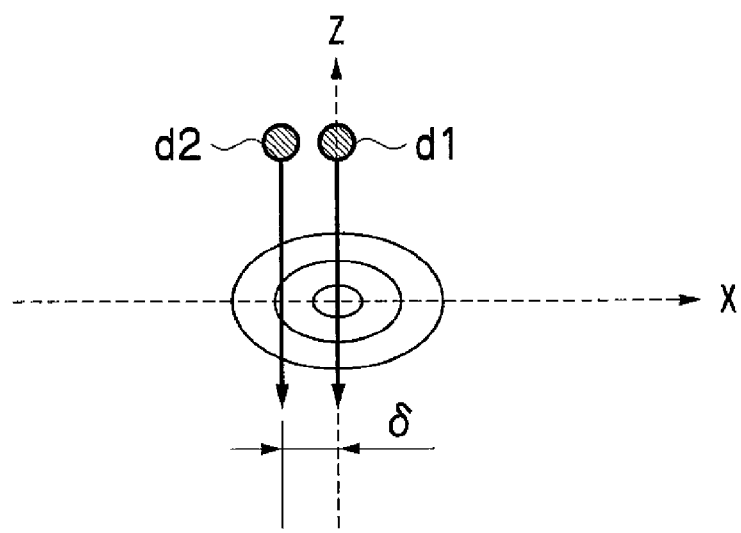
FIGS. 19A to 19C are intensity distribution diagrams of a laser light received by a photoreceptor device.
Figure 19B:
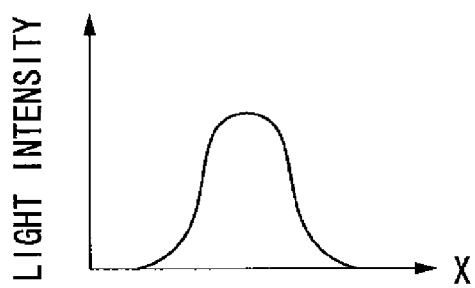
Figure 19C:
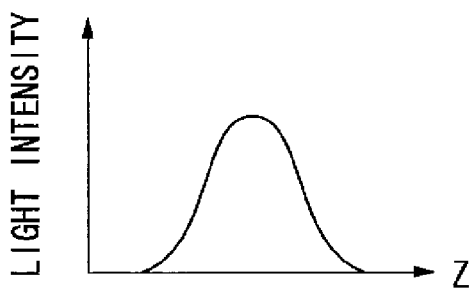

Therefore, a case is described where, as illustrated in FIG. 19A, a first liquid droplet d1 and a second liquid droplet d2 are ejected at respectively staggered ejection turnings. The first liquid droplet d1 and the second liquid droplet d2 both have the same volume and the same velocity. The first liquid droplet d1 is ejected at an ideal ejection position and the second liquid droplet d2 is ejected as a position separated by a distance of $\delta$ from the ejection position of the first liquid droplet d1, in the direction perpendicular to the direction of ejection of the liquid droplet (X axis direction). Here, it is supposed that the second liquid droplet d2 has been ejected in a state where there is deviation in flight due to a reason such as soiling of the nozzle section of the print head 160, for example.

Figure 19D:
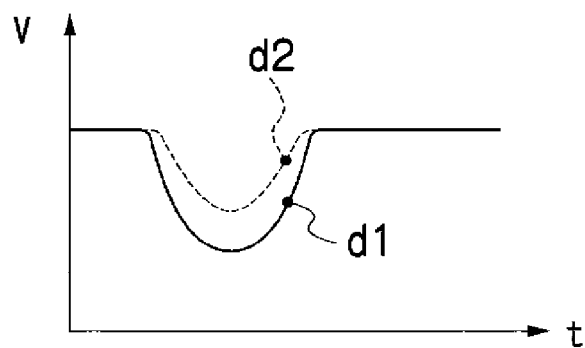
FIG. 19D is an output voltage waveform diagram.

FIG. 19D shows a joint depiction of the respective time axes of the time axis waveforms of the voltage value of the output signal from the photodiode 20, when the first liquid droplet d1 is ejected and when the second liquid droplet d2 is ejected.

As illustrated in FIG. 19D, the maximum amount of dip in the output voltage waveform in the photodiode 20 is greater when the first liquid droplet d1 is ejected than when the second liquid droplet d2 is ejected. Furthermore, the timing of the start of the dip in the output voltage waveform differs between a case where the first liquid droplet d1 is ejected and a case where the second liquid droplet d2 is ejected, this timing being earlier when the first liquid droplet d1 is ejected than when the second liquid droplet d2 is ejected.

This means that if even if liquid droplets having the same volume and the same velocity are ejected at positions which are separated by a distance of $\delta$, the variation in the ejection position can still be measured accurately.

The reasons why the variation in the ejection position can be measured are as follows. As illustrated in FIG. 19A, in the liquid droplet measurement apparatus 5 according to the present embodiment, due to the action of the spherical lens 48, the intensity of the laser light is made non-uniform in the direction of ejection of the liquid droplet (Z axis direction) and in the direction perpendicular to the direction of ejection of the liquid droplet (X axis direction). Consequently, there is a change in the intensity of the laser light, between the ejection position of the first liquid droplet d1 and the ejection position of the second liquid droplet d2 which suffers flight deviation, in the direction perpendicular to the direction of ejection of the liquid droplet (X axis direction).

As described above, by making the intensity of the laser light non-uniform in the direction perpendicular to the direction of ejection of the liquid droplet (X axis direction), it is possible to measure the position of the liquid droplet accurately.

Here, the method of calculating the position of the liquid droplet employed in the liquid droplet characteristics calculation device 22 will be described.

In calculating the position of the liquid droplet, firstly, as illustrated in FIG. 2A described above, the maximum amount of dip Ip in the output voltage waveform of the photodiode 20 is measured. Next, the position Xp of the liquid droplet is determined from the maximum amount of dip Ip in the measured output voltage waveform, on the basis of the previously created look-up table or correctional formula which indicates the correlation between the maximum amount of dip Ip in the output voltage waveform and the position Xp of the liquid droplet.

Figure 20:
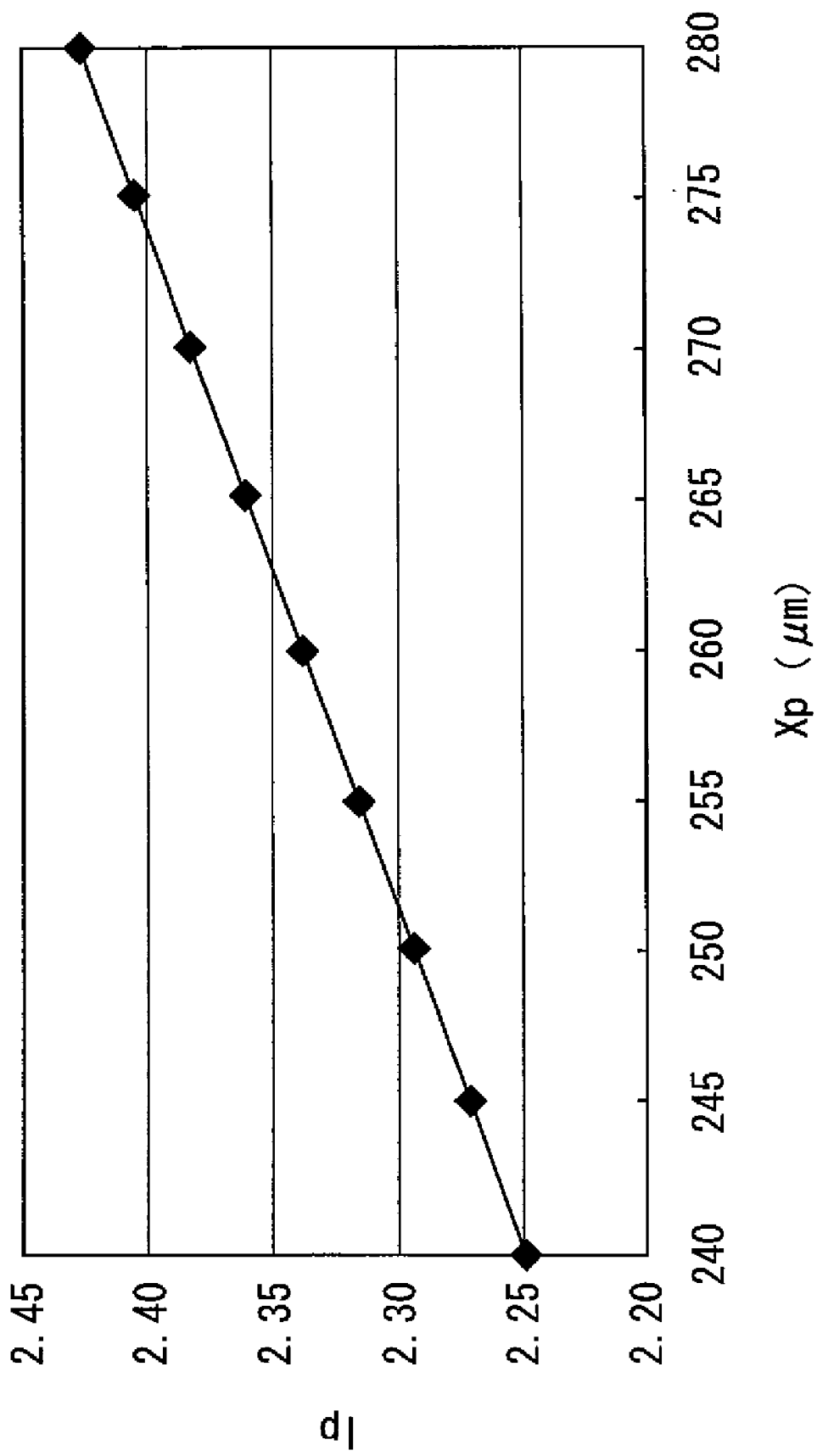
FIG. 20 is a diagram showing the relationship between the maximum amount of dip Ip in the output voltage waveform and the position of the liquid droplet Xp.

The relationship between the maximum amount of dip Ip of the output voltage waveform and the position Xp of the liquid droplet can be determined as described below. Firstly, liquid droplets are ejected continuously from one nozzle and the maximum amount of dip Ip in the output voltage waveform when the laser light is moved from a reference position used in measuring the velocity of the liquid droplet to a position in the direction of alignment of the nozzles (X axis direction), is measured. Here, this amount of movement of the laser light AXp can be determined on the basis of the feed amount of a high-precision stage on which the laser light source is mounted, or by measurement using a laser displacement meter. In this way, the relationship between the maximum amount of dip Ip in the output voltage waveform and the position of the liquid droplet Xp is determined, as illustrated in FIG. 20.

Sixth Embodiment

Figure 21:
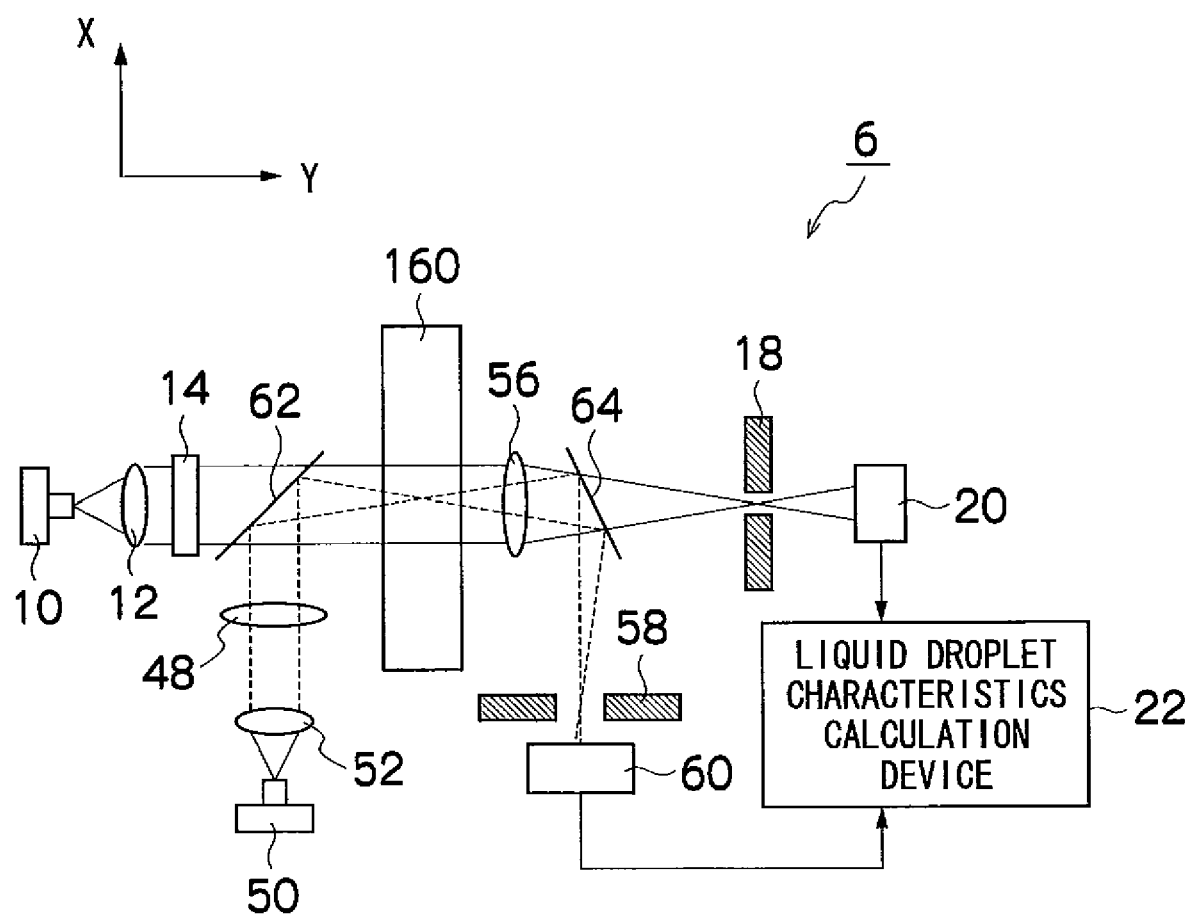
FIG. 21 is a schematic drawing showing the general composition of a liquid droplet measurement apparatus according to a sixth embodiment.

Furthermore, the liquid droplet measurement apparatus 6 illustrated in FIG. 21 can also be conceived. In the liquid droplet measurement apparatus 6 according to the sixth embodiment, as illustrated in FIG. 21, dichroic mirrors or polarizing beam splitters are provided as specific component transmitting devices (62, 64) which transmit only particular wavelengths or polarization planes and reflect other wavelengths or polarization planes. By this means, a composition is achieved which combines the composition of the liquid droplet measurement apparatus 1 of the first embodiment and the composition of the liquid droplet measurement apparatus 5 of the fifth embodiment in the same plane.

If dichroic mirrors are used as the specific component transmitting devices (62, 64), then the laser light irradiated from a laser light source 10 which is a first laser light source, and the laser light emitted from a laser light source 50 which is a second laser light source, have different wavelengths. By this means, for example, the dichroic mirrors only transmit the laser light emitted from the laser light source 10, and they are able to reflect the laser light emitted from the laser light source 50, as illustrated in FIG. 21.

If polarizing beam splitters are used as the specific component transmitting devices (62, 64), then the laser light emitted from the laser light source 10 which is the first laser light source, and the laser light emitted from the laser light source 50 which is the second laser light source, have different planes of polarization, for example, P-polarization and S-polarization respectively. By this means, for example, the polarizing beam splitters only transmit the laser light emitted from the laser light source 10, and they are able to reflect the laser light emitted from the laser light source 50, as illustrated in FIG. 21.

The first liquid droplet characteristics calculation device which calculates the volume or velocity of a liquid droplet by means of the laser light emitted from the laser light source 10 which is the first laser light source, and the second liquid droplet characteristics calculation device which calculates the position of the liquid droplet by means of the laser light emitted from the laser light source 50 which is the second laser light source are both provided inside the liquid droplet characteristics calculation device 22, but they may also be provided as separate liquid droplet characteristics calculation devices.

Furthermore, it is also possible to adopt a composition which combines the composition of the liquid droplet measurement apparatus 2 according to the second embodiment and the composition of the liquid droplet measurement apparatus 5 according to the fifth embodiment, a composition which combines the composition of the liquid droplet measurement apparatus 3 according to the third embodiment and the composition of the liquid droplet measurement apparatus 5 according to the fifth embodiment, and a composition which combines the composition of the liquid droplet measurement apparatus 4 according to the fourth embodiment and the composition of the liquid droplet measurement apparatus 5 according to the fifth embodiment.

According to the liquid droplet measurement apparatus 6 of the sixth embodiment which is described above, it is possible to measure the volume, velocity and position of a liquid droplet, simultaneously.

Apart from this, it is also possible to set the laser light which is emitted from the laser light source 10 and the laser light which is emitted from the laser light source 50 to different wavelengths in a composition which combines the composition of the liquid droplet measurement apparatus 1 according to the first embodiment and the composition of the liquid droplet measurement apparatus 5 according to the fifth embodiment, in the same plane, or a composition having one of the other combinations adopting the compositions described above.

Seventh Embodiment

Figure 22A:
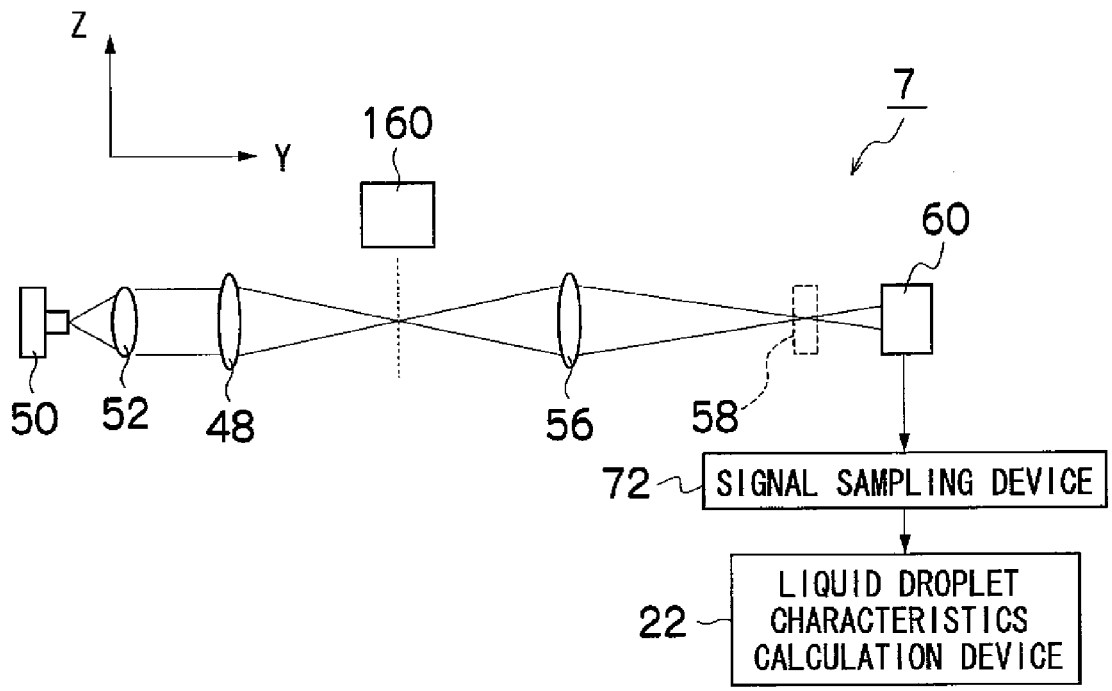
FIGS. 22A and 22B are schematic drawings showing the general composition of a liquid droplet measurement apparatus according to a seventh embodiment.
Figure 22B:
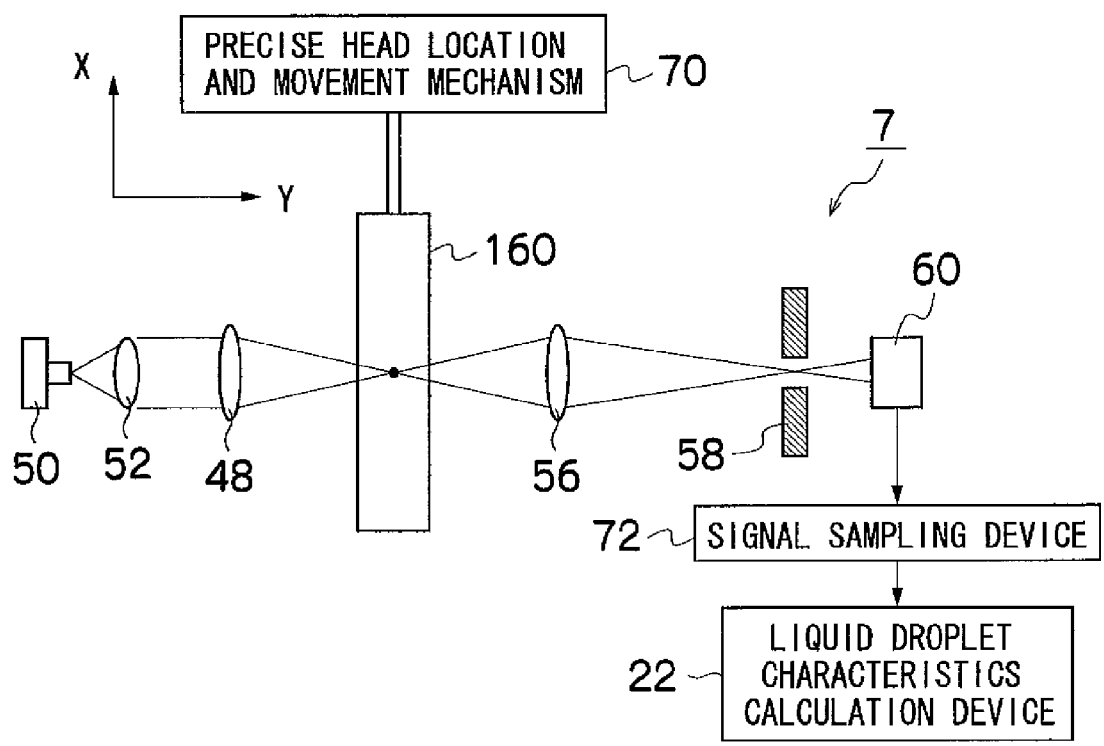

Furthermore, the liquid droplet measurement apparatus 7 illustrated in FIGS. 22A and 22B is also possible. In the liquid droplet measurement apparatus 7 according to the seventh embodiment, the optical device comprises a collimating lens 52, a spherical lens 48 and a spherical lens 56, provided in this order from the laser light source 50. The photoreceptor device is constituted by a photodiode 60. In FIGS. 22A and 22B, a slit 58 is provided between the optical device and the photoreceptor device, but a configuration in which a slit 58 is not provided can also be conceived.

The laser light source 50, collimating lens 52, spherical lens 56, slit 58 and photodiode 60 have a similar composition and action to the laser light source 10, collimating lens 12, spherical lens 16, slit 18 and photodiode 20 of the liquid droplet measurement apparatus 1 according to the first embodiment.

The liquid droplet measurement apparatus 7 according to the seventh embodiment comprises a precise head location and movement mechanism 70 for locating the print head 160 in position, and a signal sampling device 72 which is disposed between the photodiode 60 and the liquid droplet characteristics calculation device 22. The remainder of the composition is common to that of the liquid droplet measurement apparatus 1 according to the first embodiment.

By means of the precise head location and movement mechanism 70 which comprises actuators, the print head 160 is moved relatively with respect to the optical device and the photoreceptor device described above (hereinafter, referred to as an "optical system" in the seventh embodiment), and is successively located in different positions. By this means, it is possible to vary the relative positions of the nozzles of the print head 160 and the photodiode 60. The direction of movement is a direction substantially perpendicular to the direction of travel of the laser light indicated in FIGS. 22A and 22B (the X axis direction). The amount of movement of the print head 160 depends on the accuracy of the ejection direction of the liquid droplet which is ejected from the nozzle of the print head 160 and which forms the measurement object. However, the head is moved at prescribed intervals or at equidistant intervals. The amount of movement of the print head 160 is not limited to equidistant movement intervals.

Furthermore, upon installation of the print head 160, the position of the nozzle under measurement is specified within a particular range of error, as a distance from a head installation abutment reference position. Therefore, the approximate transit position of the liquid droplet that is to be measured as indicated by the dotted line in FIGS. 22A and 22B is identified from this nozzle position. Therefore, for example, it is possible to specify that the liquid droplet passes within a range of ±50 µm of a position which is X mm from the abutment reference position.

Therefore, in the present embodiment, a position which is X mm−50 μm from the abutment reference position in relation to the nozzle under measurement is taken as the measurement start position, a position which is X mm+50 μm is taken as the measurement end position, and the position of the print head 160 is changed successively in prescribed intervals by means of the precise head location and movement mechanism 70 in such a manner that determination of the liquid droplet is carried out by the optical system at each of the locations of the head.

Here, the intensity distribution of the laser light condensed by the spherical lens 48, which is a first condensing lens, is a Gaussian distribution as illustrated in FIGS. 19B and 19C described above.

The liquid droplet emitted from the print head 160 is ejected toward the condensing point of the spherical lens 48 in terms of the Y direction, and in a state where the print head 160 and the optical system are relatively located at the position where the droplet passes through the laser light, a portion of the laser light is shielded as illustrated in FIG. 19A, and therefore the liquid droplet is determined by the resulting fall in the amount of light determined by the photodiode 60 when the liquid droplet passes through the laser light, as illustrated in FIG. 19D.

In other words, when liquid droplets are ejected while varying the relative positions of the print head 160 and the optical system, there are change in the flight position of the ejected liquid droplet and change in the condensing position of the laser light, as in the case of liquid droplets d1 and d2 in FIG. 19A, and therefore, since the intensity distribution of the laser light is a Gaussian distribution as illustrated in FIGS. 19B and 19C, the amount of light determined by the photodiode 60 varies in accordance with the position at which the liquid droplet passes through the laser light. Consequently, a waveform of the voltage change which corresponds to the transit position of the liquid droplet through the laser light is obtained, as illustrated in FIG. 19D, from the signal sampling device 72 which samples an electrical signal that is directly proportional to the amount of light determined by the photodiode 60.

In the present embodiment, the whole of the measurement device, and the laser light source 50 are maintained at a substantially uniform temperature by temperature adjustment performed by a temperature adjustment device which is not illustrated, and therefore the intensity distribution of the laser light illustrated in FIGS. 19A to 19D remains in a substantially uniform state with respect to position, and furthermore, the amount of light is kept to a substantially uniform state by a light amount feedback device (not illustrated).

Furthermore, as stated above, the print head 160 is located in position by the precise head location and movement mechanism 70, and in the present embodiment, it is possible to identify the position of the print head 160 to a resolution of 50 nm.

Therefore, firstly, the relative positions of the print head 160 and the optical system are adjusted in such a manner that the peak portion of the Gaussian distribution illustrated in FIGS. 19B and 19C coincides with the designed (ideal) transit position of the liquid droplet ejected from the nozzle under measurement. The relative positions of the print head 160 and the optical system are changed progressively as described above, and the relative positions of the print head 160 and the optical system at the time of the greatest reduction in the amount of light due to shielding of the laser light by the liquid droplet ejected from the nozzle under measurement is measured. From the relative positions of the print head 160 and the optical system measured in this way, it is then possible to determine the actual flight position with respect to the positional reference of the print head 160, for the liquid droplet ejected from the nozzle forming the measurement object.

For example, in the case illustrated in FIG. 19D, the liquid droplet d1 transits through the position where the amount of laser light is greatest, and therefore it is possible to determine the actual flight position of the liquid droplet ejected from the nozzle forming the measurement object, in terms of a position from the positional reference of the print head 160, on the basis of the relative positions of the head 160 and the optical system when this liquid droplet d1 is ejected.

Thereupon, it is possible to determine the variation in the flight position of the liquid droplet by comparing the actual flight position from the positional reference of the print head 160 thus determined, with the designed (ideal) flight position from the positional reference of the print head 160.

By determining the actual flight position from the positional reference of the print head 160 in this way for the liquid droplets from respective nozzles, and comparing these respective flight positions with a design value (ideal value), it is possible to determine the variation in the flight position of the liquid droplets for each of the nozzles.

However, if the liquid droplet ejected from a particular nozzle shields the laser light, then in order to find the positional relationship between the print head 160 and the optical system at which the greatest reduction in the amount of light is achieved, it is necessary to perform measurement a large number of times while finely changing the positions of the print head 160 and the optical system. Therefore, efficiency is poor. In the present embodiment, the variation in the ejection position is measured at a position of 0.7 mm from the nozzle surface of the print head 160, and in this position the error in the positional variation of the print head 160 has a value of σ=0.7 μm, and therefore in order to determine this error, in practice it is necessary to repeat the measurement described above at intervals of 0.1 μm and to find the positional relationship between the print head 160 and the optical system at which the greatest decline in the amount of light occurs.

In other words, if the positions where a liquid droplet may be considered to be present are in the range of ±50 μm with respect to the designed position, and measurement is performed at intervals of 0.1 μm in this range, then it is necessary to carry out a maximum of 1001 measurements.

In recent years there has been a tendency for the number of nozzles to increase, and following this trend, the print head 160 according to the present embodiment has approximately 35,000 nozzles per color and a total of 140,000 nozzles for the four colors, when installed in an apparatus. Therefore, in order to carry out measurement for the nozzles of one apparatus, it is necessary to carry out more than 140,000,000 measurement operations. This number of measurements can be reduced to some extent assuming that the measurement range can be narrowed because of the nozzles having a small margin of error, but it does not provide a fundamental solution.

In the present embodiment, the positional relationship between the print head 160 and the optical system during the measurement described above is arranged so as to have equidistant intervals which are set to be considerably greater than the interval of 0.1 μm stated above as necessary in order to determine the error; for example, it is moved at intervals of 2 μm or 5 μm, and the reduction in the amount of light when the liquid droplet shields the laser light is thus measured in a reduced number of measurement positions. The measurement values thus obtained are subjected to processing by the data processing method described below by means of the liquid droplet characteristics calculation device 22 in FIGS.

22A and 22B, and the position at which the liquid droplet causes the greatest reduction in the amount of light, in other words, the position when the liquid droplet passes through the light axis having the greatest laser light intensity, is determined in respect of these measurement values, and the flight positions of the liquid droplets ejected from the respective nozzles are determined on the basis of the positional relationship between the print head 160 and the optical system at that time.

The data processing method used to determine from the measurement values the position at which the liquid droplet passes through the light axis having the greatest laser light intensity is described below.

Figure 23A:
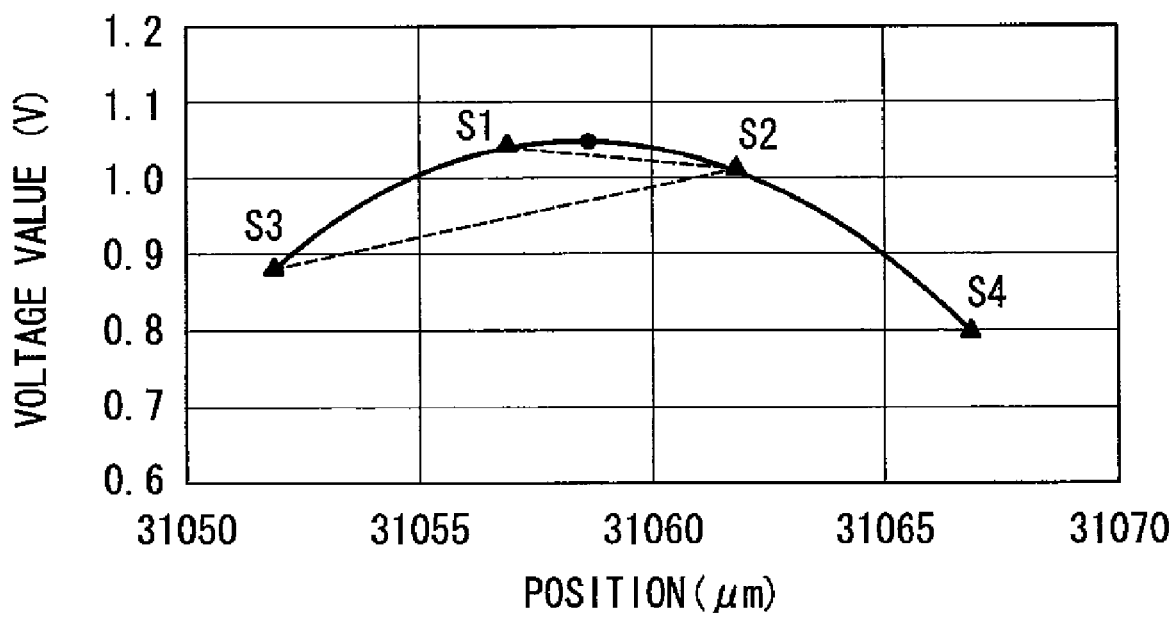
FIGS. 23A and 23B are diagrams showing the measurement results of the amount of reduction in the amount of light when a liquid droplet ejected from a nozzle forming a measurement object shields the laser light.
Figure 23B:
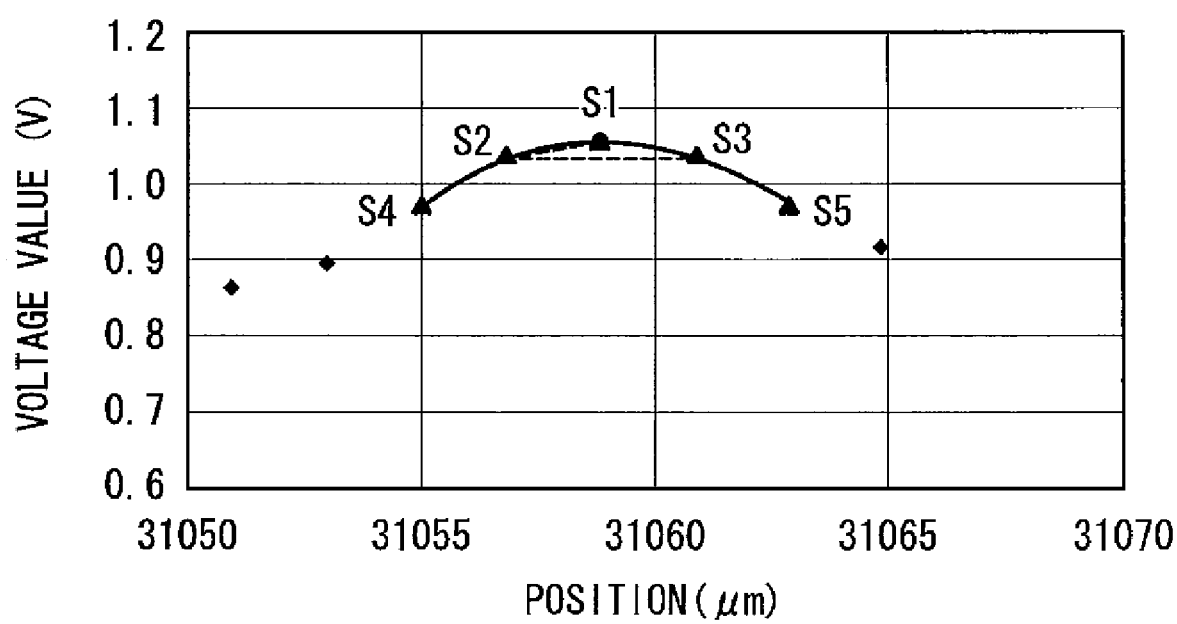

Figs- 23A and 23B are diagrams showing the measurement results of the amount of reduction in the amount of light when a liquid droplet ejected from a nozzle forming a measurement object shields the laser light. FIG. 23A shows the results of measurements carried out by moving the print head 160 at intervals of 5 μm, and FIG. 23B shows the results of measurements carried out by moving the print head 160 at intervals of 2 μm.

In FIGS. 23A and 23B, the horizontal axis represents the relative positions of the print head 160 and the optical system and indicates a coordinates value showing the distance from a location reference position on the print head 160, in units of μm. The vertical axis indicates a voltage value (unit: V) as a measurement value, as obtained by means of the signal sampling device 72 sampling the output reduction in the amount of light determined by the photodiode 60. In FIGS. 23A and 23B, the measurement values at respective measurement points are plotted using triangle and diamond symbols, but of these values, the measurement values used for the calculation performed in the data processing method described below are those plotted by the triangle symbols. The reference numerals S1 to S5 are respectively assigned to the triangular plot marks. These numerals S1 to S5 are assigned in descending order from the largest absolute measurement value.

In FIG. 23A, the reduction in the amount of light is greatest at the measurement point assigned with numeral S1 (below, the measurement points assigned with the numerals S2, S3, S4, S5 are represented similarly to the measurement point S1), and the next greatest reduction in the amount of light is at the measurement point S2. In other words, S1, S2, S3, S4 and S5 are assigned in order of decreasing reduction in the amount of light.

Therefore, it is estimated that the position where the reduction in the amount of light is greatest, in other words, the position where the liquid droplet passes through the light axis having the greatest laser light intensity (in the drawings, the position plotted by the circular symbols), is situated between the measurement point S1 and the measurement point S2. In FIG. 23A, the measurement range of the reduction in the amount of light is taken to be 20 μm; the measurement point S5 lied outside of this measurement range; and a measurement value for the reduction in the amount of light could not be obtained for this point.

Similarly, in FIG. 23B, it is estimated that the position where the liquid droplet passes through the light axis having the greatest laser light intensity is situated between the measurement point S1 and the measurement point S2, and as illustrated in FIG. 23B, it is estimated to be in the vicinity of the measurement point S1.

First Example Of Data Processing Method

Firstly, a first example of a data processing method which determines the position at which the liquid droplet passes through the light axis having the greatest laser light intensity, from the measurement values illustrated in FIGS. 23A and 23B described above, will be explained.

In the first example of the data processing method, firstly, the measurement point where the reduction in the amount of light is the greatest is determined from the measurement points. Next, the respective two measurement points on either side of the measurement point of greatest reduction in the amount of light thus determined are taken as calculation objects. In this case, if a portion of the measurement points cannot be measured since they lie outside the measurement range, then only those measurement points for which a measurement value can be obtained are taken as calculation objects.

For example, in FIG. 23B, the measurement point having the greatest reduction in the amount of light is the measurement point S1, and the measurement points S2, S3, S4, S5 which are the respective two points on either side of this point S1 are taken as calculation objects. Furthermore, in FIG. 23A, the measurement point S5 ties outside the measurement range and therefore a measurement value cannot be obtained for this point. Accordingly, the measurement points S2 to S4 for which measurement values can be obtained are taken as the calculation objects.

Below, in the coordinate system illustrated in FIGS. 23A and 23B, the measurement values (the coordinate value of the voltage value IS) at the measurement points S1 to S5 are represented as IS1 to IS5, and the positions of the measurement points S1 to S5 (the coordinates value of the relative position XS of the print head 160 and the optical system) are represented as XS1 to XS5.

Firstly, in a case where it has not been possible to obtain any of the measurement values IS1 to IS5 relating to the five measurement points S1 to S5, the interpolation formula indicated by the following equation in Formula 1 is used. The coefficients a, b, c, d of this interpolation formula are determined by a least square method from the positions XS1 to XS5 of the measurement points S1 to S5 and the measurement values IS1 to IS5.

$$IS = a \times XS^3 + b \times XS^2 + c \times XS + d \qquad \text{Formula 1}$$

Next, the equation in Formula 1 is differentiated to give Formula 2 below.

$$IS' = 3a \times XS^2 + 2b \times XS + c \qquad \text{Formula 2}$$

Thereupon, in Formula 2, two solutions for XS which give IS'=0 are determined, and the XS value which is a real number and which is closer to the value of XS1 is taken as the position at which the liquid droplet passes through the light axis having the greatest laser light intensity.

In a hypothetical case where both of the two solutions for XS thus determined are imaginary numbers, or a case where the value of XS1 is not situated between the XS2 and XS3, then either the measurement points have not been selected appropriately, or there is a high probability that the ejection from the nozzle is extremely instable. Therefore, a message indicating that "the solutions for XS are imaginary numbers" or "the value of XS1 is not between XS2 and XS3" is displayed on a display device (not illustrated) of the liquid droplet measurement apparatus, and XS1 is taken to be the position at which the liquid droplet passes through the light axis having the greatest laser light intensity.

Furthermore, if it has been possible to obtain measurement values IS1 to IS4 for the measurement points S1 to S4, or if it has been possible to obtain measurement values IS1 to IS3 for the measurement points S1 to S3, then the interpolation function indicated by the equation in Formula 3 below is used. The coefficients b, c, d of this interpolation function are determined by a least square method from the positions XS1 to XS4 of the measurement points S1 to S4 and the measurement values IS1 to IS4, or from the positions XS1 to XS3 of the measurement points S1 to S3 and the measurement values IS1 to IS3.

$$IS = b \times XS^2 + c \times XS + d \qquad \text{Formula 3}$$

Next, the equation in Formula 3 is differentiated to give the equation in Formula 4 below.

$$IS' = 2b \times XS + c \qquad \text{Formula 4}$$

Thereupon, in Formula 4, a solution for XS which gives IS'=0 is determined, and this XS value is taken as the position at which the liquid droplet passes through the light axis having the greatest laser light intensity.

In a hypothetical case where b=0, or a case where the value of XS1 is not situated between the XS2 and XS3, then there is a high probability that either the measurement points have not been selected appropriately or the ejection from the nozzle is extremely instable. Therefore, a message indicating that "b=0" or "the value of XS1 is not between XS2 and XS3" is displayed on a display device (not illustrated) of the liquid droplet measurement apparatus, and XS1 is taken to be the position at which the liquid droplet passes through the light axis having the greatest laser light intensity.

Furthermore, if it has been possible to obtain measurement values in respect of the measurement points S1 and S2 only, then XS1 is taken to be the position where the liquid droplet passes through the light axis having the greatest laser light intensity.

Second Example Of Data Processing Method

Next, a second example of the data processing method which improves on the first example of the data processing method described above will be explained.

In this second example of a data processing method, by optimizing the measurement points which are taken as calculation objects of the measurement values illustrated in FIGS. 23A and 23B, it is possible to determine the position at which the liquid droplet passes through the light axis having the greatest laser light intensity, more accurately than in the first example of the data processing method.

More specifically, firstly, it is judged whether or not the relationship in either of the following formulas is satisfied by the measurement values IS1, IS2, IS3 of the measurement points S1, S2 and S3 illustrated in FIGS. 23A and 23B and the positions XS1, XS2 and XS3. Here, |XS1−XS2| indicates the absolute value of the difference between XS1 and XS2, and |XS2−XS3| indicates the absolute value of the difference between XS2 and XS3.

$$\frac{(IS1 - IS2)}{|XS1 - XS2|} > \frac{(IS2 - IS3)}{|XS2 - XS3|} \qquad \text{Formula 5}$$

$$\frac{(IS1 - IS2)}{|XS1 - XS2|} \leq \frac{(IS2 - IS3)}{|XS2 - XS3|} \qquad \text{Formula 6}$$

Therefore, if it has been possible to obtain measurement values for the measurement points S1 to S5 when the relationship in Formula 5 is satisfied (FIG. 23B), then the position at which the liquid droplet passes through the light axis having the greatest laser light intensity is determined by means of the method described in the first example using Formula 1 and Formula 2.

Here, the relationship in Formula 5 indicates a condition where the gradient of the straight line (indicated by a dotted line in FIG. 23B) linking the measurement point S1 and the measurement point S2 as illustrated in FIG. 23B is greater than the gradient of the straight line (indicated by a dotted line in FIG. 23B) which links the measurement point S2 and the measurement point S3. Under these conditions, as illustrated in FIG. 23B, the measurement point S2 and the measurement point S3, and the measurement point S4 and the measurement point S5 are disposed respectively in symmetrical positions centered about the measurement point S1. Therefore, by using all of the measurement values IS1 to IS5 and the positions XS1 to XS5 relating to the measurement points S1 to S5 in the calculation, it is possible to determine with good accuracy the position where the liquid droplet passes through the light axis having the greatest laser light intensity.

On the other hand, if it has been possible to obtain measurement values for the measurement points S1 to S4 when the relationship in Formula 6 is satisfied (FIG. 23A), or if it has been possible to obtain measurement values for the measurement points S1 to S5 when the relationship in Formula 6 is satisfied, then the position at which the liquid droplet passes through the light axis having the greatest laser light intensity is determined by means of the to calculation method described in the first example using Formula 3 and Formula 4 stated above.

Here, the relationship in Formula 6 indicates a condition where the gradient of the straight line which links the measurement point S1 and the measurement point S2 is smaller than or equal to the gradient of the straight line which links the measurement point S2 and the measurement point S3, as illustrated in FIG. 23A. Under these conditions, as illustrated in FIG. 23A, if it is has been possible to obtain measurement values for the measurement points S1 to S4, then the measurement point S1 and the measurement point S2, and the measurement point S3 and the measurement point S4 are disposed at substantially symmetrical positions centered on the estimated value of the position where the liquid droplet passes through the light axis having the greatest laser light intensity.

Therefore, by using the measurement values IS1 to IS4 and the positions XS1 to XS4 relating to the measurement points S1 to S4 in the calculation, it is possible to determine with good accuracy the position where the liquid droplet passes through the light axis having the greatest laser light intensity.

Figure 24:
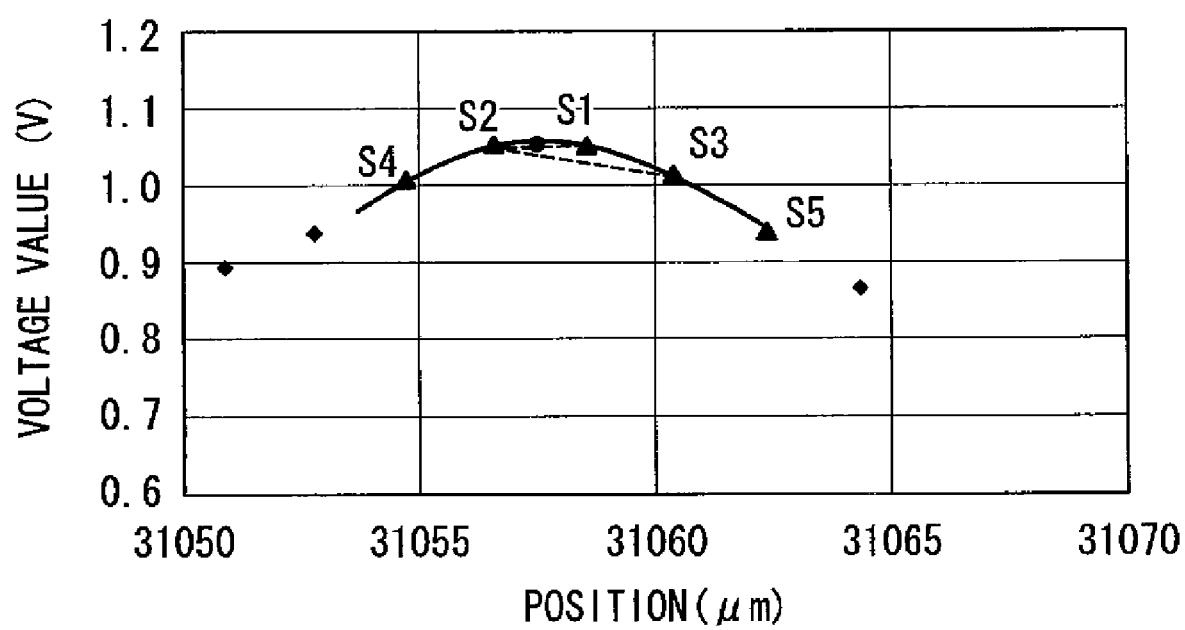
FIG. 24 is a diagram showing the results of measuring the reduction in the amount of light when it has been possible to obtain measurement values for the measurement points S1 to S5 in a case where the relationship in Formula 6 is satisfied.

Furthermore, under conditions which satisfy the relationship in Formula 6, as illustrated in FIG. 24, if it is has been possible to obtain measurement values for the measurement points S1 to S5, then similarly to the foregoing, the measurement point S1 and the measurement point S2, and the measurement point S3 and the measurement point S4 are disposed at substantially symmetrical positions centered on the estimated value of the position where the liquid droplet passes through the light axis having the greatest laser light intensity.

Therefore, in this case, the measurement point S5 of the measurement points S1 to S5 is excluded from the calculation, and by using the measurement values IS1 to IS4 and the positions XS1 to XS4 relating to the measurement points S1 to S4 in the calculation, it is possible to determine with good accuracy the position where the liquid droplet passes through the light axis having the greatest laser light intensity.

Therefore, if it has been possible to obtain measurement values for the measurement points S1 to S4 when the relationship in Formula 5 is satisfied, the measurement point S4 is also included as a calculation object, and the position at which the liquid droplet passes through the light axis having the greatest laser light intensity is determined on the basis of the measurement values IS1 to 1S4 with respect to the measurement points S1 to S4, and the positions XS1 to XS4, by means of the calculation method described in the first example using Formula 3 and Formula 4 stated above.

Furthermore, if it has been possible to obtain measurement values for the measurement points S1 to S3, then regardless of whether or not the relationship in Formula 5 is satisfied or whether or not the relationship in Formula 6 is satisfied, the measurement point S3 is also included as a calculation object, and the position at which the liquid droplet passes through the light axis having the greatest laser light intensity is determined on the basis of the measurement values IS1 to IS3 with respect to the measurement points S1 to S3, and the positions XS1 to XS3, by means of the calculation method described in the first example using Formula 3 and Formula 4 stated above.

Furthermore, if it has been possible to obtain measurement values in respect of the measurement points S1 and S2 only, then XS1 is taken to be the position where the liquid droplet passes through the light axis having the greatest laser light intensity.

By selecting appropriate measurement points as measurement objects from these plurality of measurement points, then the measurement points used for calculation in the interpolation functions are optimized as far as possible to measurement points which are disposed in symmetrical positions, and therefore it is possible to improve the accuracy of the calculation for finding the estimated value of the position where the liquid droplet passes through the light axis having the greatest laser light intensity.

As described above, in the second example of the data processing method, it is possible to increase the accuracy of calculation by optimizing the measurement points used as calculation objects, from amongst a plurality of high measurement points which have a high measurement value, on the basis of the relationship between the magnitude of the measurement value and the corresponding position, and by selecting the order of the interpolation function which is used in calculation.

It is also possible to adopt a composition which combines the composition of the liquid droplet measurement apparatus 7 according to the seventh embodiment and a composition of the liquid droplet measurement apparatuses 1 to 4 according to the first to fourth embodiments.

Moreover, in the seventh embodiment, in describing the concrete data processing method relating to the method of measuring the position of the liquid droplet, an apparatus which measures the characteristics of the liquid droplets by determining liquid droplets by means of an optical sensor, using an optical device based on laser light, is described, but the data processing method described in the seventh embodiment is not limited to this apparatus, and this method may also be applied, for example, to an apparatus which measures the characteristics of liquid droplets by using a determination device which determines liquid droplets by determining the electrostatic capacitance between two electrodes when a liquid droplet adheres between the electrodes.

According to the seventh embodiment, it is possible to determine the reduction in the amount of light due to transit of a liquid droplet at respective positions, by means of the photodiode 60, while changing the relative positions of the print head 160 and the optical system, and the position of the liquid droplet can be calculated from the reduction in the amount of light determined at the respective positions.

Furthermore, since the position of the liquid droplet is determined by making measurement at a reduced number of measurement points for a nozzle under measurement and then using an interpolation function which has coefficients determined by a least square method, it is possible greatly to shorten the measurement time.

Moreover, in determining the interpolation function, measurement points which are positioned symmetrically with respect to the estimated value of the position where the liquid droplet passes through the light axis having the greatest laser light intensity (the position estimated to be the solution) are used as the calculation objects, and therefore it is possible to improve the accuracy of calculating the positions of the liquid droplets by means of interpolation.

Composition of Inkjet Recording Apparatus

Next, the inkjet recording apparatus is described as a concrete application example of the application of the liquid ejection apparatuses (according to first to seventh embodiments) described above. In the case of the present application example, the liquid droplet measurement apparatuses (according to first to seventh embodiments) described above are disposed in the print head units 112K, 112C, 112M and 112Y described below. A part from the present application example, the liquid droplet measurement apparatuses (according to first to seventh embodiments) described above may also be applied as one constituent apparatus of an inkjet recording system, which is separate and independent from an inkjet recording apparatus.

Figure 25:
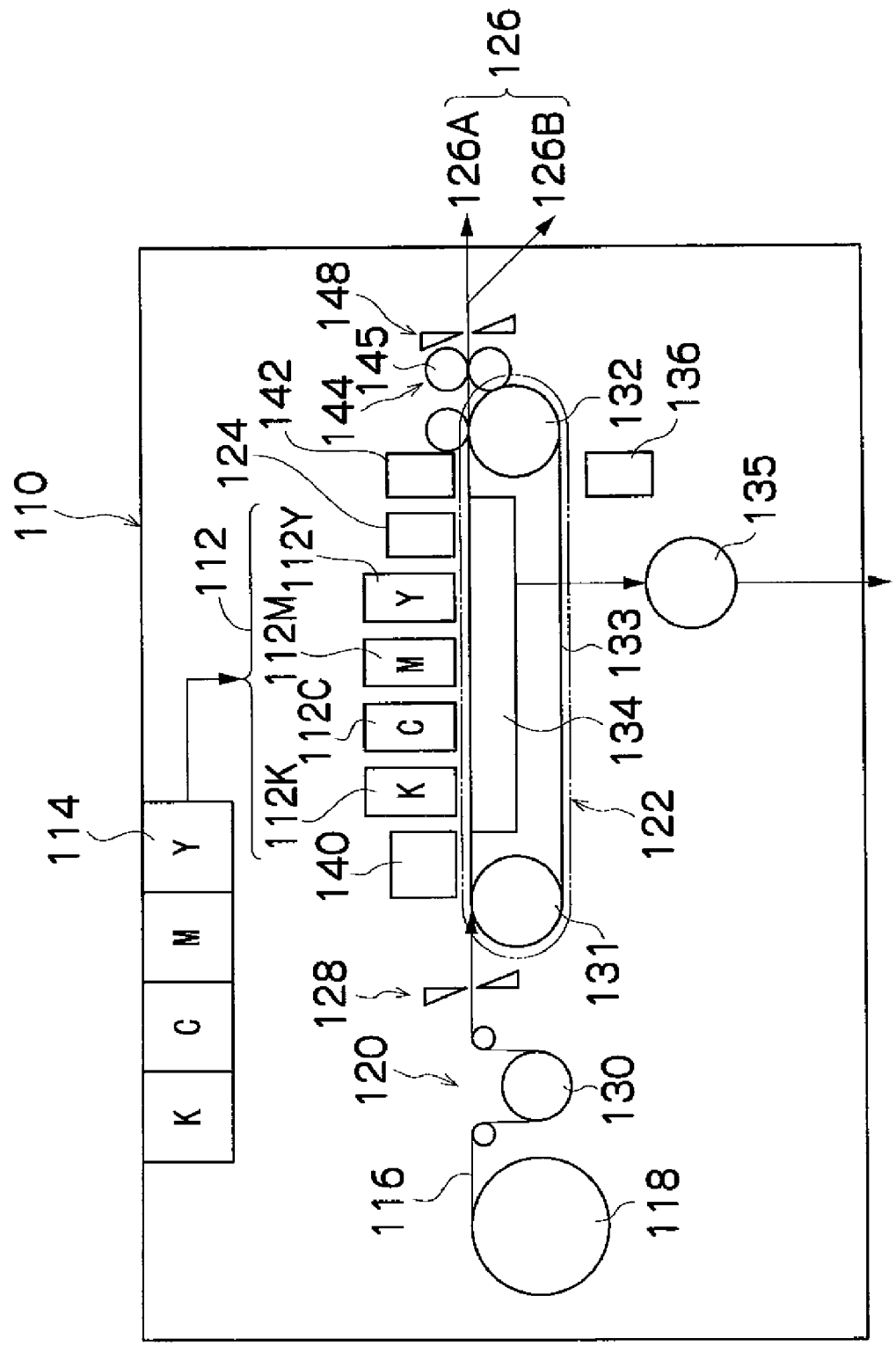
FIG. 25 is a general schematic drawing of an inkjet recording apparatus.

FIG. 25 is a general configuration diagram of an inkjet recording apparatus. As illustrated in FIG. 25, the inkjet recording apparatus 110 comprises: a print unit 112 having a plurality of print head units 112K, 112C, 112M, and 112Y provided for ink colors of black (K), cyan (C), magenta (M), and yellow (Y), respectively; an ink storing and loading unit 114 for storing inks of K, C, M and Y to be supplied to the print head units 112K, 112C, 112M, and 112Y; a paper supply unit 118 for supplying recording paper 116; a decurling unit 120 removing curl in the recording paper 116; a belt conveyance unit 122 disposed facing the nozzle face (ink-droplet ejection face) of the print unit 112, for conveying the recording paper 116 while keeping the recording paper 116 flat; a print determination unit 124 for reading the printed result produced by the print unit 112; and a paper output unit 126 for outputting image-printed recording paper (printed matter) to the exterior.

The ink storing and loading unit 114 has ink tanks for storing the inks of K, C, M and Y to be supplied to the print head units 112K, 112C, 112M, and 112Y, and the tanks are connected to the print head units 112K, 112C, 112M, and 112Y by means of prescribed channels.

The ink storing and loading unit 114 has a warning device (for example, a display device or an alarm sound generator) for warning when the remaining amount of any ink is low, and has a mechanism for preventing loading errors among the colors.

In FIG. 25, a magazine for rolled paper (continuous paper) is shown as an example of the paper supply unit 118; however, more magazines with paper differences such as paper width and quality may he jointly provided. Moreover, papers may be supplied with cassettes that contain cut papers loaded in layers and that are used jointly or in lieu of the magazine for rolled paper.

The recording paper 116 delivered from the paper supply unit 118 retains curl due to having been loaded in the magazine. In order to remove the curl, heat is applied to the recording paper 116 in the decurling unit 120 by a heating drum 130 in the direction opposite from the curl direction in the magazine.

In the case of the configuration in which roll paper is used, a cutter (first cutter) 128 is provided as illustrated in FIG. 25, and the continuous paper is cut into a desired size by the cutter 128. When cut papers are used, the cutter 128 is not required.

The decurled and cut recording paper 116 is delivered to the belt conveyance unit 122. The belt conveyance unit 122 has a configuration in which an endless belt 133 is set around rollers 131 and 132 so that the portion of the endless belt 133 facing at least the nozzle face of the print unit 112 and the sensor face of the print determination unit 124 forms a horizontal plane (flat plane).

The belt 133 has a width that is greater than the width of the recording paper 116, and a plurality of suction apertures (not shown) are formed on the belt surface. A suction chamber 134 is disposed in a position facing the sensor surface of the print determination unit 124 and the nozzle surface of the print unit 112 on the interior side of the belt 133, which is set around the rollers 131 and 132, as illustrated in FIG. 25. The suction chamber 134 provides suction with a fan 135 to generate a negative pressure, and the recording paper 116 is held on the belt 133 by suction. It is also possible to use an electrostatic attraction method, instead of a suction-based attraction method.

The belt 133 is driven in the clockwise direction in FIG. 25 by the motive force of a motor (shown as a motor 188 in FIG. 30) being transmitted to at least one of the rollers 131 and 132, which the belt 133 is set around, and the recording paper 116 held on the belt 133 is conveyed from left to right in FIG. 25.

Since ink adheres to the belt 133 when a marginless print job or the like is performed, a belt-cleaning unit 136 is disposed in a predetermined position (a suitable position outside the printing area) on the exterior side of the belt 133.

A heating fan 140 is disposed on the upstream side of the print unit 112 in the conveyance pathway formed by the belt conveyance unit 122. The heating fan 140 blows heated air onto the recording paper 116 to heat the recording paper 116 immediately before printing so that the ink deposited on the recording paper 116 dries more easily.

Figure 26:
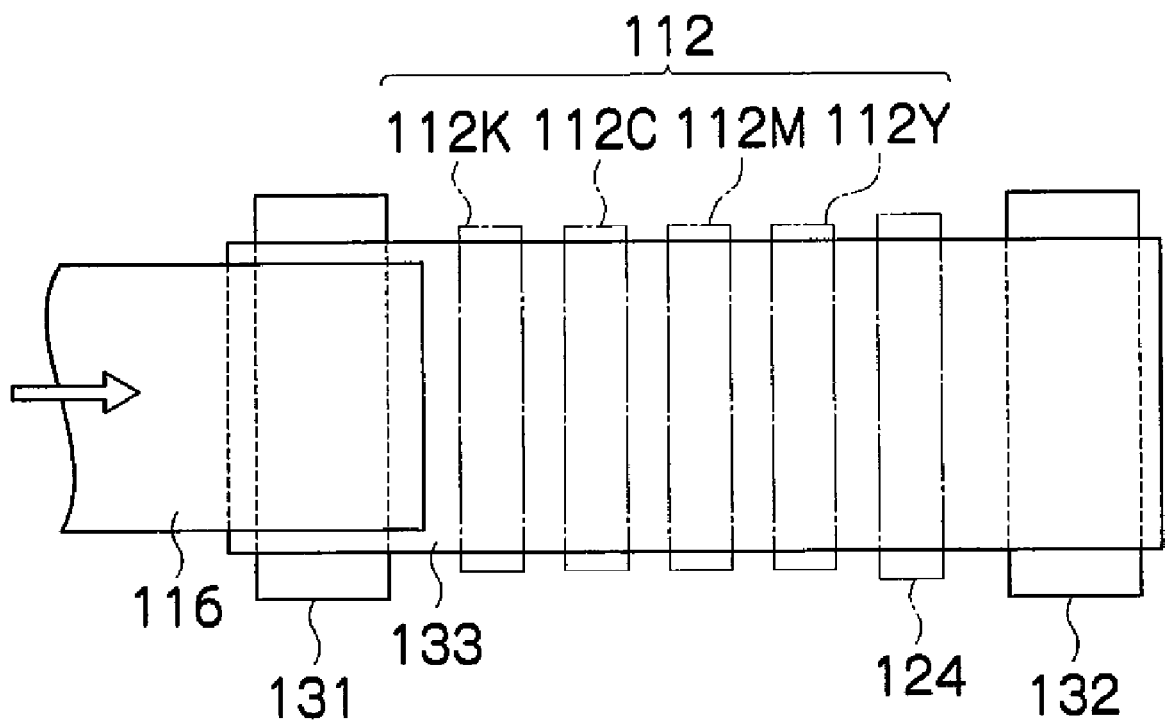
FIG. 26 is a plan view of the principal part of the peripheral area of a print unit in the inkjet recording apparatus illustrated in FIG. 25.

The print head units 112K, 112C, 112M and 112Y of the print unit 112 are full line heads having a length corresponding to the maximum width of the recording paper 116 used with the inkjet recording apparatus 110, and comprising a plurality of nozzles for ejecting ink arranged on a nozzle face through a length exceeding at least one edge of the maximum-size recording medium (namely, the full width of the printable range) (see FIG. 26). As described above, a liquid droplet measurement apparatus (1 to 7) comprising a determination device for determining the volume, velocity and position of ink (an ink droplet), and an optical device for forming laser light into a prescribed shape for the purposes of determination, and the like, is provided in each of the respective print head units 112K, 112C, 112M and 112Y.

The print head units 112K, 112C, 112M and 112Y are arranged in color order (black (K), cyan (C), magenta (M), yellow (Y)) from the upstream side in the feed direction of the recording paper 116, and these respective print head units 112K, 112C, 112M and 112Y are fixed extending in a direction substantially perpendicular to the conveyance direction of the recording paper 116.

A color image can be formed on the recording paper 116 by ejecting inks of different colors from the print head units 112K, 112C, 112M and 112Y, respectively, onto the recording paper 116 while the recording paper 116 is conveyed by the belt conveyance unit 122.

By adopting a configuration in which the full line print head units 112K, 112C, 112M and 112Y having nozzle rows covering the full paper width are provided for the respective colors in this way, it is possible to record an image on the full surface of the recording paper 116 by performing just one operation of relatively moving the recording paper 116 and the print unit 112 in the paper conveyance direction (the sub-scanning direction), in other words, by means of a single sub-scanning action. Higher-speed printing is thereby made possible and productivity can be improved in comparison with a shuttle type head configuration in which a head reciprocates in the main scanning direction.

Although the configuration with the KCMY four standard colors is described in the present embodiment, combinations of the ink colors and the number of colors are not limited to those. Light inks, dark inks or special color inks can be added as required. For example, a configuration is possible in which inkjet heads for ejecting light-colored inks such as light cyan and light magenta are added. Furthermore, there are no particular restrictions of the sequence in which the heads of respective colors are arranged.

The print determination unit 124 illustrated in FIG. 25 has an image sensor (line sensor or area sensor) for capturing an image of the droplet ejection result of the print unit 112, and functions as a device to check the ejection characteristics, such as blockages, landing position error, and the like, of the nozzles, on the basis of the image of ejected droplets read in by the image sensor.

A CCD area sensor in which a plurality of photoreceptor elements (photoelectric transducers) are arranged two-dimensionally on the light receiving surface is suitable for use as the print determination unit 124 of the present example. An area sensor has an imaging range which is capable of capturing an image of at least the full area of the ink ejection width (image recording width) of the respective print head units 112K, 112C, 112M and 112Y.

Furthermore, it is also possible to use a line sensor instead of the area sensor. In this case, a desirable composition is one in which the line sensor has rows of photoreceptor elements (rows of photoelectric transducing elements) with a width that is greater than the ink droplet ejection width (image recording width) of the respective print head units 112K, 112C, 112M and 112Y. A test pattern or the target image printed by the print head units 112K, 112C, 112M, and 112Y of the respective colors is read in by the print determination unit 124, and the ejection performed by each head is determined. The ejection determination includes the presence of the ejection, measurement of the dot size, and measurement of the dot landing position.

A post-drying unit 142 is disposed following the print determination unit 124. The post-drying unit 142 is a device to dry the printed image surface, and includes a heating fan, for example.

A heating/pressurizing unit 144 is disposed following the post-drying unit 142. The heating/pressurizing unit 144 is a device to control the glossiness of the image surface, and the image surface is pressed with a pressure roller 145 having a predetermined uneven surface shape while the image surface is heated, and the uneven shape is transferred to the image surface.

The printed matter generated in this manner is outputted from the paper output unit 126. The target print (i.e., the result of printing the target image) and the test print are preferably outputted separately. In the inkjet recording apparatus 110, a sorting device (not shown) is provided for switching the outputting pathways in order to sort the printed matter with the target print and the printed matter with the test print, and to send them to paper output units 126A and 126B, respectively. When the target print and the test print are simultaneously formed in parallel on the same large sheet of paper, the test print portion is cut and separated by a cutter (second cutter) 148.

Structure of the Print Head Unit

Next, the structure of a print head unit will be described. The print head units 112K, 112C, 112M and 112Y of the respective ink colors have the same structure, and a reference numeral 150 is hereinafter designated to any of the print head units.

Figure 27A:
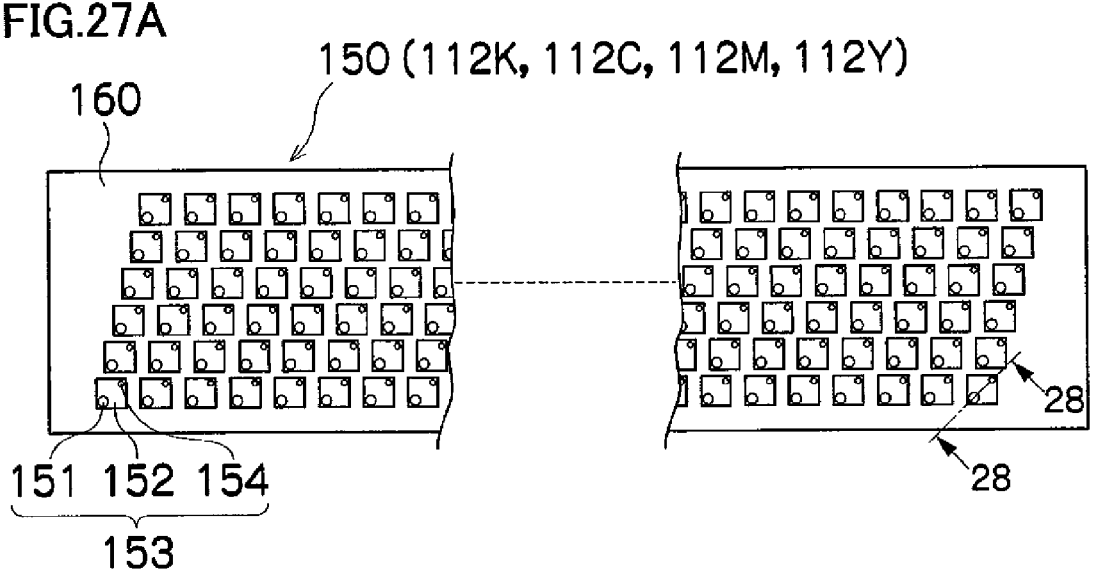
FIGS. 27A to 27C are plan view perspective diagrams showing an example of the structure of a head.

The print head unit 150 has a print head 160 as an ejection device which ejects ink. FIG. 27A is a perspective plan view showing an example of the configuration of the print head 160, FIG. 27B is an enlarged view of a portion thereof, FIG. 27C is a perspective plan view showing another example of the configuration of the print head unit 150, and FIG. 28 is a cross-sectional view taken along the line 28-28 in FIG. 27A, showing the inner structure of a droplet ejection element (an ink chamber unit for one nozzle 151).

The nozzle pitch in the print head 160 should be minimized in order to maximize the density of the dots printed on the surface of the recording paper 116. As illustrated in FIGS. 27A and 27B, the print head 160 according to the present embodiment has a structure in which a plurality of ink chamber prints 153, each comprising a nozzle 151 forming an ink ejection port, a pressure chamber 152 corresponding to the nozzle 151, and the like, are disposed two-dimensionally in the form of a staggered matrix, and hence the effective nozzle interval (the projected nozzle pitch) as projected in the lengthwise direction of the head (the direction perpendicular to the paper conveyance direction) is reduced and high nozzle density is achieved.

The mode of forming one or more nozzle rows through a length corresponding to the entire width of the recording paper 116 in a direction substantially perpendicular to the conveyance direction of the recording paper 116 is not limited to the example described above. For example, instead of the configuration in FIG. 27A, as illustrated in FIG. 27C, a line head having nozzle rows of a length corresponding to the entire width of the recording paper 116 can be formed by arranging and combining, in a staggered matrix, short head modules 150' having a plurality of nozzles 151 arrayed in a two-dimensional fashion.

Figure 27B:
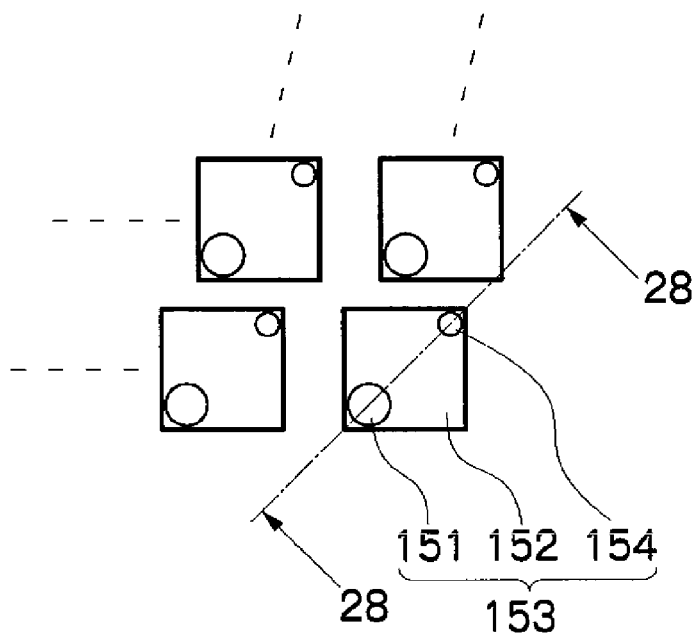
Figure 27C:
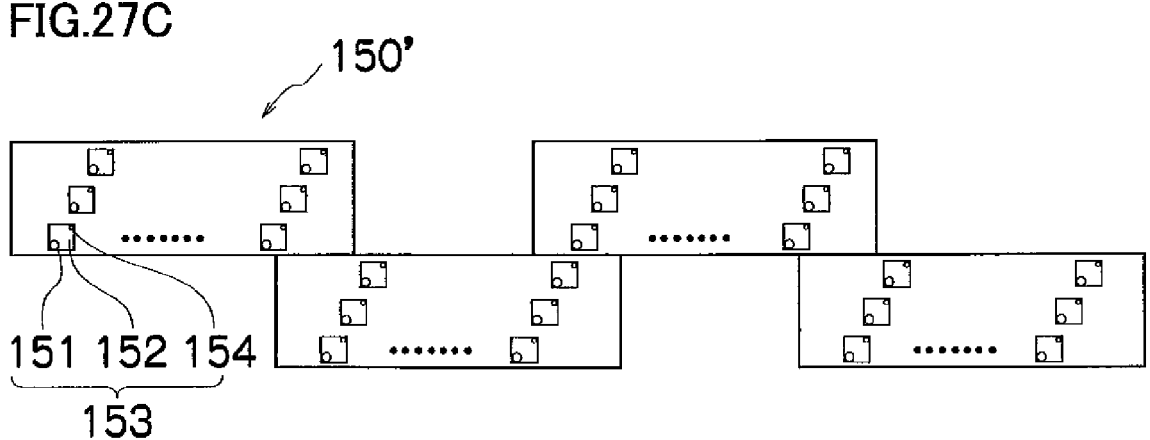
Figure 28:
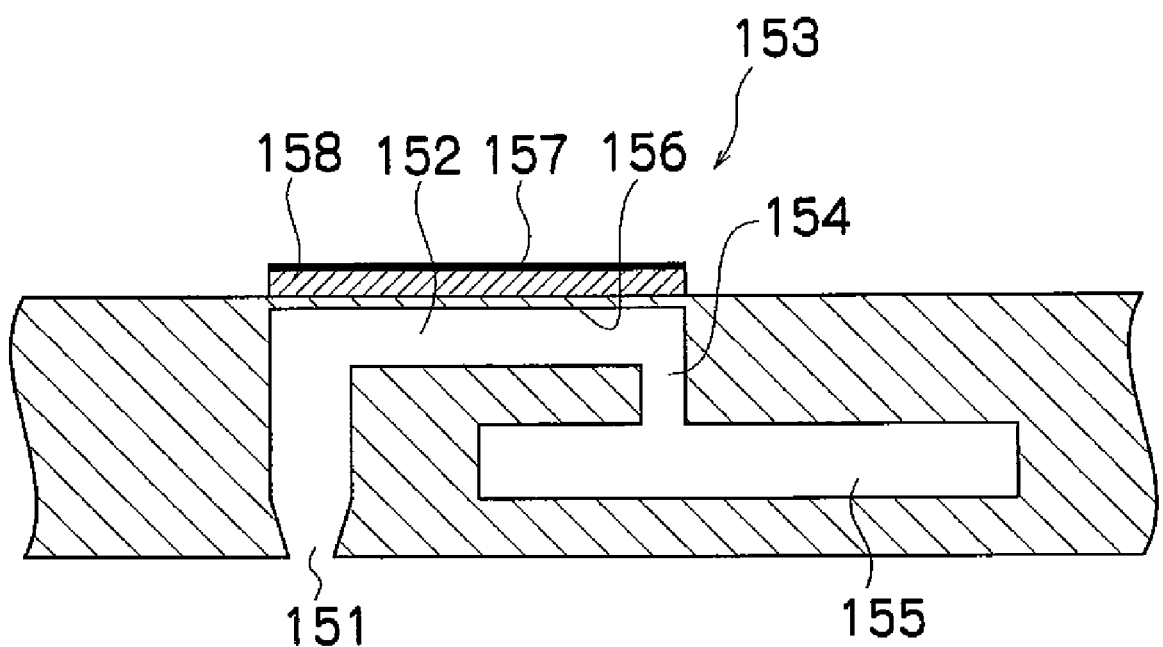
FIG. 28 is a cross-sectional view along line 28-28 in FIGS. 27A and 27B.

As illustrated in FIGS. 27A and 27B, the planar shape of the pressure chamber 152 provided corresponding to each nozzle 151 is substantially a square shape, and an outlet port to the nozzle 151 is provided at one of the ends of a diagonal line of the planar shape, while an inlet port (supply port) 154 for supplying ink is provided at the other end thereof. The shape of the pressure chamber 152 is not limited to that of the present example and various modes are possible in which the planar shape is a quadrilateral shape (diamond shape, rectangular shape, or the like), a pentagonal shape, a hexagonal shape, or other polygonal shape, or a circular shape, elliptical shape, or the like.

The ink chamber unit 153 is constituted by a supply port 154, a pressure chamber 152, a nozzle 151, a pressurization plate 156, an individual electrode 157, an actuator 158, and the like. The respective pressure chambers 152 of the plurality of ink chamber units 153 are connected to the common flow channel 155. As illustrated in FIG. 28, each pressure chamber 152 is connected to a common channel 155 through the supply port 154. The common channel 155 is connected to an ink tank, which is a base tank that supplies ink, and the ink supplied from the ink tank is delivered through the common flow channel 155 to the pressure chambers 152.

An actuator 158 provided with an individual electrode 157 is bonded to a pressure plate (a diaphragm that also serves as a common electrode) 156 which forms the surface of one portion (in FIG. 28, the ceiling) of the pressure chambers 152. When a drive voltage is applied to the individual electrode 157 and the common electrode, the actuator 158 deforms, thereby changing the volume of the pressure chamber 152. This causes a pressure change which results in ink being ejected from the nozzle 151. For the actuator 158, it is possible to adopt a piezoelectric element using a piezoelectric body, such as lead zirconate titanate, barium titanate, or the like. When the displacement of the actuator 158 returns to its original position after ejecting ink, the pressure chamber 152 is replenished with new ink from the common flow channel 155, via the supply port 154.

Figure 29:
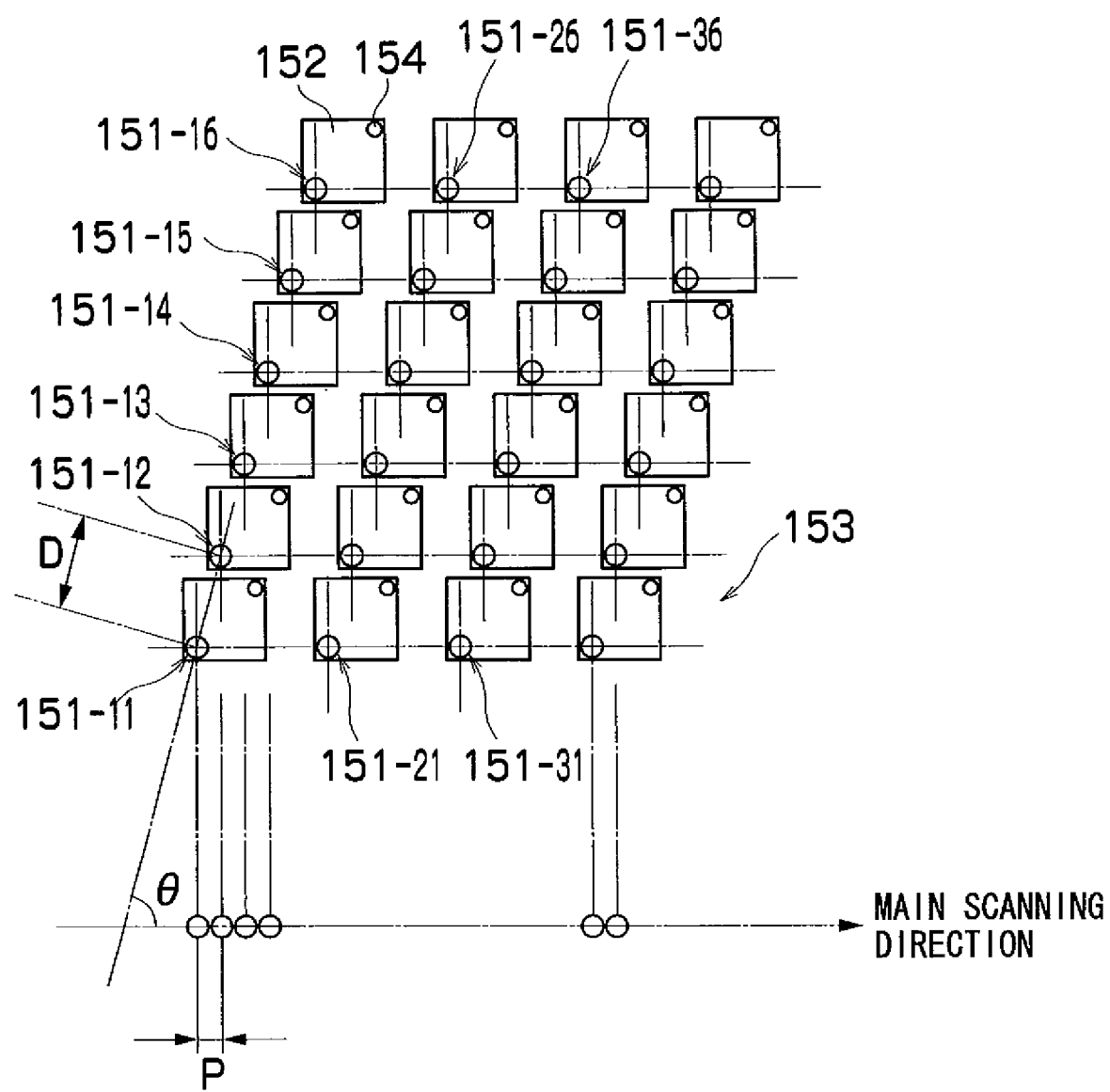
FIG. 29 is an enlarged diagram showing an example of the arrangement of nozzles in a head.

As illustrated in FIG. 29, the high-density nozzle head according to the present embodiment is achieved by arranging a plurality of ink chamber units 153 having the above-described structure in a lattice fashion based on a fixed arrangement pattern, in a row direction which coincides with the main scanning direction, and a column direction which is inclined at a fixed angle of θ with respect to the main scanning direction, rather than being perpendicular to the main scanning direction.

More specifically, by adopting a structure in which a plurality of ink chamber units 153 are arranged at a uniform pitch D in line with a direction forming an angle of θ with respect to the main scanning direction, the pitch P of the nozzles projected so as to align in the main scanning direction is D×cos θ, and hence the nozzles 151 can be regarded to be equivalent to those arranged linearly at a fixed pitch P along the main scanning direction. Such configuration results in a nozzle structure in which the nozzle row projected in the main scanning direction has a high nozzle density of up to 2,400 nozzles per inch.

In a full-line head comprising rows of nozzles that have a length corresponding to the entire width of the image recordable width, the "main scanning" is defined as printing one line (a line formed of a row of dots, or a line formed of a plurality of rows of dots) in the width direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the nozzles from one side toward the other in each of the blocks.

In particular, when the nozzles 151 arranged in a matrix such as that illustrated in FIG. 29 are driven, the main scanning according to the above-described (3) is preferred. More specifically, the nozzles 151-11, 151-12, 151-13, 151-14, 151-15 and 151-16 are treated as a block (additionally; the nozzles 151-21, 151-22, . . . , 151-26 are treated as another block; the nozzles 151-31, 151-32, . . . , 151-36 are treated as another block; . . . ); and one line is printed in the width direction of the recording paper 116 by sequentially driving the nozzles 151-11, 151-12, . . . , 151-16 in accordance with the conveyance velocity of the recording paper 116.

On the other hand, "sub-scanning" is defined as to repeatedly perform printing of one line (a line formed of a row of dots, or a line formed of a plurality of rows of dots) formed by the main scanning, while moving the full-line head and the recording paper relatively to each other.

The direction indicated by one line (or the lengthwise direction of a band-shaped region) recorded by main scanning as described above is called the "main scanning direction", and the direction in which sub-scanning is performed, is called the "sub-scanning direction". In other words, in the present embodiment, the conveyance direction of the recording paper 116 is called the sub-scanning direction and the direction perpendicular to same is called the main scanning direction.

In implementing the present invention, the arrangement of the nozzles is not limited to that of the example illustrated. Moreover, a method is employed in the present embodiment where an ink droplet is ejected by means of the deformation of the actuator 158, which is typically a piezo element (piezo-electric element); however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure applied by these bubbles.

Description of Control System

Figure 30:
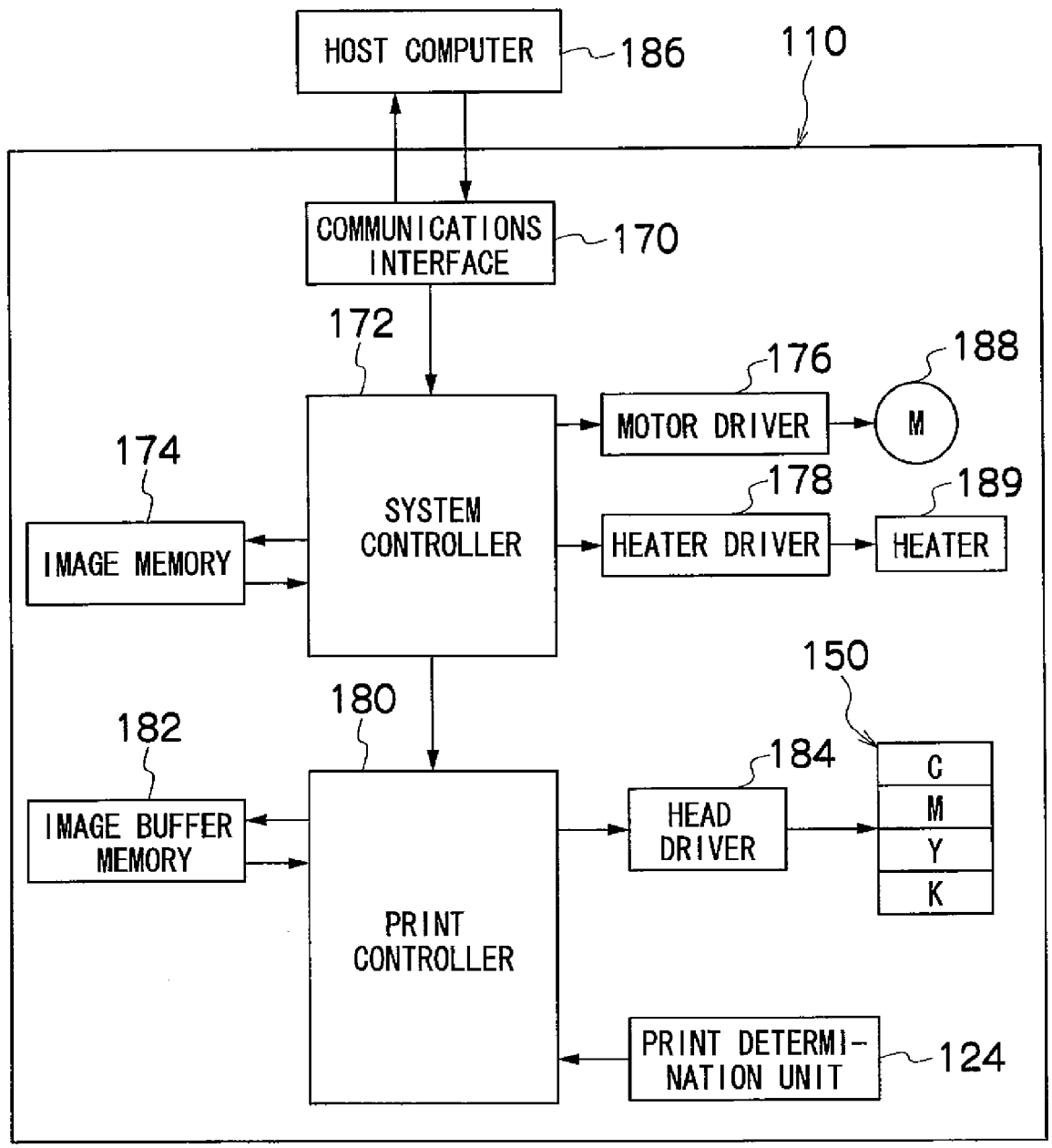
FIG. 30 is a block diagram showing the system composition of the inkjet recording apparatus.

FIG. 30 is a block diagram showing the system configuration of the inkjet recording apparatus 110. As illustrated in FIG. 30, the inkjet recording apparatus 110 comprises a communications interface 170, a system controller 172, an image memory 174, a motor driver 176, a heater driver 178, a print controller 180, an image buffer memory 182, a head driver 184, and the like.

The communications interface 170 is an interface unit (image input unit) serving as an image input device for receiving image data sent from a host computer 186. A serial interface such as USB (Universal Serial Bus), IEEE1394, Ethernet (registered trademark), wireless network, or a parallel interface such as a Centronics interface may be used as the communications interface 170. A buffer memory (not shown) may be mounted in this portion in order to increase the communication speed.

The image data sent from the host computer 186 is received by the inkjet recording apparatus 110 through the communications interface 170, and is temporarily stored in the image memory 174. The image memory 174 is a storage device for storing images inputted through the communications interface 170, and data is written and read to and from the image memory 174 through the system controller 172. The image memory 174 is not limited to a memory composed of semiconductor elements, and a hard disk drive or another magnetic medium may be used.

The system controller 172 is constituted by a central processing unit (CPU) and peripheral circuits thereof, and the like, and it functions as a control device for controlling the whole of the inkjet recording apparatus 110 in accordance with a prescribed program, as well as a calculation device for performing various calculations. More specifically, the system controller 172 controls the various sections, such as the communications interface 170, image memory 174, motor driver 176, heater driver 178, and the like, as well as controlling communications with the host computer 186 and writing and reading to and from the image memory 174, and it also generates control signals for controlling the motor 188 and heater 189 of the conveyance system.

The image memory 174 is used as a temporary storage region for the image data, and it is also used as a program development region and a calculation work region for the CPU.

The motor driver (drive circuit) 176 drives the motor of the conveyance system 188 in accordance with commands from the system controller 172. The heater driver (drive circuit) 178 drives the heater 189 of the post-drying unit 142 or the like in accordance with commands from the system controller 172.

The print controller 180 is a control unit which functions as a signal processing device for performing various treatment processes, corrections, and the like, in accordance with the control implemented by the system controller 172, in order to generate a signal for controlling droplet ejection from the image data (multiple-value input image data) in the image to memory 174, as well as functioning as a drive control device which controls the ejection driving of the print head unit 150 by supplying the ink ejection data thus generated to the head driver 184.

The image buffer memory 182 is provided in the print controller 180, and image data, parameters, and other data are temporarily stored in the image buffer memory 182 when image data is processed in the print controller 180. FIG. 30 shows a mode in which the image buffer memory 182 is attached to the print controller 180; however, the image memory 174 may also serve as the image buffer memory 182. Also possible is a mode in which the print controller 180 and the system controller 172 are integrated to form a single processor.

To give a general description of the sequence of processing from image input to print output, image data to be printed (original image data) is input from an external source via a communications interface 170, and is accumulated in the image memory 174. At this stage, multiple-value RGB image data is stored in the image memory 174, for example.

The print controller 180 performs processing for converting the input RGB image data into dot data for the four colors of K, C, M and Y. The dot data generated by the print controller 180 in this way is stored in the image buffer memory 182. This dot data of the respective colors is converted into CMYK droplet ejection data for ejecting ink from the nozzles of the print head unit 150, thereby establishing the ink ejection data to be printed.

The head driver 184 outputs a drive signal for driving the actuators 158 corresponding to the nozzles 151 of the print head unit 150 in accordance with the print contents, on the basis of the ink ejection data and the drive waveform signals supplied by the print controller 180. A feedback control system for maintaining constant drive conditions in the head may be included in the head driver 184.

By supplying the drive signal output by the head driver 184 to the print head unit 150 in this way, ink is ejected from the corresponding nozzles 151. By controlling ink ejection from the print head units 150 in synchronization with the conveyance speed of the recording paper 116, an image is formed on the recording paper 116.

As described above, the recording volume and the ejection timing of the ink droplets from the respective nozzles are controlled via the head driver 184, on the basis of the ink ejection data generated by implementing prescribed signal processing in the print controller 180, and the drive signal waveform. By this means, prescribed dot size and dot positions can be achieved.

The print determination unit 124 is a block that includes the image sensor as described above with reference to FIG. 25, reads the image printed on the recording paper 116, determines the print conditions (presence of the ejection, variation in the dot formation, optical density and the like) by performing required signal processing, and the like, and provides the determination results of the print conditions to the print controller 180 and the system controller 172.

The print controller 180 implements various corrections with respect to the print head unit 150, on the basis of the information obtained from the print determination unit 124, according to requirements, and it implements control of carrying out cleaning operations (nozzle restoring operations), such as preliminary ejection, suctioning, and wiping, as and when necessary.

Liquid droplet measurement apparatuses and liquid droplet measurement methods according to embodiments of the present invention are described in detail above, but the present invention is not limited to the aforementioned examples, and it is of course possible for improvements or modifications of various kinds to be implemented, within a range which does not deviate from the essence of the present invention.

It should be understood that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A liquid droplet measurement apparatus, comprising:
   a liquid droplet ejection device for ejecting a liquid droplet;
   a first laser light source emitting a laser light;
   a first optical device which condenses the laser light emitted from the first laser light source so as to make, in terms of a beam cross-section of the laser light, a beam width in a direction perpendicular to a direction of ejection of the liquid droplet, greater than a beam width in the direction of ejection of the liquid droplet, and make light intensity of the laser light fall within a prescribed range within a range where variation in a position of the liquid droplet occurs in the direction perpendicular to the direction of ejection of the liquid droplet, at a position where the laser light from the first laser light source is irradiated onto the liquid droplet which has been ejected from the liquid droplet ejection device;
   a lens for condensing a beam of the laser light which has passed a position where the laser light is irradiated onto the liquid droplet;
   a first light receiving device which receives the laser light that has been condensed by the lens and generates a determination signal; and
   a first liquid droplet characteristics calculation device which calculates at least one of a volume of the liquid droplet and a velocity of the liquid droplet, from the determination signal generated by the first light receiving device.

2. The liquid droplet measurement apparatus as defined in claim 1, wherein the first optical device comprises a cylindrical lens.

3. The liquid droplet measurement apparatus as defined in claim 1, wherein the first optical device comprises a diffusion plate which diffuses the laser light.

4. The liquid droplet measurement apparatus as defined in claim 1, wherein the first optical device comprises a fly-eye lens which diffuses the laser light.

5. The liquid droplet measurement apparatus as defined in claim 1, further comprising:
   a second laser light source emitting a laser light;
   a second optical device which makes light intensity of the laser light in terms of a beam cross-section of the laser light, non-uniform within a range where variation in the position of the liquid droplet occurs in the direction perpendicular to the direction of ejection of the liquid droplet, at a position where the laser light from the second laser light source is irradiated onto the liquid droplet ejected;
   a second light receiving device which receives the laser light that has been irradiated onto the liquid droplet by the second optical device and generates a determination signal; and
   a second liquid droplet characteristics calculation device which calculates a position of the liquid droplet from the determination signal generated by the second light receiving device.

6. The liquid droplet measurement apparatus as defined in claim 1, further comprising a light restricting device which restricts the laser light received by the first light receiving device or the second light receiving device.

7. The liquid droplet measurement apparatus as defined in claim 1, wherein a color of the laser light emitted from the first laser light source or a color of the laser light emitted from the second laser light source is a complementary color with respect to a color of the liquid droplet.

8. The liquid droplet measurement apparatus as defined in claim 5, wherein the laser light emitted from the first laser light source and the laser light emitted from the second laser light source have different wavelengths.

9. The liquid droplet measurement apparatus as defined in claim 5, wherein the laser light emitted from the first laser light source and the laser light emitted from the second laser light source have different planes of polarization.

10. A liquid droplet measurement method, comprising the steps of:
    condensing a laser light emitted from a first laser light source onto a liquid droplet ejected from a liquid droplet ejection device in such a manner that light intensity of the laser light in terms of a beam cross-section of the laser light is made to fall within a prescribed range, within a range where variation in a position of the liquid droplet occurs in a direction perpendicular to a direction of ejection of the liquid droplet, at a position where the laser light emitted from the first laser light source is irradiated onto the liquid droplet ejected;
    condensing a beam of the laser light which has passed a position where the laser light is irradiated onto the liquid droplet ejected;
    receiving the laser light of which the beam has been condensed; and
    calculating at least one of a volume of the liquid droplet and a velocity of the liquid droplet.

11. The liquid droplet measurement method as defined in claim 10, comprising:
    the time interval measurement step of measuring a temporal change in a value of a determination signal generated by receiving the laser light that has been irradiated onto the liquid droplet, and measuring a time interval from a time at which ejection of the liquid droplet is driven until a time at which the value of the determination signal changes by a prescribed amount; and
    the velocity calculation step of calculating the velocity of the liquid droplet from a correlation between the time interval and the velocity of the liquid droplet.

12. The liquid droplet measurement method as defined in claim 10, comprising:
    the maximum change measurement step of measuring a temporal change in a value of a determination signal generated by receiving the laser light that has been irradiated onto the liquid droplet, and measuring a maximum amount of change in the value of the determination signal; and
    the volume calculation step of calculating a volume of the liquid droplet from a correlation between the maximum amount of change and the volume of the liquid droplet.

13. A liquid droplet measurement apparatus, comprising:
    a liquid droplet ejection device for ejecting a liquid droplet;
    a laser light source emitting a laser light;
    an optical device which condenses the laser light emitted from the laser light source so as to make light intensity of the laser light in terms of a beam cross-section of the laser light, non-uniform within a range where variation in a position of the liquid droplet occurs in a direction perpendicular to a direction of ejection of the liquid droplet, at a position where the laser light from the laser light source is irradiated onto the liquid droplet ejected from the liquid droplet ejection device;

a lens for condensing a beam of the laser light which has passed a position where the laser light is irradiated onto the liquid droplet;

a light receiving device which receives the laser light that has been condensed by the lens and generates a determination signal;

a liquid droplet ejection position changing device which changes a relative position of the light receiving device with respect to the liquid droplet; and a liquid droplet position calculation device which calculates a position of the liquid droplet from the plurality of determination signals generated respectively at the relative positions of the light receiving device with respect to the liquid droplet changed by the liquid droplet ejection position changing device.

14. The liquid droplet measurement apparatus as defined in claim 13, wherein the liquid droplet position calculation device uses an interpolation function to calculate the position of the liquid droplet, the interpolation function having coefficients obtained by a least square method from coordinate values of the plurality of determination signals, in a coordinate system which indicates a relationship between coordinate values of the relative positions and the coordinate values of the plurality of determination signals.

15. The liquid droplet measurement apparatus as defined in claim 14, wherein the liquid droplet position calculation device selects one of a quadratic function and a cubic function as the interpolation function, in accordance with the coordinate values of the plurality of determination signals.

16. The liquid droplet measurement apparatus as defined in claim 15, wherein, taking the coordinate values of the plurality of determination signals to be IS1, IS2, and IS3, in order from the highest absolute value, and taking the coordinate values of the relative positions when the coordinate values IS1, IS2, and IS3 of the plurality of determination signals are determined, to be XS1, XS2, and XS3, the liquid droplet position calculation device selects the cubic function as the interpolation function when relationship of $\{(IS1-IS2)/|XS1-XS2|>(IS2-IS3)/|XS2-XS3|\}$ is established, and selects the quadratic function as the interpolation function when relationship of $\{(IS1-IS2)/|XS1-XS2|\leqq(IS2-IS3)/|XS2-XS3|\}$ is established.

17. The liquid droplet measurement apparatus as defined in claim 16, wherein when the relationship $\{(IS1-IS2)/|XS1-XS2|\leqq(IS2-IS3)/|XS2-XS3|\}$ is established and the quadratic function is selected as the interpolation function, the liquid droplet position calculation device determines the coefficients of the interpolation function by a least square method, from the four highest coordinate values which have high absolute values, of the coordinate values of the plurality of determination signals.

18. A liquid droplet measurement method, comprising the steps of:

emitting a laser light from a laser light source onto a liquid droplet in a state where light intensity of the laser light in terms of a beam cross-section of the laser light is made to be non-uniform within a range where variation in a position of the liquid droplet occurs in a direction perpendicular to a direction of ejection of the liquid droplet, at a position where the laser light is irradiated onto the liquid droplet ejected;

changing a relative position of a light receiving device which receives the laser light that has been irradiated onto the liquid droplet, with respect to the liquid droplet; and calculating a position of the liquid droplet from a plurality of determination signals generated by the light receiving device.

19. The liquid droplet measurement apparatus as defined in claim 1, wherein the first liquid droplet characteristics calculation device measures a time interval from a time when ejection driving of the liquid droplet ejection device is performed until a time when a value of the determination signal changes by a prescribed amount, and calculates the velocity of the liquid droplet from a correlation between the measured time interval and the velocity of the liquid droplet.

20. The liquid droplet measurement apparatus as defined in claim 1, wherein the first liquid droplet characteristics calculation device measures a maximum amount of change in a value of the determination signal, and calculates the volume of the liquid droplet from a correlation between the measured maximum amount of change in the value of the determination signal and the volume of the liquid droplet.

21. The liquid droplet measurement apparatus as defined in claim 1, comprising a light restricting device arranged between the lens and the first light receiving device, wherein the lens condenses the beam of the laser light so as to provide an image of the liquid droplet at a position of the light restricting device.

\* \* \* \* \*